United States Patent
Nakano et al.

(10) Patent No.: US 11,882,606 B2
(45) Date of Patent: Jan. 23, 2024

(54) WIRELESS COMMUNICATION TERMINAL DEVICE, AND WIRELESS COMMUNICATION METHOD THEREFOR

(71) Applicant: Panasonic Intellectual Property Management Co., Ltd., Osaka (JP)

(72) Inventors: Kosei Nakano, Kanagawa (JP); Tomoya Urushihara, Kanagawa (JP); Hiroyuki Motozuka, Kanagawa (JP); Naganori Shirakata, Kanagawa (JP); Koji Takinami, Kanagawa (JP); Takenori Sakamoto, Kanagawa (JP); Yao Huang Gaius Wee, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 383 days.

(21) Appl. No.: 17/412,993

(22) Filed: Aug. 26, 2021

(65) Prior Publication Data
US 2021/0400739 A1    Dec. 23, 2021

Related U.S. Application Data

(63) Continuation of application No. PCT/JP2020/007945, filed on Feb. 27, 2020.

(30) Foreign Application Priority Data

Feb. 27, 2019  (JP) .................................. 2019-034639
Feb. 28, 2019  (JP) .................................. 2019-035691
Mar. 28, 2019  (JP) .................................. 2019-064570

(51) Int. Cl.
*H04W 76/10*        (2018.01)
*H04W 4/46*         (2018.01)

(52) U.S. Cl.
CPC ............. *H04W 76/10* (2018.02); *H04W 4/46* (2018.02)

(58) Field of Classification Search
None
See application file for complete search history.

(56) References Cited

U.S. PATENT DOCUMENTS

2006/0193282 A1   8/2006  Ikawa et al.
2010/0203833 A1   8/2010  Dorsey
(Continued)

FOREIGN PATENT DOCUMENTS

JP    2011-055044 A    3/2011
JP    5602768 B2      10/2014
(Continued)

OTHER PUBLICATIONS

IEEE Std. 802.11ad-2012, "IEEE Standard for Information technology—Telecommunications and information exchange between systems—Local and Metropolitan area networks—Specific requirements—Part 11: Wireless LAN Medium Access Control (MAC) and Physical Layer (PHY) Specifications—Amendment 3: Enhancements for Very High Throughput in the 60 GHz Band," Dec. 2012, pp. 140-144.

(Continued)

*Primary Examiner* — Anh Vu H Ly
(74) *Attorney, Agent, or Firm* — Seed IP Law Group LLP

(57) ABSTRACT

This wireless communication terminal device includes a control circuit that: causes, after receiving a beacon from a base station device, a connection to be established between the wireless communication terminal device and the base station device using a first control program; if a connection notification request to an external server was received from one or more application programs, uses a second control program, after the establishment of the connection, to output (Continued)

a connection establishment notification to the one or more application programs; and after the connection establishment notification is received, outputs to a communication circuit, via the first control program, a communication request to the external server device by the one or more application programs. The communication circuit of the wireless communication terminal device transmits the communication request to the base station device.

4 Claims, 36 Drawing Sheets

(56) References Cited

U.S. PATENT DOCUMENTS

| | | | |
|---|---|---|---|
| 2011/0053520 | A1 | 3/2011 | Imagawa et al. |
| 2017/0013658 | A1* | 1/2017 | Ta .......................... H04L 45/04 |
| 2017/0251062 | A1* | 8/2017 | Lu .......................... H04L 63/205 |
| 2017/0303293 | A1 | 10/2017 | Zhao |
| 2018/0144623 | A1 | 5/2018 | Shirakata et al. |
| 2019/0222364 | A1 | 7/2019 | Shimoda et al. |
| 2020/0221298 | A1* | 7/2020 | Pan ....................... H04W 12/50 |
| 2020/0275246 | A1* | 8/2020 | Croft ....................... H04W 4/70 |
| 2021/0099848 | A1* | 4/2021 | Ruan .................. H04W 36/0079 |
| 2021/0258374 | A1* | 8/2021 | Wang ...................... H04L 67/14 |

FOREIGN PATENT DOCUMENTS

| | | |
|---|---|---|
| JP | 2017017429 A | 1/2017 |
| JP | 2018500847 A | 1/2018 |
| JP | 2018-084860 A | 5/2018 |
| WO | 2005/039075 A1 | 4/2005 |
| WO | WO 2018061476 A1 | 4/2018 |
| WO | WO-2019096422 A1 * 5/2019 ......... H04L 12/5692 |

OTHER PUBLICATIONS

International Search Report, dated May 26, 2020, for International Application No. PCT/JP2020/007945, 4 pages. (with English Translation).

* cited by examiner

| 2201 | 2202 | 2203 | 2204 | 2205 | 2206 | 2207 |
|---|---|---|---|---|---|---|
| Maximum SC Rx MCS | Maximum OFDM Rx MCS | Maximum SC Tx MCS | Maximum OFDM Tx MCS | Low-Power SC PHY Supported | Code Rate 13/16 | Reserved |
| 5 | 5 | 5 | 5 | 1 | 1 | 2 |

Bits:

FIG. 11

| ID | VEHICLE 3102A |
|---|---|
| FREE SPACE [GB] | 100 |

FIG. 21A

| ID | VEHICLE 3102B |
|---|---|
| FREE SPACE [GB] | 50 |

FIG. 21B

| ID | VEHICLE 3102C |
|---|---|
| FREE SPACE [GB] | 70 |

FIG. 21C

| ID | VEHICLE 3102A | | |
|---|---|---|---|
| FREE SPACE [GB] | 100 | | |
| PRIORITY | 1 | | |
| DATA RECEPTION IN PROGRESS | No | | |

FIG. 22A

| ID | VEHICLE 3102A | VEHICLE 3102B | VEHICLE 3102C |
|---|---|---|---|
| FREE SPACE [GB] | 100 | 50 | 70 |
| PRIORITY | 3 | 1 | 2 |
| DATA RECEPTION IN PROGRESS | Yes | No | No |

FIG. 22B

| ID | VEHICLE 3102B | VEHICLE 3102C | |
|---|---|---|---|
| FREE SPACE [GB] | 50 | 70 | |
| PRIORITY | 1 | 2 | |
| DATA RECEPTION IN PROGRESS | No | No | |

FIG. 22C

| ID | VEHICLE 3102B | VEHICLE 3102C | |
|---|---|---|---|
| FREE SPACE [GB] | 50 | 70 | |
| PRIORITY | 1 | 2 | |
| DATA RECEPTION IN PROGRESS | Yes | No | |

FIG. 22D

| ID | VEHICLE 3102A |
|---|---|
| FREE SPACE [GB] | 100 |
| REQUIRED FREE SPACE [GB] | 415 |
| TIME LIMIT FOR TRANSFER COMPLETION | 13:30:00 |

FIG. 25A

| ID | VEHICLE 3102B |
|---|---|
| FREE SPACE [GB] | 50 |
| REQUIRED FREE SPACE [GB] | 860 |
| TIME LIMIT FOR TRANSFER COMPLETION | 14:30:00 |

FIG. 25B

| ID | VEHICLE 3102C |
|---|---|
| FREE SPACE [GB] | 70 |
| REQUIRED FREE SPACE [GB] | 190 |
| TIME LIMIT FOR TRANSFER COMPLETION | 13:20:00 |

FIG. 25C

| ID | VEHICLE 3102A | VEHICLE 3102B | VEHICLE 3102C |
|---|---|---|---|
| FREE SPACE [GB] | 100 | 50 | 70 |
| REQUIRED FREE SPACE [GB] | 415 | 860 | 190 |
| TIME LIMIT FOR TRANSFER COMPLETION | 13:30:00 | 14:30:00 | 13:20:00 |
| AVAILABLE STAYING PERIOD [sec] | 1800 | 5400 | 1200 |
| REQUIRED THROUGHPUT [Gbps] | 1.4 | 1.2 | 0.8 |
| PRIORITY | 1 | 2 | 3 |
| DATA RECEPTION IN PROGRESS | Yes | No | No |

FIG. 26A

| ID | VEHICLE 3102A | VEHICLE 3102B | VEHICLE 3102C |
|---|---|---|---|
| FREE SPACE [GB] | 250 | 50 | 70 |
| REQUIRED FREE SPACE [GB] | 265 | 860 | 190 |
| TIME LIMIT FOR TRANSFER COMPLETION | 13:30:00 | 14:30:00 | 13:20:00 |
| AVAILABLE STAYING PERIOD [sec] | 1200 | 5400 | 600 |
| REQUIRED THROUGHPUT [Gbps] | 0.1 | 1.2 | 1.6 |
| PRIORITY | 3 | 2 | 1 |
| DATA RECEPTION IN PROGRESS | No | No | Yes |

FIG. 26B

WIRELESS COMMUNICATION TERMINAL DEVICE, AND WIRELESS COMMUNICATION METHOD THEREFOR

TECHNICAL FIELD

The present disclosure relates to a radio communication terminal apparatus, and a radio communication method therefor.

BACKGROUND ART

The present disclosure relates to a radio network connection method for a radio communication terminal apparatus in road vehicle communication. Studies have been conducted on a method of achieving high speed data transmission between vehicles and the roadside utilizing millimeter wave communication (see, for example, Patent Literature (hereinafter, referred to as "PTL") 1).

CITATION LIST

Patent Literature

PTL1
Japanese Patent No. 5602768
PTL2
Japanese Patent Application Laid-Open No. 2011-055044

Non-Patent Literature

NPL 1
IEEE Std. 802.11ad-2012 pp. 140-144

SUMMARY OF INVENTION

The radio network connection method for a radio communication terminal apparatus disclosed in PTL 1, however, takes no account of a case of executing multiple application programs, and it is thus difficult for the application programs to start communication quickly.

One non-limiting and exemplary embodiment facilitates providing a radio communication terminal apparatus that enables application programs to start communication quickly.

A radio communication terminal apparatus according to an embodiment of the present disclosure includes: communication circuitry, which, in operation, communicates with a base station apparatus that is a communication counterpart; and control circuitry, which, in operation, controls a first control program, one or more application programs, and a second control program, the first control program controlling communication between the communication circuitry and the base station apparatus, the one or more application programs being executed in the radio communication terminal apparatus and using data communicated between an external server apparatus and the radio communication terminal apparatus via the base station apparatus, and the second control program controlling an indication between the first control program and the one or more application programs, wherein, the control circuitry: establishes connection between the radio communication terminal apparatus and the base station apparatus by the first control program after the radio communication terminal apparatus receives a beacon from the base station apparatus, outputs a connection establishment indication to the one or more application programs by the second control program after the connection is established, in a case where a connection indication request to the external server apparatus has been received from the one or more application programs, and outputs, to the communication circuitry, a communication request to the external server apparatus by the one or more application programs via the first control program after the connection establishment indication is received, and the communication circuitry transmits the communication request to the base station apparatus.

A radio communication method for a radio communication terminal apparatus according to an embodiment of the present disclosure includes: establishing connection between the radio communication terminal apparatus and a base station apparatus by a first control program after the radio communication terminal apparatus receives a beacon from the base station apparatus; outputting a connection establishment indication to one or more application programs by a second control program after the connection is established, in a case where a connection indication request to an external server has been received from the one or more application programs; and outputting, to communication circuitry, a communication request to the external server apparatus by the one or more application programs via the first control program after the connection establishment indication is received; transmitting the communication request to the base station apparatus by the communication circuitry, wherein, the first control program controls communication between the communication circuitry and the base station apparatus, the one or more application programs are executed in the radio communication terminal apparatus, and use data communicated between the external server apparatus and the radio communication terminal apparatus via the base station apparatus, and the second control program controls an indication between the first control program and the one or more application programs.

It should be noted that general or specific embodiments may be implemented as a system, an apparatus, a method, an integrated circuit, a computer program, a storage medium, or any selective combination thereof.

According to an embodiment of the present disclosure, it is possible to provide a radio communication terminal apparatus capable of starting application programs quickly.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 11 illustrates an exemplary format of a supported MCS set field used in the communication system according to Embodiment 2 of the present the present disclosure;

FIG. 21A illustrates an exemplary transmission request indication according to Embodiment 3;

FIG. 21B illustrates another exemplary transmission request indication according to Embodiment 3;

FIG. 21C illustrates still another exemplary transmission request indication according to Embodiment 3;

FIG. 22A illustrates exemplary communication management database (DB) according to Embodiment 3;

FIG. 22B illustrates other exemplary communication management DB according to Embodiment 3;

FIG. 22C illustrates still other exemplary communication management DB according to Embodiment 3;

FIG. 22D illustrates still other exemplary communication management DB according to Embodiment 3;

FIG. 25A illustrates an exemplary transmission request indication according to Embodiment 3;

FIG. 25B illustrates another exemplary transmission request indication according to Embodiment 3;

FIG. 25C illustrates still another exemplary transmission request indication according to Embodiment 3;

FIG. 26A illustrates exemplary communication management DB according to Embodiment 3;

FIG. 26B illustrates other exemplary communication management DB according to Embodiment 3;

DESCRIPTION OF EMBODIMENTS

Embodiment 1

Figure 1:
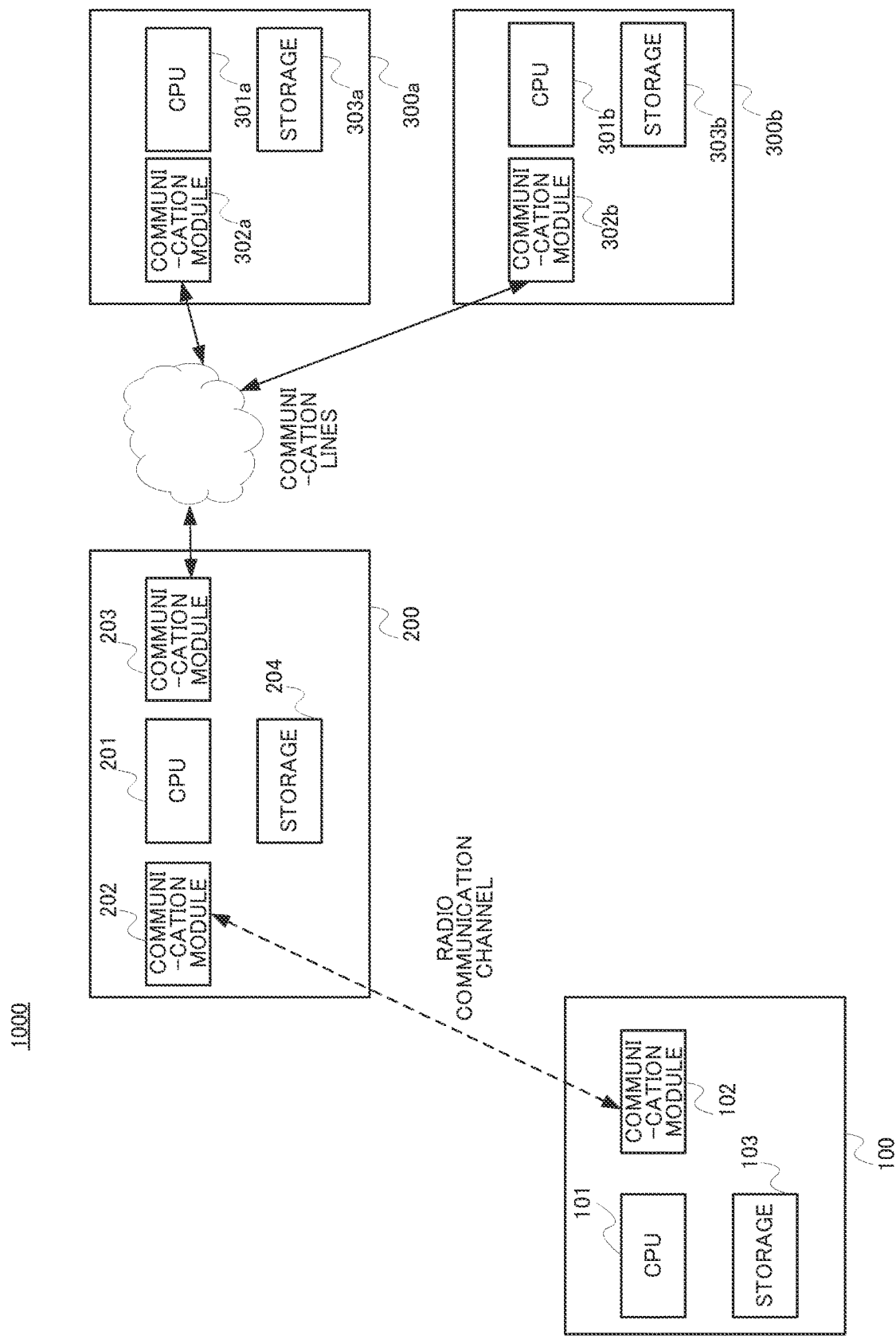
FIG. 1 illustrates an exemplary configuration of a communication system according to Embodiment 1 of the present disclosure.

FIG. 1 illustrates an exemplary configuration of communication system 1000 according to Embodiment 1 of the present disclosure. Communication system 1000 includes user terminal (radio communication terminal apparatus) 100, base station apparatus 200, and server apparatuses 300*a* and 300*b*. User terminal 100 communicates with server apparatuses 300*a* and 300*b* via base station apparatus 200. Note that user terminal 100 communicates with base station apparatus 200 through a radio communication channel, but base station apparatus 200 may use radio communication channels or other than the radio communication channels when communicating with server apparatuses 300*a* and 300*b*.

User terminal 100 includes Central Processing Unit (CPU) 101, communication module 102, and storage 103. Examples of user terminal 100 include Data Communication Modules (DCMs), car navigation terminals, Electronic Toll Collection (ETC) devices, safe driving assistance devices, mobile phones, smartphones, tablets, and personal computers. User terminal 100 may be mounted on, for example, vehicles, trains, vessels, airplanes, Unmanned Aerial Vehicles (UAVs), or drones. User terminal 100 may also be carried by a user. Note that CPU 101 is also referred to as control circuitry, and communication module 102 is also referred to communication circuitry.

Base station apparatus 200 includes CPU 201, communication modules 202 and 203, and storage 204. Examples of base station apparatus 200 include roadside apparatuses, radio access points, and radio base stations.

Server apparatus 300a includes CPU 301a, communication module 302a, and storage 303a. Server apparatus 300b includes CPU 301b, communication module 302b, and storage 303b. Examples of server apparatuses 300a and 300b include web servers, application servers, and data bases. Server apparatuses 300a and 300b are connected to the base station apparatus via communication lines such as the internet, exclusive lines, cellular lines, and Local Area Networks (LANs). Server apparatuses 300a and 300b may be placed at locations different from where the base station apparatus is placed, and may be placed in a single housing.

When approaching base station apparatus 200 (entering a communication area of base station apparatus 200), user terminal 100 establishes a radio communication channel between communication module 102 and communication module 202, and executes applications for communicating with server apparatuses 300a and 300b.

When user terminal 100 moves away from base station apparatus 200 (moves out from the communication area of base station apparatus 200), or when the movement of user terminal 100 causes antenna directivities of communication module 102 and communication module 202 to be inconsistent with each other, user terminal 100 goes out of communication range.

When user terminal 100 moves, communication system 1000 is thus required to complete the communication with server apparatuses 300a and 300b used in the applications before going out of communication range. Consequently, it is preferable for the applications of user terminal 100 to quickly communicate with server apparatuses 300a and 300b after the radio communication channel between communication module 102 and communication module 202 is established.

For example, when communication modules 102 and 202 use IEEE 802.11ad communication, a radio communication channel can be established at a distance of 100 m or more, as an example. However, when user terminal 100 is mounted on a vehicle that runs at 100 km/h, the coverage area of 100 m is passed in about 3.6 seconds. Thus, CPU 100 is required to operate the applications quickly so that the communication with server apparatuses 300a and 300b can be completed in 3.6 seconds or less.

Note that PTL 1 discloses that a MAC layer of the user terminal indicates to an appropriate application that a radio network connection (connection of a radio communication channel) has occurred. However, execution of a plurality of applications are not disclosed in PTL 1.

Figure 2:
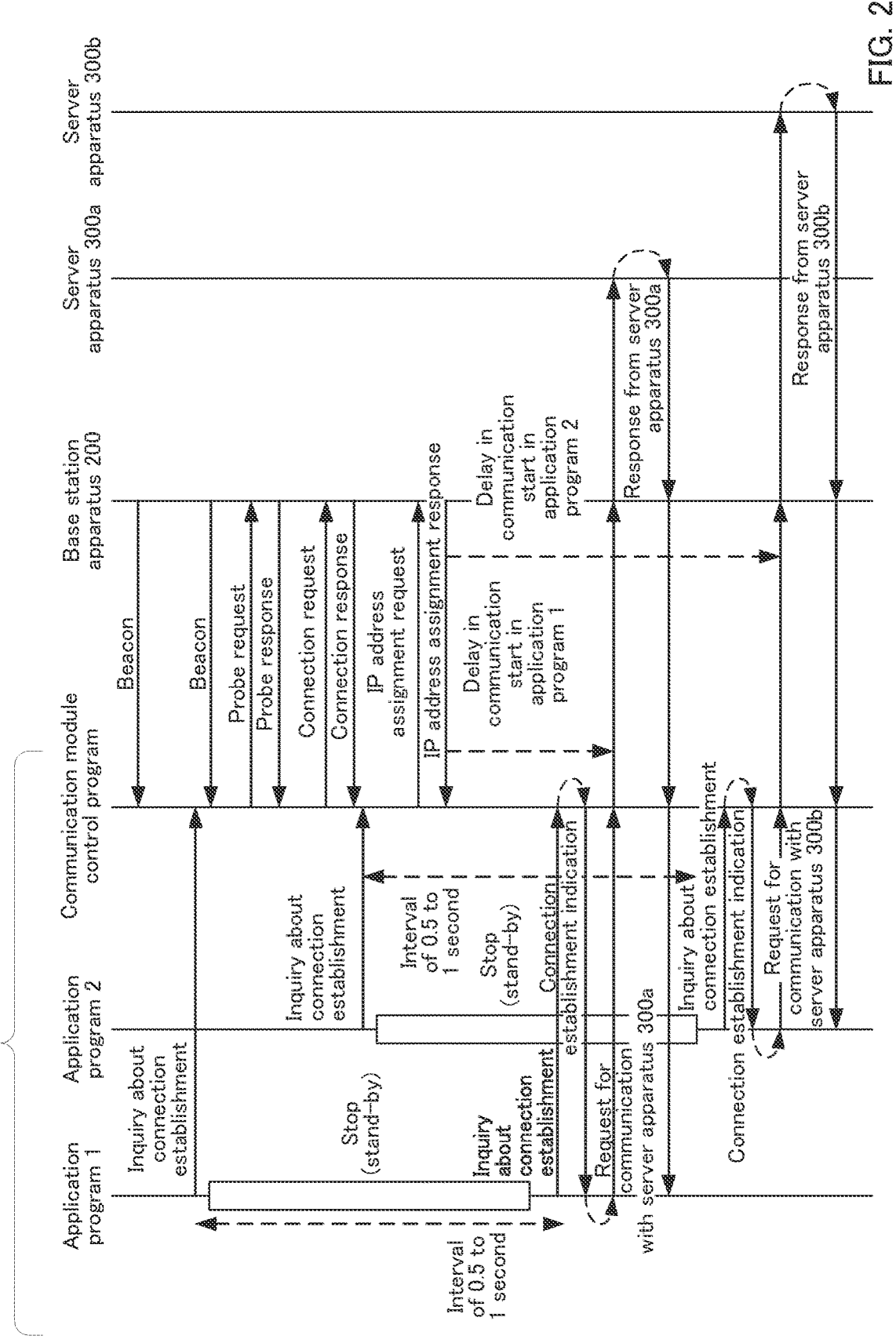
FIG. 2 is a sequence diagram describing an exemplary operation of a conventional communication system.

Herein, a description will be given of an operation of a conventional communication system when a plurality of applications are executed. FIG. 2 is a sequence diagram describing the operation of the conventional communication system. A conventional application program in a user terminal inquires of a communication module at regular intervals (e.g., every second) whether the communication module of the user terminal has established the connection of a radio communication channel.

The application is in a stand-by (stopped) state during the intervals between the inquiries, and this causes a delay before the application detects the connection establishment, thereby reducing the time for the application to communicate with a base station apparatus. Even when the user terminal resolves the delay by shortening the interval for the inquiry about the connection establishment, the frequency of the inquiry increases according the number of applications added to a storage, and this increases a load on the CPU and increases power consumption.

Figure 3:
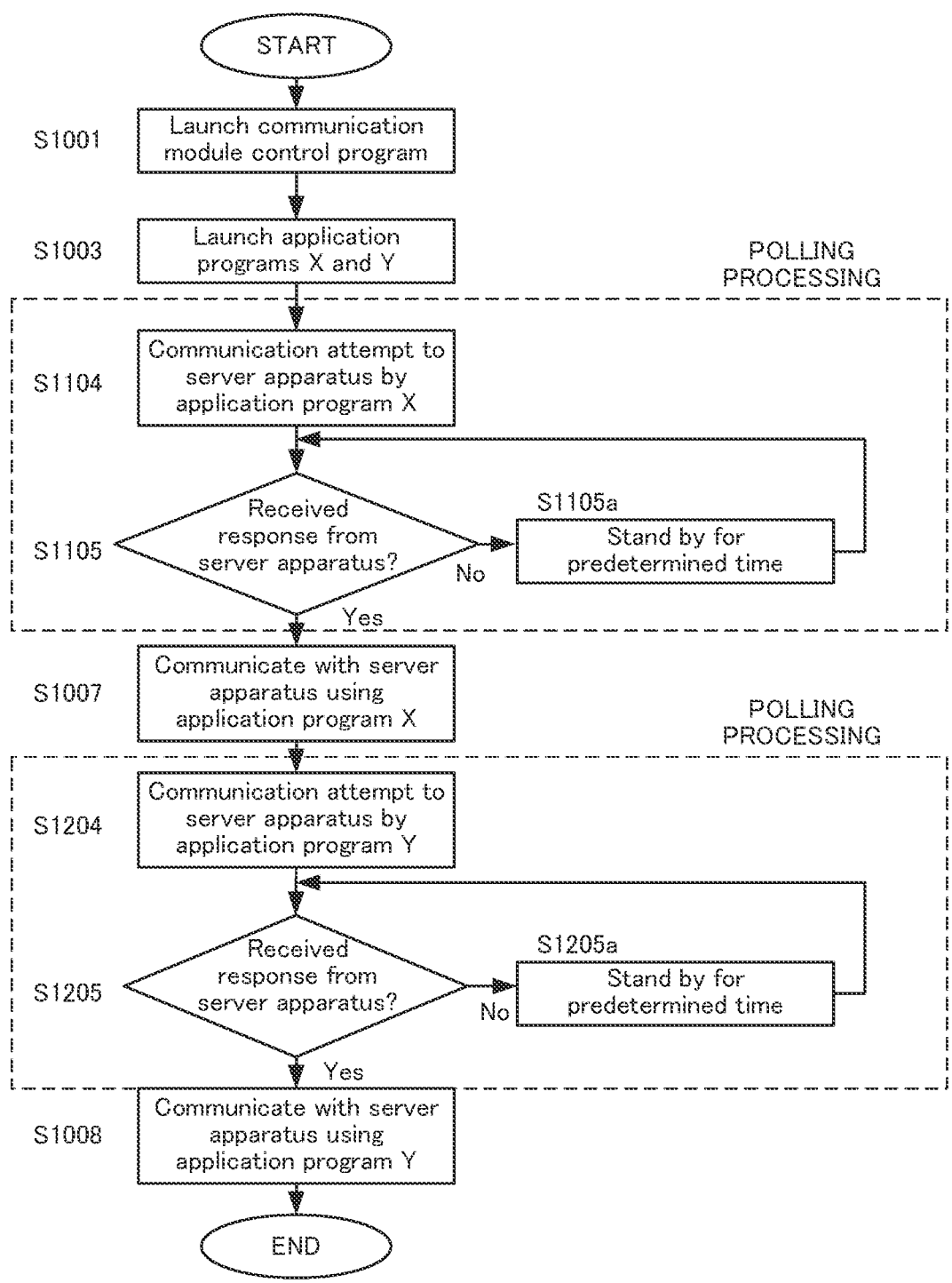
FIG. 3 is a flowchart describing another exemplary operation of the conventional communication system.

FIG. 3 is a flowchart describing another exemplary operation of the conventional communication system when a plurality of applications are executed. The conventional application programs in the user terminal determine whether communication is possible by communication attempts at regular intervals (e.g., every second) specifying the address of the server apparatus. This method is called a polling method.

The conventional user terminal performs the communication attempts using, for example, a ping command, a Hyper Text Transport Protocol (HTTP) request (steps S1104 and S1204).

The conventional user terminal determines whether the application program has received a response from the server apparatus (steps S1105 and S1205).

The conventional user terminal receives no response from the server apparatus when the connection of the radio communication channel is not established (No in steps S1105 and S1205). The conventional user terminal stands by for a predetermined time when it is determined to be "No" in steps S1105 and S1205 (step S1105a and S1205a).

The predetermined time is a fixed time such as 0.5 seconds or 1 second. The application program of the user terminal may increase the stand-by time (referred to as "exponential backoff") in steps S1105a and S1205a each time the user terminal determines "No" in steps S1105 and S1205, in order to reduce the load on the CPU due to the consecutive failures of the communication attempts to the server apparatus.

It is difficult for the application programs to detect that the connection of the radio communication channel has been established while the conventional user terminal stands by in steps S1105a and S1205a, and this causes a delay corresponding to the stand-by time in steps S1105a and S1205a.

In addition, the conventional user terminal repeats the connection attempts to the server apparatus when the connection of the radio communication channel is not established, thus increasing the load on the CPU.

Further, a delay in communication circuitry and a response delay (a round trip time) of the server apparatus occur from the communication attempts (transmission of the ping or the HTTP request) by the conventional user terminal until the reception of the response from the server. This causes a further delay between the establishment of the connection of the radio communication channel and the time when the application programs of the user terminal communicate with the server apparatuses.

As described above, the polling method causes the delay according to the polling intervals, and operations of the plurality of applications increase the load on the CPU in the conventional user terminal. In addition, in the communication attempt by the conventional user terminal, the user terminal waits for the response from the server apparatus even after connecting to the communication channel, and thus the response time of the server apparatus and the delay (round trip time) caused in the communication channel cause a delay for the applications to start the communication.

Thus, the execution of a plurality of applications tends to increase the delay since the executed applications each confirm the connection establishment of the radio communication, and it is difficult for the conventional user terminal to identify the application to be indicated that the radio network connection has occurred (e.g., to be indicated a process ID of the application) and complete the connection within a predetermined time.

Figure 4:
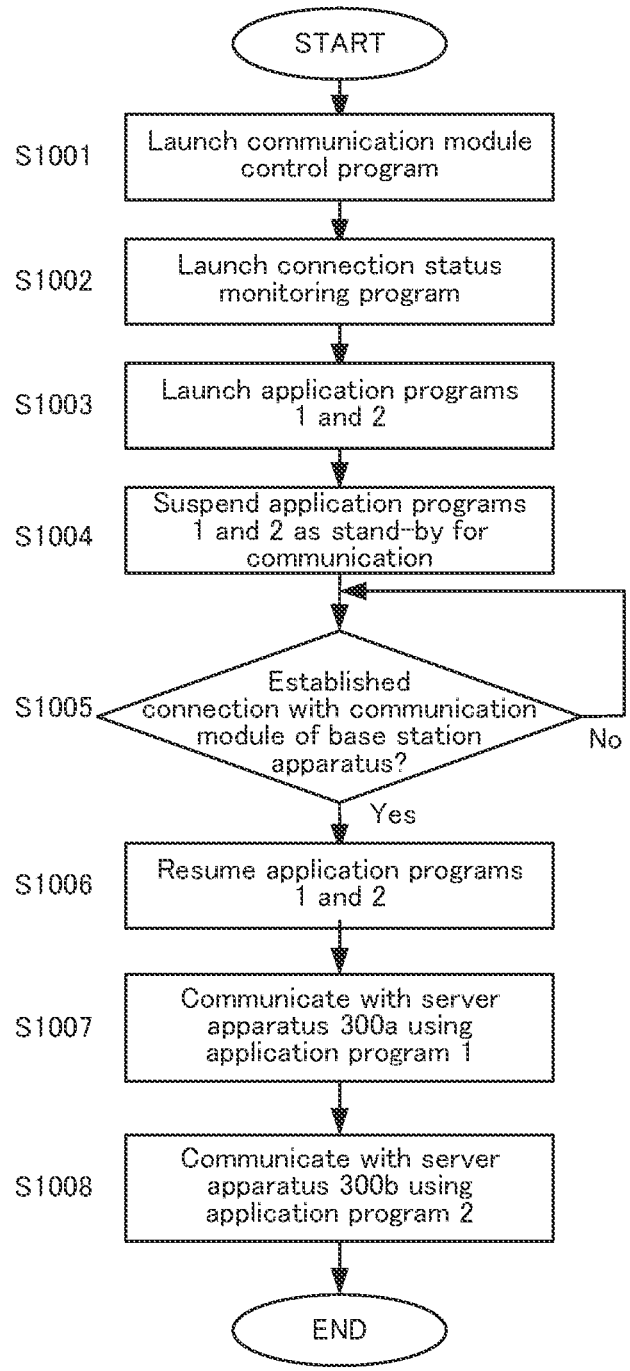
FIG. 4 is a flowchart describing an exemplary operation of the communication system according to Embodiment 1 of the present disclosure.

FIG. 4 is a flowchart describing an exemplary operation of communication system 1000. This flowchart describes an exemplary procedure in which user terminal 100 establishes a radio communication channel with base station apparatus 200 and communicates with server apparatuses 300a and 300b.

CPU 101 of user terminal 100 starts execution of a communication module control program (the first control program). Note that starting execution of a program is referred to as "launching a program". The communication module control program includes, for example, a supplicant program, and a Dynamic Host Configuration Protocol (DHCP) client. The communication module control program operates on CPU 101, gives launch and stop indications to communication module 102, and configures communication parameters, such as a radio channel and an encryption method, to be used for communicating with communication module 202. The communication module control program also holds information on whether communication module 102 and communication module 202 have established connection of the radio communication channel. (step S1001)

CPU 101 launches a connection status monitoring program (the second control program). The connection status monitoring program is an interface tool included in the communication module control program, and detects a status change of the communication module control program using, for example, a Command Line Interface (CLI) and a Desktop Bus (D-Bus). CPU 101 may launch a program and a command to launch the connection status monitoring program or to indicate to the connection status monitoring program when an event (e.g., connection and disconnection of the radio communication channel) occurs in the communication module control program. Note that the command and the program invoked in response to the event is sometimes referred to as a hook. (step S1002)

Note that step S1001 may be performed after step S1002. By way of example, CPU 101 may launch the communication module control program by a hook function of the connection status monitoring program in a case where the connection status monitoring program is launched first. Launching the communication module control program as a sub process of the connection status monitoring program allows the communication module control program to indicate the status of communication module control (including the connection status of the radio communication channel) to the connection status monitoring program by, for example, inter-process communication using a pipe, even when a process ID and an Application Interface (API) of the connection status monitoring program are unknown.

CPU 101 launches one or more application programs (application 1 and application 2). Examples of the application program may include, for example, a navigation system, a dashboard camera, a safe driving assistance system, an automatic toll payment system, a software/firmware update system, a sensor data sharing system, or a web browser program. (step S1003)

CPU 101 suspends application 1 and application 2 as stand-by for communication. (step S1004)

Note that application 1 and application 2 may include a plurality of functions such as a communication function, a drawing function, and a voice guidance function. In step S1004, CPU 101 may suspend the communication functions of application 1 and application 2 as stand-by for communication and continue to operate other functions.

Although the communication functions of application 1 and application 2 are suspended as stand-by for communication until communication module 102 establishes the radio communication channel with communication module 202 of the base station apparatus, CPU 101 determines whether the radio communication channel is connected by operating the connection status monitoring program. (step S1005)

When communication module 102 establishes the radio communication channel with communication module 202 (Yes in S1005), CPU 101 resumes the communication functions of application 1 and application 2 (step S1006). Note that the process of step S1005 is repeated until communication module 102 establishes the radio communication channel with communication module 202 (No in S1005).

CPU 101 communicates with server apparatus 300a by the communication function of application 1 (step S1007).

CPU 101 communicates with server apparatus 300b by the communication function of application 2 (step S1008).

By way of example, application 1 and application 2 download data from server apparatuses 300a and 300b, such as map information, traffic information, audio data including podcast data, music data, video data, software update data, and firmware update data. In addition, application 1 and application 2 upload, to server apparatuses 300a and 300b, dashboard camera information (including video data, still image data, and position information logs, obtained during driving), and sensor log data (including position information and velocity information history recorded by the dashboard camera, the safe driving assistance system, and the sensor data sharing system, sensor logs of the camera and the radar, and control data logs such as accelerator opening), for example.

Figure 5:
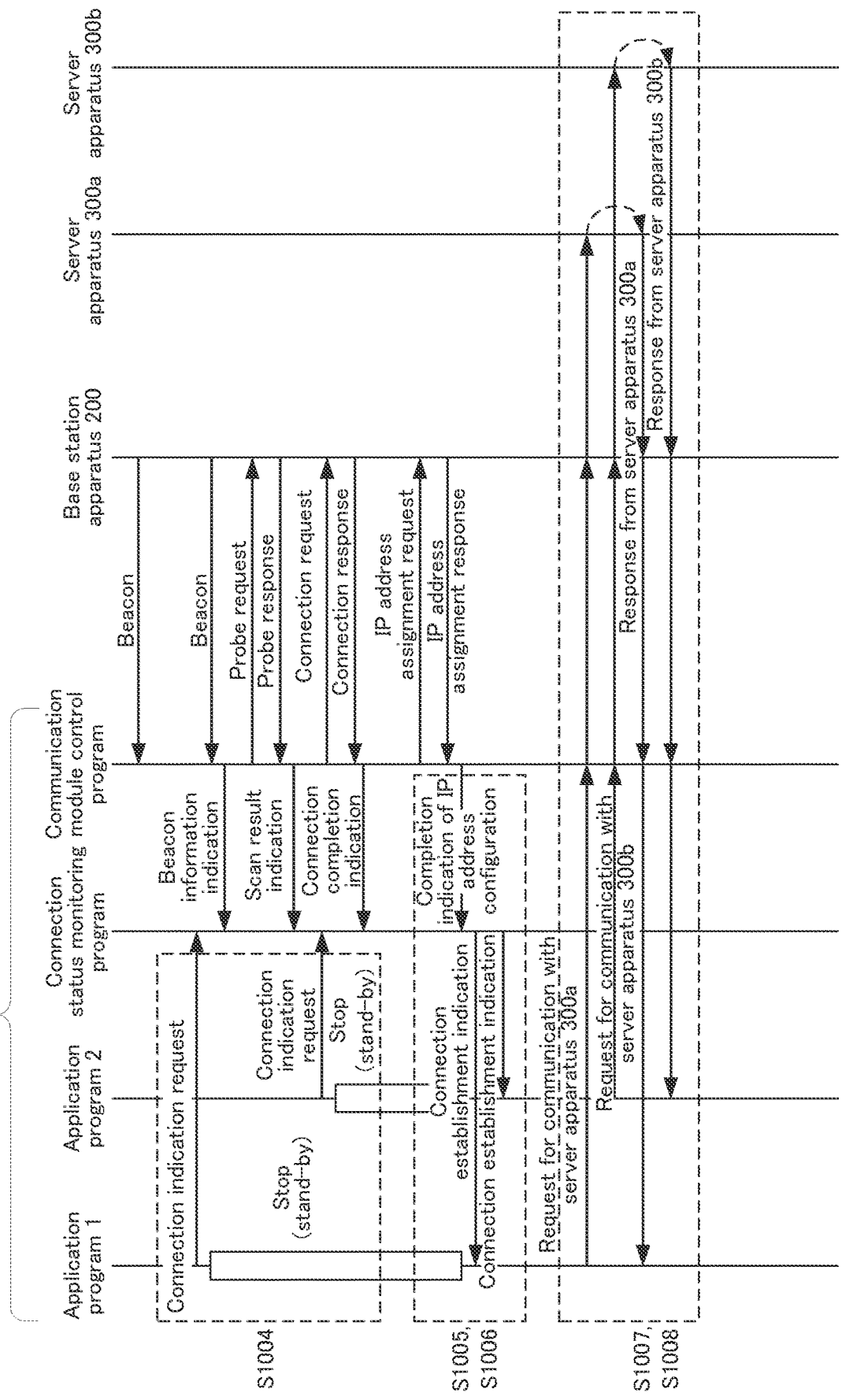
FIG. 5 is a sequence diagram describing the exemplary operation of the communication system according to Embodiment 1 of the present disclosure.

FIG. 5 is a sequence diagram describing an exemplary operation of communication system 1000. FIG. 5 provides a detailed description of the operation of user terminal 100 by describing the operation of each program operating on CPU 101 in detail. Note that CPU 101 is also referred to as control circuitry.

By way of example, base station apparatus 200 is a radio access point conforming to the IEEE 802.11 standard. Base station apparatus 200 transmits a beacon frame at regular intervals (e.g., every 0.1 seconds approximately).

Communication module 102 of user terminal 100 receives the beacon frame from base station apparatus 200 by scanning. When receiving the beacon frame, communication module 102 transmits a probe request frame to base station apparatus 200, and receives a probe response frame from base station apparatus 200. Note that, when communication module 102 receives the beacon frame, the communication module control program may indicate reception of the beacon frame as beacon information indication to the connection status monitoring program. A status change indication on receiving the beacon frame may include information included in the beacon frame such as the address of base station apparatus 200, and a result of beam forming (a beam direction and signal quality) using the beacon frame by communication module 102.

Communication module 102 finishes scanning when a predetermined time (e.g., 0.5 seconds) has elapsed. The communication module control program indicates a result of the scan to the connection status monitoring program.

When the probe response is received from base station apparatus 200 during scanning, user terminal 100 determines whether base station apparatus 200 is a connection target by the communication module control program. By way of example, the determination of whether base station apparatus 200 is a connection target may be based on whether a Service Set Identifier (SSID) of base station apparatus 200 is included in a predetermined list of the SSID.

When user terminal 100 determines that base station apparatus 200 is the connection target by the communication module control program, communication module 102 transmits a connection request (an association request frame) to base station apparatus 200. Base station apparatus 200 transmits a connection response frame when permitting the connection of user terminal 100.

Communication module 102 transmits an IP address assignment request (e.g., a DHCP Discover, a DHCP Request, a Router Solicitation, a Solicit Message, and a Request Message) to base station apparatus 200 when using an automatic configuration of the IP address.

When receiving the IP address assignment request, base station apparatus 200 transmits an IP address assignment response (e.g., a DHCP Offer, a DHCP Ack, a Router Advertisement, an Advertise Message, and a Confirm Message). Base station apparatus 200 may forward the IP address assignment request to a router or a DHCP server (both not illustrated) without responding by itself, and forward a response from the router or the DHCP server to user terminal 100.

Note that user terminal 100 may omit the transmission of the IP address assignment request and the reception of the IP address assignment response. By way of example, user terminal 100 may omit the transmission of the IP address assignment request and the reception of the IP address assignment response when using a fixed IP address or when a cached IP address is available. In this case, after the connection status monitoring program receives connection completion indication in FIG. 5, connection establishment indication is outputted to applications 1 and 2.

In addition, user terminal 100 may include a plurality of communication module control programs. By way of example, the user terminal may execute the supplicant program and the DHCP client. The supplicant program controls communication module 102, and the DHCP client performs IP address configuration including the IP address assignment request.

The connection status monitoring program may launch the DHCP client program when receiving the connection completion indication from the supplicant program. This reduces a delay between the reception of the connection response by communication module 102 and the transmission of the IP address assignment request.

The communication module control program may include the supplicant program, and the connection status monitoring program may include the DHCP client program.

Further, the connection status monitoring program may be implemented as a function of a web browser.

Next, the operations of application program 1 and application program 2 will be described.

By way of example, when application program 1 and application program 2 are navigation programs, and satisfy any one of the following conditions, application program 1 and application program 2 may communicate with server apparatus 300a using the radio communication channel in FIG. 1, and download new map information. That is, application programs 1 and 2 can output the connection indication request in FIG. 5 or the communication request in FIG. 7 regardless of whether user terminal 100 is in the communication area of base station apparatus 200;

Condition 1: Each predetermined cycle of map update confirmation (e.g., per day);

Condition 2: When moving out of a range of a detailed map stored in storage 103, or when movement out of the range of the detailed map is set as a navigation route; and Condition 3: When update of the map information distributed by server apparatus 300a is indicated by a communication line (not illustrated) different from the radio communication channel illustrated in FIG. 1, such as FM broadcasting, cellular communication, or Dedicated Short Range Communications (DSRC).

A description will be given of another example where server apparatus 300b, which may be in the vicinity of base station apparatus 200 or in the same housing, distributes information on road conditions acquired based on information from a camera, a radar, or another server apparatus (not illustrated) to user terminal 100 in real time.

When application program 1 and application program 2 are safe driving assistance systems, for example, user terminal 100 acquires the presence or absence of a distribution server (server apparatus 300b) that provides services at the current position of the user terminal, and the address of the distribution server (server apparatus 300b), and receives the information to be distributed by communicating with server apparatus 300b, through the map information and the communication line different from the radio communication channel in FIG. 1.

When the connection of the radio communication channel in FIG. 1 is valid, application program 1 and application program 2 may inquire of base station apparatus 200 or another server apparatus (not illustrated) about types of services provided in the communication performed at the current position of user terminal 100 or via base station apparatus 200, and the address of the server.

When communicating with server apparatuses 300a and 300b, application program 1 and application program 2 make a connection indication request to the connection status monitoring program. The connection indication request is indicated from application program 1 and application program 2 to the connection status monitoring program by inter-process communication. The operations of application program 1 and application program 2 are suspended as stand-by for communication until a connection establishment indication is received. This operation corresponds to step S1004 in FIG. 4.

The inter-process communication uses, for example, a shared memory, a named pipe, a socket, a signal, a shared file, a Desktop Bus (D-Bus), a Remote Procedure Call (RPC), and an HTTP. The connection status monitoring program performs the inter-process communication with a plurality of applications.

Note that the connection status monitoring program may make a request for stopping communication module 102 to the communication module control program and stop communication module 102, when receiving no connection indication request from application program 1 and application program 2. The connection status monitoring program may also make a request for communication module 102 to stand by to the communication module control program and shift communication module 102 to a low power consumption mode, when receiving no connection indication request from application program 1 and application program 2. This reduces power consumption of the communication module.

The connection status monitoring program indicates connection establishment to application program 1 and application program 2 when receiving completion indication of IP address configuration from the communication module control program.

When user terminal 100 makes no IP address assignment request, the connection status monitoring program indicates the connection establishment to application program 1 and application program 2 after receiving the connection completion indication from the communication module control program.

That is, the connection status monitoring program identifies a plurality of indications issued by the communication module control program, detects an indication that allows application program 1 and application program 2 to communicate with server apparatuses 300a and 300b immediately after receiving the identification, and issues the connection establishment indication. This operation corresponds to steps S1005 and S1006 in FIG. 4.

When the connection status monitoring program receives the connection indication request from application program 1 and application program 2, the connection status monitoring program may store information identifying application program 1 and application program 2 (for example, including an identifier based on the process ID or a random value of the application program in the connection indication request). Then, the connection status monitoring program may transmit the connection establishment indication with the identification information so that the connection establishment indication reaches the applications (application program 1 and application program 2) that have transmitted the connection indication request.

The connection status monitoring program may transmit the connection establishment indication as broadcast or group cast information, for example, including at least application program 1 and application program 2 as transmission destinations so that one or more application programs can receive the connection establishment indication. By way of example, writing connection indication information into a shared memory having a known address or key allows one or more application programs to receive the connection establishment indication. In addition, the connection status monitoring program may transmit the connection establishment indication to a large number of application programs by one-to-many inter-process communication using an inter-process communication program that implements a Publisher-Subscriber model (e.g., a ZeroMQ library).

In this case, application program 1 and application program 2 may be configured as a stand-by mode for the connection establishment indication, instead of making the connection indication request to the connection status monitoring program. The configuration for the stand-by mode includes, for example, connecting to a socket, listening on the socket, starting to monitor a shared memory, and connecting to a pipe.

The connection status monitoring program can indicate the connection establishment to the application programs by performing the one-to-many inter-process communication that does not specify the destinations, even when the connection status monitoring program is not indicated that application program 1 and application program 2 are configured as the stand-by mode, or when the connection status monitoring program has difficulty in identifying the application programs configured as the stand-by mode.

Application program 1 makes a communication request to server apparatus 300a when receiving the connection establishment indication. The communication request includes, for example, an inquiry about the IP address of server apparatus 300a to base station apparatus 200, server apparatus 300a, and another Domain Name System (DNS) server (not illustrated), a negotiation procedure for encrypted communication with server apparatus 300a, and a download request or an upload request of data from server apparatus 300a, in order to communicate with server apparatus 300a. This operation corresponds to step S1007 in FIG. 4.

Application program 2 makes a communication request to server apparatus 300b when receiving the connection establishment indication. This operation corresponds to step S1008 in FIG. 4.

Since application program 1 and application program 2 make the communication request to server apparatuses 300a and 300b after receiving the connection establishment indication, it is less likely to fail the communication due to the radio communication channel not being established. This prevents unnecessary communication requests compared with the conventional polling method, thereby reducing the load on CPU 101 and the power consumption.

Instead of the inter-process communication with the connection status monitoring program, application program 1 and application program 2 may make the connection indication request to basic software (an OS, a Web browser, and a common library) installed in user terminal 100. The connection indication request to the basic software uses a configuration of a callback function, a configuration of an event handler, a promise, an asynchronous function, a co-routine, and an await statement. Application program 1 and application program 2 are suspended or perform different processing other than the communication with server apparatuses 300a and 300b until the connection establishment indication is received. After receiving the connection establishment indication, the callback function is called, the event handler is fired, the asynchronous function is completed, and a message is received from the co-routine, and then the control is transferred so that application program 1 and application program 2 communicate with server apparatus 300a and server apparatus 300b.

In this case, the OS and the Web browser make the connection indication request to the connection status monitoring program using the inter-process communication, the signal, and Javascript API (registered trademark), on behalf of application program 1 and application program 2. In addition, when application program 1 and application program 2 use a common library, programs of the common library make the connection indication request to the connection status monitoring program using the inter-process communication.

As described above, user terminal 100 transmits the connection establishment indication to application program 1 and application program 2 by the inter-process communication using the connection status monitoring program, and application program 1 and application program 2 make the communication request after receiving the connection establishment indication. This enables user terminal 100 to reduce the delay between the establishment of the connection of the radio communication channel and the start of the communication with server apparatuses 300a and 300b. That is, the application programs in user terminal 100 can start communication quickly. Further, this reduces unnecessary communication requests to server apparatuses 300a and 300b compared with the polling method, thereby reducing the load on CPU 101 and the power consumption accordingly.

Additionally, in user terminal 100, a number of indications (including the beacon information indication, the scan result indication, the connection completion indication, and the completion indication for an IP address configuration) issued by the communication module control program are inputted to the connection status monitoring program, and the connection establishment is indicated from the connection status monitoring program to application program 1 and application program 2. This enables immediate indication of the connection establishment of the radio communication channel to each application program without changing the communication module control program, even when more application programs operate on CPU 101 and the number of the application programs is unknown. That is, the application programs in user terminal 100 can start communication quickly. Further, a number of indications issued by the communication module control program are not inputted to a number of application programs, and it is thus possible to reduce the load on CPU 101 and the power consumption when a number of application programs are operated.

Note that an indication interface of the communication module control program may be common to a control interface. This may cause unintended control from the application program when the application program is connected to the interface of the communication module control program. Thus, the conventional communication system configures a strict inspection for unintended operations to the communication module, to the program directly connected to the interface of the communication module control program, in some cases.

In this regard, the individual application programs are not directly connected to the communication module control program in the present embodiment, and this eliminates the unintended operations from the application programs to the communication module. This makes it possible to facilitate the inspection in the individual applications, and also facilitate introduction of new applications, so that a user can better utilize user terminal 100.

(Variation 1-1)

Figure 6:
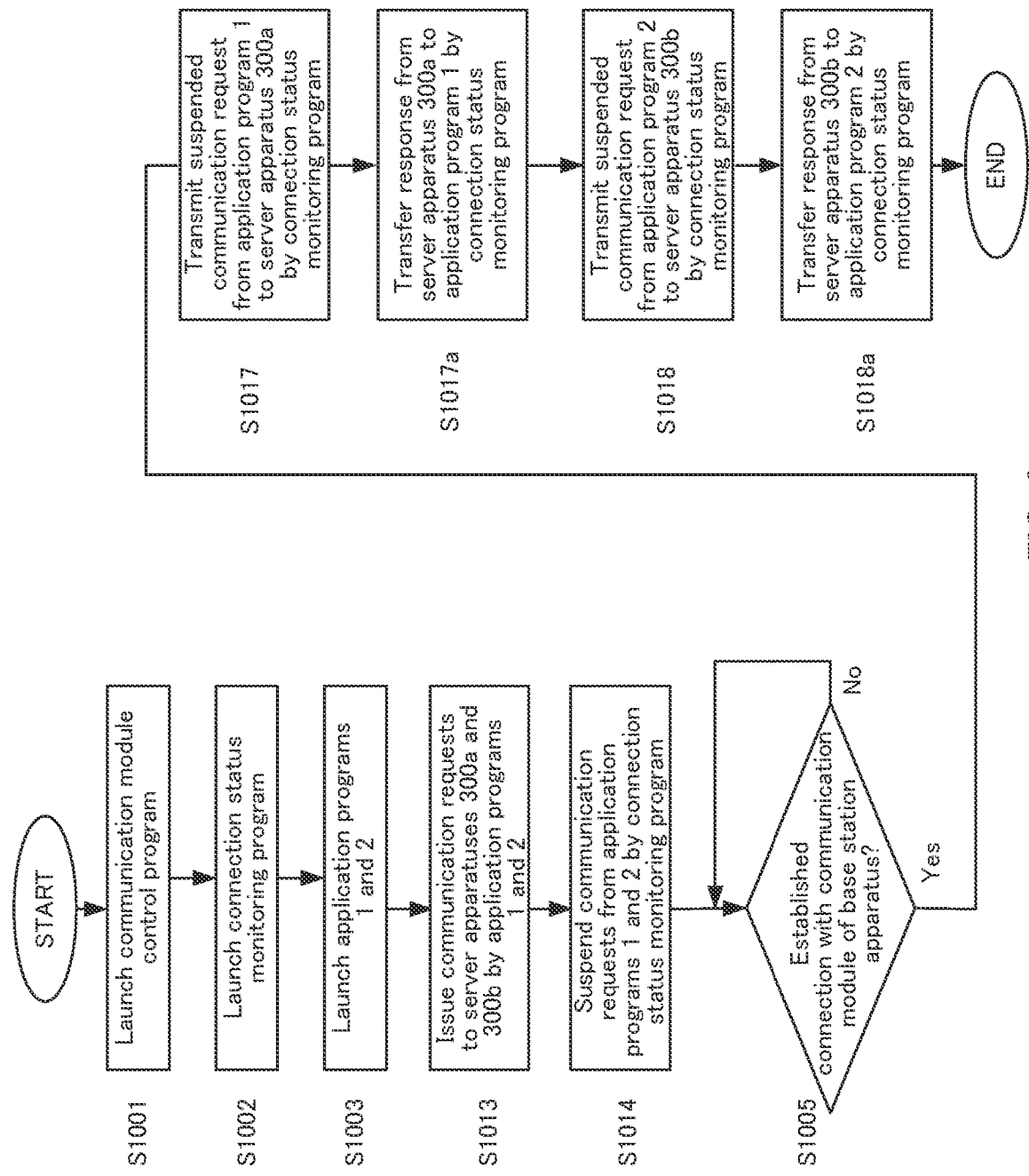
FIG. 6 is a flowchart describing an exemplary operation of a communication system according to Variation 1-1 of Embodiment 1 of the present disclosure.

FIG. 6 is a flowchart describing an exemplary operation of communication system 1000. FIG. 6 describes another exemplary procedure in which user terminal 100 establishes a radio communication channel with base station apparatus 200 and communicates with server apparatuses 300*a* and 300*b*. Note that, in FIG. 6, the same numbers are given to the steps common in FIG. 4, and descriptions thereof are omitted.

Application program 1 and application program 2 respectively transmit requests for communication with server apparatus 300*a* and server apparatus 300*b* to the connection status monitoring program. Note that application program 1 and application program 2 may configure the connection status monitoring program as a proxy server, and transmit the communication requests to server apparatus 300*a* and server apparatus 300*b*. Unlike in FIG. 4, application program 1 and application program 2 may issue the communication requests even when the validity of the connection of the radio communication channel is unknown. (step S1013)

CPU 101 suspends the communication requests from application program 1 and application program 2 using the connection status monitoring program (step S1014).

When communication module 102 establishes communication with communication module 202 of base station apparatus 200 (Yes in step S1005), CPU 101 transmits the suspended communication request from application program 1 to server apparatus 300*a* by the connection status monitoring program (step S1017).

The connection status monitoring program transfers a response from server apparatus 300*a* to application program 1 (step S1017*a*).

The connection status monitoring program transmits the suspended communication request from application program 2 to server apparatus 300*b* (step S1018).

The connection status monitoring program transfers a response from server apparatus 300*b* to application program 2 (step S1018*a*). Note that, in FIG. 6, the operation related to application program 2 may be omitted, and when there are three or more applications, the operation may be continuously performed after application program 2.

Figure 7:
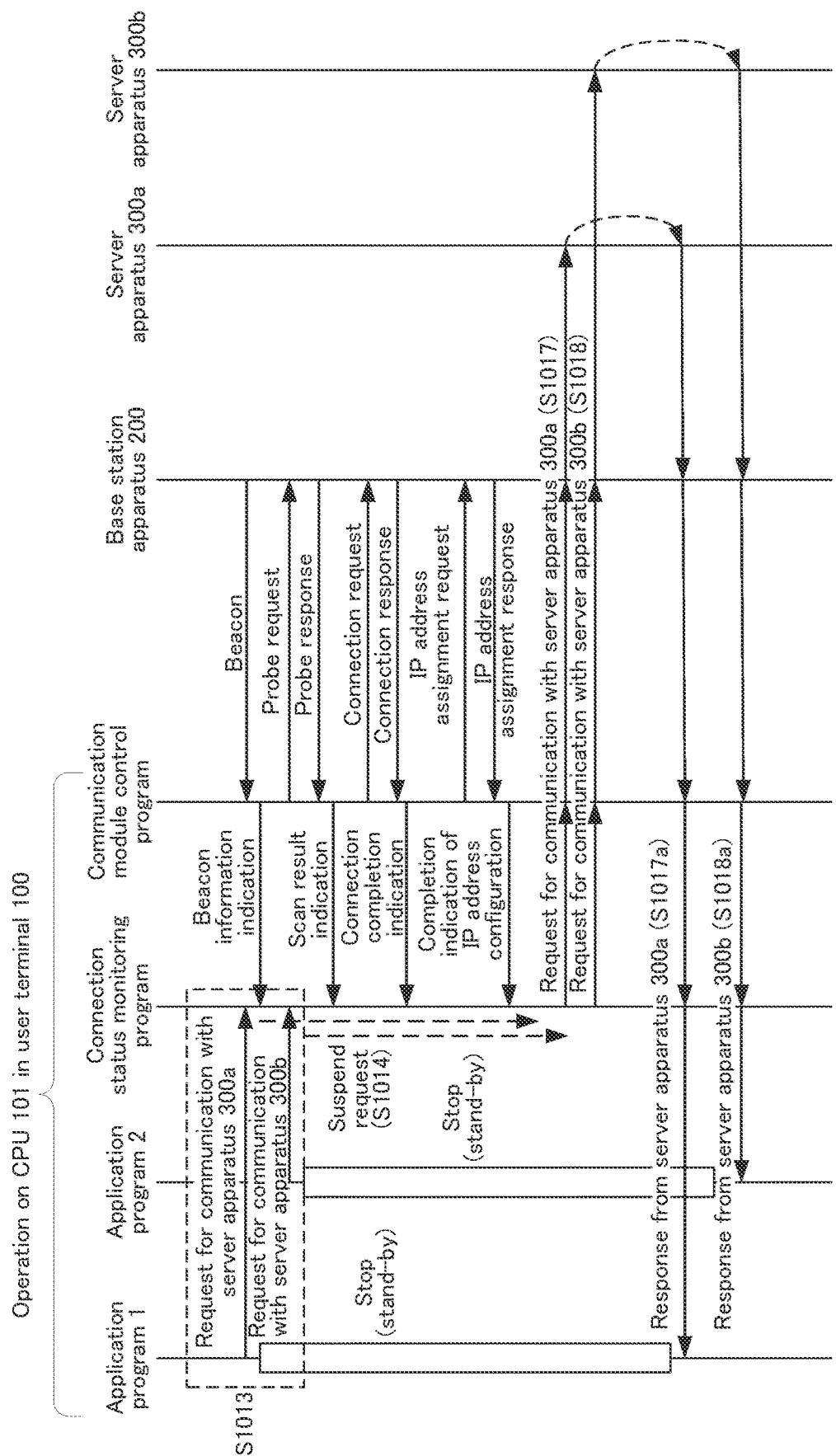
FIG. 7 a sequence diagram describing the exemplary operation of the communication system according to Variation 1-1 of Embodiment 1 of the present disclosure.

FIG. 7 is a sequence diagram describing the exemplary operation of communication system 1000. FIG. 7 provides a detailed description of the operation of user terminal 100 that operates as in FIG. 6 by describing the operation of each program operating on CPU 101 in user terminal 100 in detail. Note that the same processes as in FIG. 5 are not described in FIG. 7.

Application program 1 and application program 2 respectively transmit requests for communication with server apparatus 300*a* and server apparatus 300*b* to the connection status monitoring program. This operation corresponds to step S1013 in FIG. 6.

User terminal 100 suspends the communication requests from application program 1 and application program 2 using the connection status monitoring program. This operation corresponds to step S1014 in FIG. 6.

When communication module 102 receives the completion indication of the IP address configuration, user terminal 100 determines that the connection of the radio communication channel has been established (corresponding to step S1005 in FIG. 6), and transmits the suspended communication requests from application program 1 and application program 2 to server apparatuses 300*a* and 300*b* by the connection status monitoring program (corresponding to steps S1017 and S1018 in FIG. 6).

User terminal 100 transfers the responses from server apparatuses 300*a* and 300*b* to application program 1 and application program 2 respectively by the connection status monitoring program (corresponding to steps S1017*a* and S1018*a* in FIG. 6).

As described above, in user terminal 100, when the radio communication channel is not established, the communication requests to server apparatuses 300*a* and 300*b* are suspended by the connection status monitoring program, and the suspended communication requests are transmitted to server apparatuses 300*a* and 300*b* by the connection status monitoring program when the radio communication channel is established. This allows user terminal 100 to make the communication requests to server apparatuses 300*a* and 300*b* without any other processes after the connection of the radio communication channel is established, thereby reducing the delay before starting the communication with server apparatuses 300*a* and 300*b*. Further, this reduces unnecessary communication requests to server apparatuses 300*a* and 300*b* compared with the polling method, thereby reducing the load on CPU 101 and the power consumption accordingly.

In addition, user terminal 100 issues the communication requests without confirming whether the radio communication channel has been established by application program 1 and application program 2, and the issued communication requests are suspended by the connection status monitoring program until the radio communication channel is established. This eliminates the process of confirming the connection of the radio communication channel performed in each application, thereby reducing the load on CPU 101 and the power consumption.

(Variation 1-2)

Figure 8:
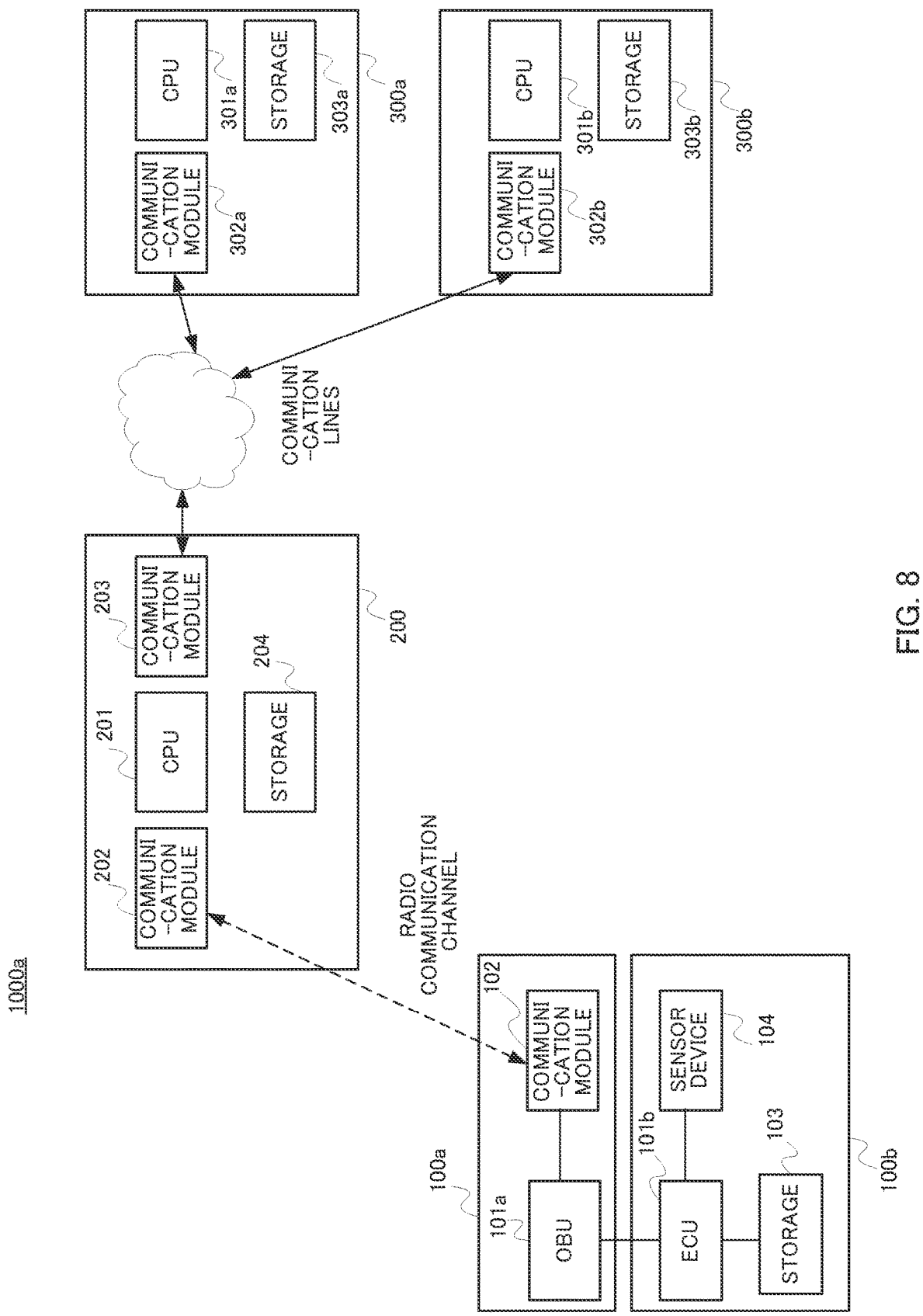
FIG. 8 illustrates an exemplary configuration of a communication system according to Variation 1-2 of Embodiment 1 of the present disclosure.

FIG. 8 illustrates an exemplary configuration of communication system 1000*a* that is different from the system in FIG. 1. Note that, in FIG. 8, the same reference signs are given to the same components as those in FIG. 1, and descriptions thereof are omitted.

User terminal 100a in FIG. 8 establishes a radio communication channel with base station apparatus 200. Application terminal 100b is connected to user terminal 100a, and communicates with server apparatuses 300a and 300b connected to base station apparatus 200 via communication lines. User terminal 100a and application terminal 100b may be mounted on, for example, vehicles, trains, vessels, airplanes, Unmanned Aerial Vehicles (UAVs), or drones. User terminal 100a and application terminal 100b may also be carried by a user.

User terminal 100a includes On Board Unit (OBU) 101a and communication module 102. Application terminal 100b includes ECU 101b, storage 103, and sensor device 104.

Electronic Control Unit (ECU) 101b is connected to sensor device 104, storage 103, and OBU 101a, and implements functions such as navigation, a safe driving assistance system, and an emergency braking system, for example. ECU 101b may include, for example, a Central Processing Unit (CPU), a micro-computer, a Digital Signal Processor (DSP), an artificial intelligence (AI) engine, a Field Programmable Gate Array (FPGA), an Application Specific Integrated Circuit (ASIC), a memory, and a peripheral device controller.

Sensor device 104 is, for example, a camera, a radar, Light Detection and Ranging (LiDAR), or an ultrasound sensor.

OBU 101a is connected to communication module 102 and controls communication module 102. OBU 101a may be connected to communication module 102 as an external module, or may incorporate communication module 102 as an internal module.

OBU 101a and ECU 101b are connected via an in-apparatus network (i.e., in-device network, intra-system network, or inter-apparatus network), which is referred to as an in-vehicle network, such as Ethernet (registered trademark), a Universal Serial Bus (USB), and a Controller Area Network (CAN).

Application terminal 100b executes application program 1 and application program 2 on ECU 101b, by way of example. User terminal 100a executes a communication module control program and a connection status monitoring program on OBU 101a.

For example, application terminal 100b inputs, to ECU 101b, information such as an image outside the vehicle acquired by sensor device 104, a distance to the preceding vehicle positioned by the radar, and a shape the vehicle. User terminal 100a inputs, to ECU 101b of application terminal 100b, information on traveling vehicles, pedestrians, structures, and fallen objects on the surrounding roads acquired by OBU 101a through the communication with server apparatus 300a using communication module 102. ECU 101b integrates the information inputted from OBU 101a and sensor device 104, and assists the braking control, accelerator control, and steering wheel control of the vehicle.

The procedures in FIGS. 4 to 7 are applicable even when the connection status monitoring program and the application programs are executed on different devices (OBU 101a and ECU 101b) respectively.

When a conventional user terminal performs the polling (see FIG. 3), for example, ECU 101b makes a request to OBU 101a via the in-vehicle network for each communication attempt. This increases the load and power consumption of ECU 101b, increases the load and power consumption of OBU 101a, and occupies the in-vehicle network, thereby reducing the bandwidth for ECU 101b to communicate with another device (e.g., sensor device 104).

User terminal 100a in FIG. 8 executes the connection status monitoring program on OBU 101a, and transmits the connection establishment indication to the application programs executed on ECU 101b of application terminal 100b using the procedures in FIGS. 4 and 5. Application terminal 100b can suspend the application programs until the connection establishment indication is received from user terminal 100a. This reduces the load and power consumption of ECU 101b of application terminal 100b, and reduces the bandwidth consumption on the in-vehicle network.

User terminal 100a in FIG. 8 executes the connection status monitoring program on OBU 101a, and suspends the communication requests from the application programs executed on ECU 101b of application terminal 100b using the procedures in FIGS. 6 and 7. This allows the application programs to transmit the communication requests to server apparatuses 300a and 300b regardless of whether communication module 102 has established the radio connection. The procedures in FIGS. 6 and 7 are different from the polling, and the application programs do not repeatedly transmit the communication requests (communication attempts) to server apparatuses 300a and 300b, thereby reducing the load and power consumption of ECU 101b and reducing the bandwidth consumption on the in-vehicle network.

Embodiment 2

The present disclosure relates to a radio communication apparatus and a radio communication method in Vehicle to Everything (V2X) communication. IEEE 802.11ad-2012 (Non Patent Literature 1) formulated by an IEEE 802.11 working group is a standard for high-speed communication using millimeter waves in the 60 GHz band.

The IEEE 802.11ad-2012 standard defines a plurality of modulation and coding schemes (MCSs). Low MCS numbers are used for communication with less errors, and high MCS numbers are used for communication with a high data rate. A radio communication apparatus exchanges information called a Supported MCS Set field with a radio communication apparatus of the communication destination, and selects the MCS supported by both the source radio communication apparatus and the destination radio communication apparatus for the communication.

The radio communication technology is mounted on automobiles, bicycles, trains, motorcycles, etc. (hereinafter referred to as "vehicles"), and used for communication between vehicles and everything, including inter-vehicle communication and vehicle-to-roadside communication (communication between vehicles and ground stations). Such a radio communication system is called a Vehicle to Everything (V2X) communication system.

Overhead increases, however, due to a change in a communication status in the V2X communication system using millimeter waves.

One non-limiting and exemplary embodiment facilitates providing a radio communication apparatus and a radio communication method that prevent the increase of overhead due to the change in the communication status in the V2X communication system using millimeter waves.

A radio communication apparatus according to an embodiment of the present disclosure includes: speed information acquisition circuitry, which, in operation, acquires information on a speed of a moving object with the radio communication apparatus mounted thereon; control circuitry, which, in operation, determines a first modulation and coding scheme (MCS) set available to the radio communication apparatus, and changes, when the speed of the moving object exceeds a threshold, the first MCS set to a second MCS set determined based on a data rate of transmission data of the radio communication apparatus; and radio circuitry, which, in operation, transmits the transmission data of the radio communication apparatus using an MCS selected from the second MCS set.

A radio communication method according to an embodiment of the present disclosure includes: determining a first modulation and coding scheme (MCS) set available to a radio communication apparatus; changing, when a speed of a moving object with the radio communication apparatus mounted thereon exceeds a threshold, the first MCS set to a second MCS set determined based on a data rate of transmission data of the radio communication apparatus; and transmitting the transmission data of the radio communication apparatus using an MCS selected from the second MCS set.

It should be noted that general or specific embodiments may be implemented as a system, an apparatus, a method, an integrated circuit, a computer program, a storage medium, or any selective combination thereof.

According to an embodiment of the present disclosure, it is possible to prevent the increase of overhead due to the change in the communication status in the V2X communication system using millimeter waves.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Hereinafter, embodiments of the present invention will be described in detail with reference to the drawings as appropriate. However, a detailed description more than necessary may be omitted, such as a detailed description of an already well-known matter and a duplicate description for a substantially identical configuration, to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

In the V2X communication system using millimeter waves, a position change and a direction change of a vehicle cause a sudden change in the communication status established by transmission/reception antenna patterns, transmit power control, and MCS selections. This may deteriorate the communication rate, or may cause a need for performing a procedure to improve the configuration of the communication, such as beamforming training, with high frequency, thereby increasing overhead.

Figure 9:
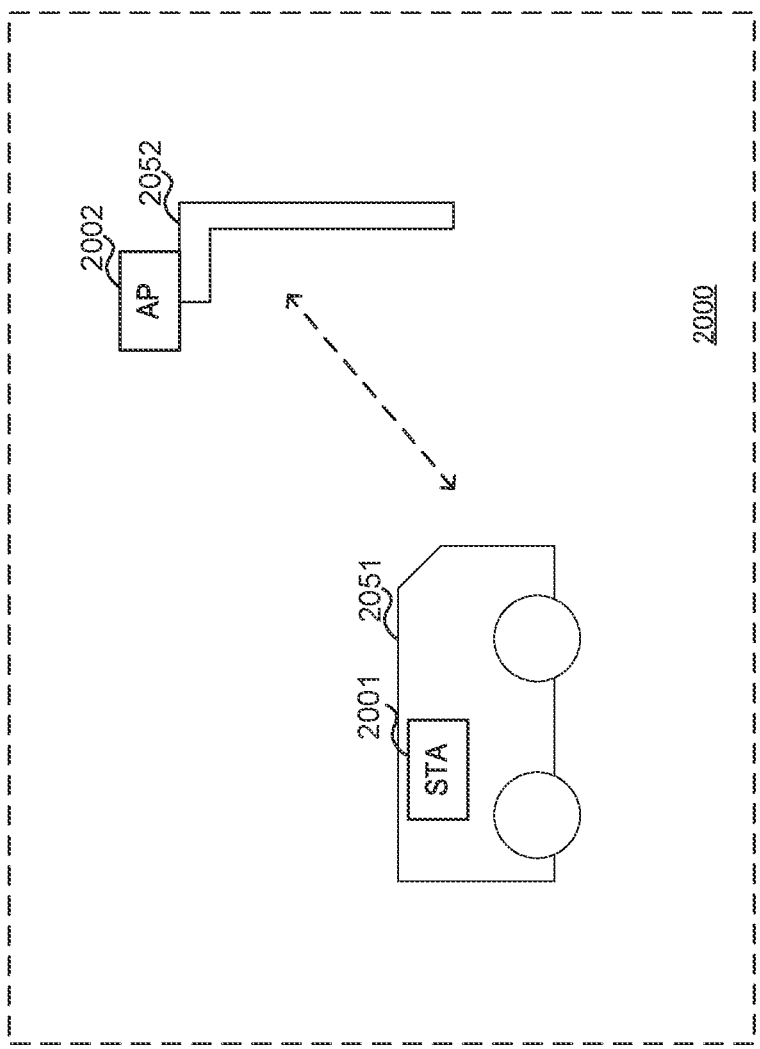
FIG. 9 illustrates an exemplary configuration of a communication system according to Embodiment 2 of the present disclosure.

FIG. 9 illustrates an exemplary configuration of communication system 2000 according to Embodiment 2 of the present disclosure. Communication system 2000 includes radio communication apparatus 2001 mounted on vehicle 2051, and radio communication apparatus 2002 mounted on roadside apparatus 2052. Radio communication apparatus 2001 communicates with radio communication apparatus 2002 when vehicle 2051 enters a communication area of radio communication apparatus 2002 mounted on roadside apparatus 2052. Note that vehicle (moving object) 2051 may be any of a four-wheel automobile, a motorcycle, a bicycle, a railway, a vessel, or an airplane.

By way of example, a description will be given with radio communication apparatus 2002 as an access point (AP) and radio communication apparatus 2001 as a non-access point (STA). However, radio communication apparatus 2001 may be an AP and radio communication apparatus 2002 may be an STA. In addition, neither radio communication apparatus 2001 nor radio communication apparatus 2002 is necessarily an AP, and the communication form may be a so-called Personal Basic Service Set (PBSS) where radio communication apparatus 2001 and radio communication apparatus 2002 perform peer-to-peer (P2P) communication.

Figure 10:
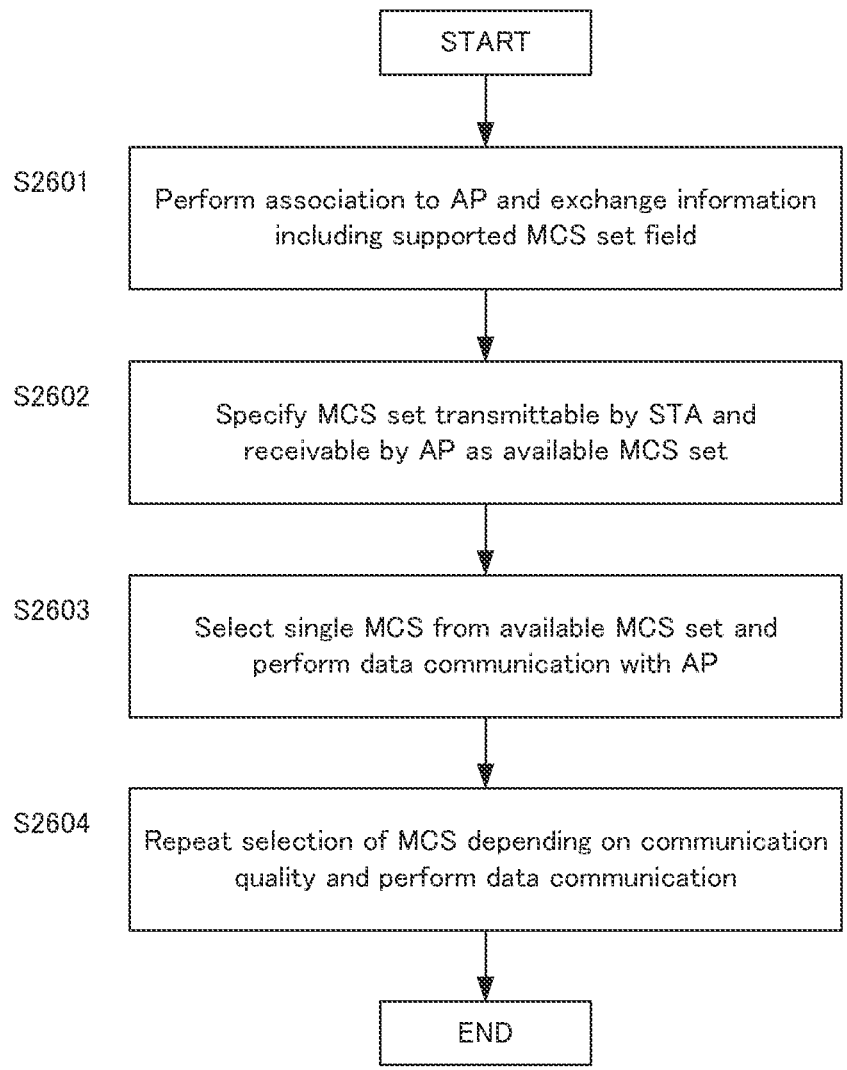
FIG. 10 is a flowchart describing an exemplary communication procedure of the communication system according to Embodiment 2 of the present disclosure.

FIG. 10 is a flowchart describing an exemplary communication procedure of communication system 2000 according to Embodiment 2 of the present disclosure. An exemplary procedure for radio communication apparatus 2001 (STA) to communicate with radio communication apparatus 2002 (AP) will be described with reference to FIG. 10.

In step S2601, radio communication apparatus 2001 performs association to radio communication apparatus 2002. In a step of the association, radio communication apparatus 2001 transmits information including a supported MCS set field to radio communication apparatus 2002. Likewise, radio communication apparatus 2002 transmits information including the supported MCS set field to radio communication apparatus 2001.

Herein, the supported MCS set field will be described. FIG. 11 illustrates an exemplary format of the supported MCS set field used in communication system 2000 according to Embodiment 2 of the present the present disclosure. FIG. 11 is disclosed in the IEEE 802.11ad-2012 standard. The supported MCS set field includes maximum SC Rx MCS sub field 2201, maximum orthogonal frequency division multiplexing (OFDM) Rx MCS sub field 2202, maximum SC Tx MCS sub field 2203, maximum OFDM Tx MCS sub field 2204, low-power SC PHY supported sub field 2205, code rate 13/16 sub field 2206, and reserved bits 2207.

Maximum SC Rx MCS sub field 2201 and maximum SC Tx MCS sub field 2203 respectively indicate the maximum receivable/transmittable MCS numbers in single carrier communication. Note that the MCS numbers used in the single carrier communication is 1 to 12 in the IEEE 802.11ad-2012 standard. The smaller (lower) the MCS number is, the lower the data rate is while the required S/N is lower. That is, smaller MCS numbers are likely to be used in an environment with high level of noise. The greater (higher) the MCS number is, the higher the data rate is while the required S/N is higher. That is, greater MCS numbers are likely to be used in an environment with less noise.

Maximum OFDM Rx MCS sub field 2202 and maximum OFDM Tx MCS sub field 2204 respectively indicate the maximum receivable/transmittable MCS numbers in OFDM communication. Note that the MCS numbers used in the OFDM communication is 13 to 24 in the IEEE 802.11ad-2012 standard. The smaller (lower) the MCS number is, the lower the data rate is while the required S/N is lower. The greater (higher) the MCS number is, the higher the data rate is while the required S/N is higher.

Low-power SC PHY supported sub field 2205 indicates whether a communication apparatus supports a low-power single carrier communication mode. Code rate 13/16 sub field 2206 indicates whether the communication apparatus supports a code rate 13/16 (i.e., MCSs 5, 9, 21, and 24).

By way of example, the supported MCS set field transmitted by radio communication apparatus 2001 includes maximum SC Rx MCS sub field 2201 with a value of 8, maximum OFDM Rx MCS sub field 2202 with a value of 17, maximum SC Tx MCS sub field 2203 with a value of 12, maximum OFDM Tx MCS sub field 2204 with a value of 17, low-power SC PHY supported sub field 2205 with a value of 0 (indicating not supporting the low-power single carrier communication mode), and code rate 13/16 sub field 2206 with a value of 0 (indicating not supporting the code rate 13/16). In this case, radio communication apparatus 2001 can receive from MCS 0 to MCS 8 excluding MCS 5 with the code rate 13/16 for the single carrier communication, and receive from MCS 13 to MCS 17 in the OFDM communication. In addition, radio communication apparatus 2001 can transmit from MCS 0 to MCS 12 excluding MCS 5 and MCS 9 with the code rate 13/16 in the single carrier communication, and transmit from MCS 13 to MCS 17 in the OFDM communication.

Note that MCS 0 is a communication mode called a control physical layer (PHY). MCS 0 to MCS 4 are always supported in IEEE 802.11ad-2012, and radio communication apparatuses 2001 and 2002 thus support reception and transmission from MCS 0 to MCS 4 regardless of the values of the supported MCS set field.

In step S2602 in FIG. 10, radio communication apparatus 2001 specifies a set of MCSs transmittable by radio communication apparatus 2001 and receivable by radio communication apparatus 2002 as an available MCS set, based on a set of MCSs supported by radio communication apparatus 2001 and the values of the supported MCS set field received from radio communication apparatus 2002.

In step S2603, radio communication apparatus 2001 selects one of the MCSs included in the available MCS set, and transmits a data packet generated with the selected MCS to radio communication apparatus 2002.

In step S2604, radio communication apparatus 2001 changes the MCS selected in step S2603 according to communication quality received from radio communication apparatus 2002, and transmits a data packet generated with the changed MCS to radio communication apparatus 2002. By way of example, radio communication apparatus 2001 changes the MCS to a higher MCS in the available MCS set when no packet error occurs within a certain period or in a certain number of consecutive transmissions of the data packets. In addition, radio communication apparatus 2001 changes the MCS to a lower MCS in the available MCS set when a packet error occurs in the transmitted data packet.

As another example in step S2604, radio communication apparatus 2001 may measure quality of radio link, such as received signal strength and an S/N ratio, and select an MCS in the available MCS set according to the quality of radio link.

In communication system 2000 in the V2X, however, radio communication apparatus 2001 moves at high speed, and thus it is difficult to select an appropriate MCS for each data transmission with the procedure of FIG. 10.

For example, radio communication apparatus 2001 controls the antenna directivity to improve the radio link with radio communication apparatus 2002 by the beamforming training, and thereby the quality of the radio link is deteriorated by the movement of vehicle 2051 (radio communication apparatus 2001) until the next beamforming training.

Since the beamforming training (BFT) takes a certain time, it is difficult to perform the BFT frequently because it causes interruption of the data communication and deterioration in the data rate. Thus, radio communication apparatus 2001 repeats the packet errors and the packet retransmission by the reselection of the lower MCSs in step S2604 until the next beamforming training, thereby causing unnecessary communication errors and the deterioration in the data rate.

Figure 12:
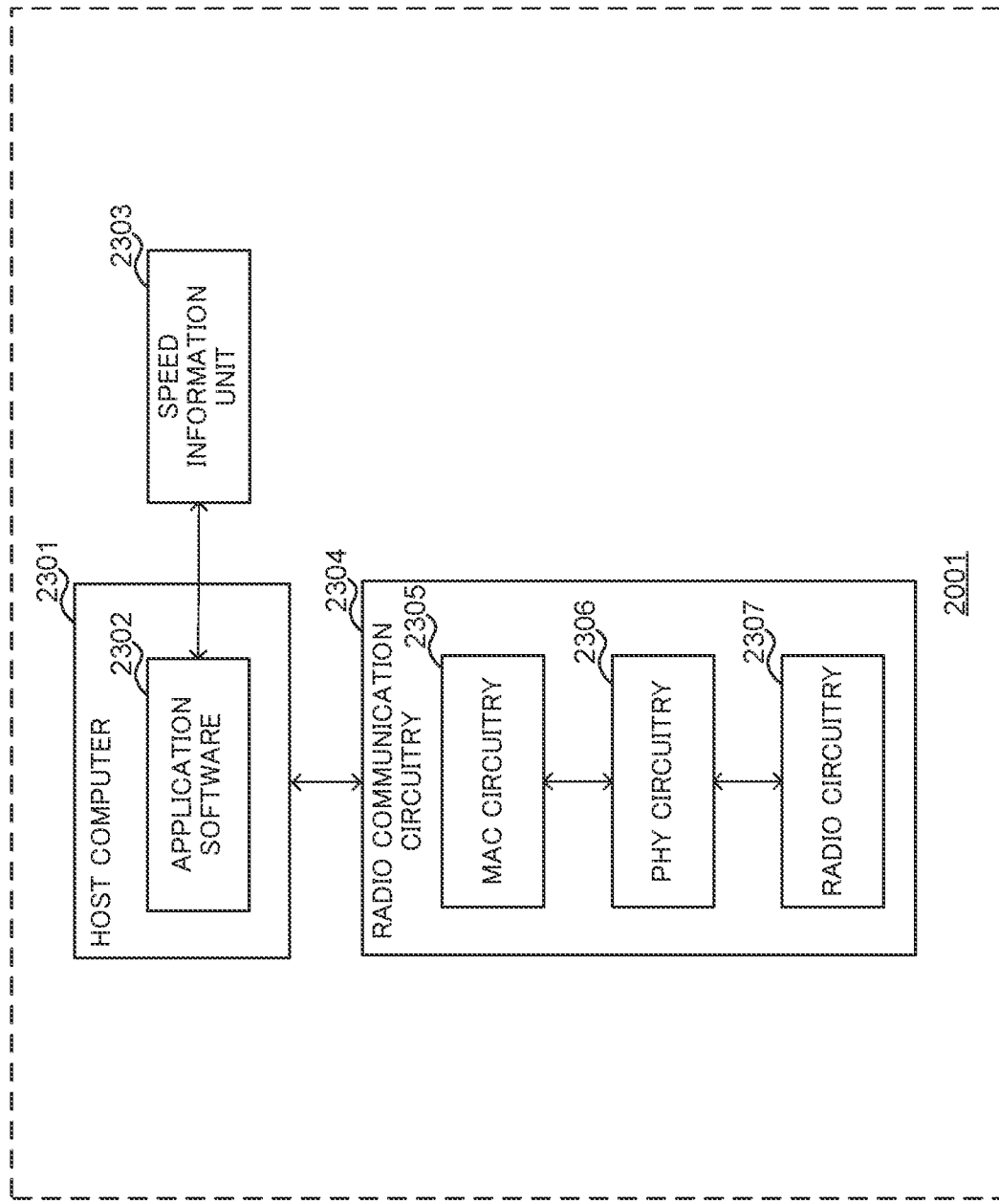
FIG. 12 illustrates an exemplary configuration of a radio communication apparatus according to Embodiment 2 of the present disclosure.

FIG. 12 illustrates an exemplary configuration of radio communication apparatus 2001 according to Embodiment 2. Radio communication apparatus 2001 includes host computer (control circuitry) 2301, speed information unit 2303, and radio communication circuitry 2304.

Speed information unit 2303 detects information such as speed, a position, and acceleration of vehicle 2051. Speed information unit (speed information acquisition circuitry) 2303 may include a speedometer, an accelerometer, a gyro, and a Global Navigation Satellite System (GNSS).

Host computer 2301 executes application software 2302. Application software 2302 inputs transmission data to radio communication circuitry 2304 and acquires reception data from radio communication circuitry 2304, in order to communicate with roadside apparatus 2052, and application software, server software, and a database which operate on the internet server (not illustrated) connected to roadside apparatus 2052.

Host computer 2301 also configures and controls radio communication circuitry 2304. For example, host computer 2301 launches and stops radio communication circuitry 2304, or configures a frequency channel to be used and the values of the supported MCS set field for radio communication circuitry 2304 by using management software (not illustrated) of the radio communication circuitry and application software 2302.

Radio communication circuitry 2304 includes MAC circuitry 2305, PHY circuitry 2306, and radio circuitry 2307. MAC circuitry 2305 transmits/receives data to/from host computer 2301. MAC circuitry 2305 forms a frame for the transmission data inputted from host computer 2301 by adding a MAC header and a checksum, and inputs the data to PHY circuitry 2306. MAC circuitry 2305 also performs configuration for PHY circuitry 2306, such as a configuration of the MCS to be used for each data transmission and execution of the beamforming procedure. Functionality of the MAC is specified in the IEEE 802.11ad-2012 standard.

PHY circuitry 2306 encodes and modulates the transmission MAC frame data inputted from MAC circuitry 2305, and inputs the data to radio circuitry 2307. PHY circuitry 2306 also demodulates and decodes a reception signal inputted from radio circuitry 2307, and inputs the signal to MAC circuitry 2305.

Radio circuitry 2307 converts the signal inputted from PHY circuitry 2306 to a high-frequency signal (radio signal) of the 60 GHz band, and transmits the signal from a transmit antenna (not illustrated). Radio circuitry 2307 also converts a radio signal of 60 GHz band inputted from a receive antenna (not illustrated) to a baseband signal, and inputs the signal to PHY circuitry 2306.

Figure 13:
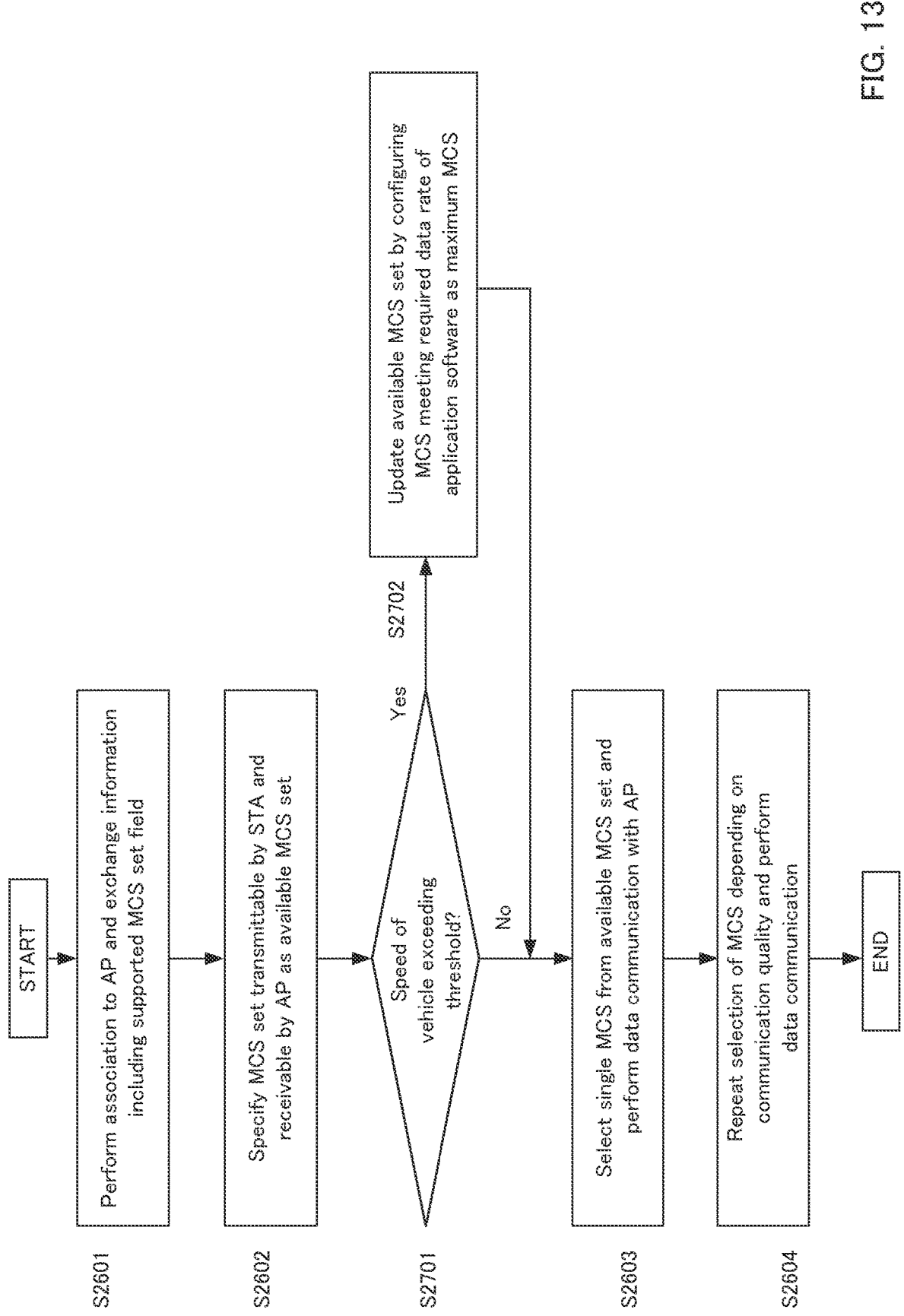
FIG. 13 is a flowchart describing another exemplary communication procedure of the communication system according to Embodiment 2 of the present disclosure.

FIG. 13 is a flowchart describing another exemplary communication procedure in communication system 2000. Note that, in FIG. 13, the same numbers are given to the steps common in FIG. 10, and descriptions thereof are omitted.

In FIG. 13, step S2701 follows step S2602. In step S2701, speed information unit 2303 of radio communication apparatus 2001 acquires speed information of vehicle 2051, and indicates the speed information to host computer 2301. Host computer 2301 determines whether the speed of vehicle 2051 exceeds a predetermined threshold.

Note that host computer 2301 may acquire the speed information of a communication counterpart (e.g., roadside apparatus 2052) through radio communication circuitry 2304 or other communication circuitry (not illustrated), calculate a relative velocity between the communication counterpart and vehicle 2051 by comparing the speed information of the communication counterpart with the speed information of vehicle 2051 obtained from speed information unit 2303, and determine whether the relative velocity exceeds a threshold.

Roadside apparatus 2052 may indicate, to radio communication apparatus 2001 in step S2601, information indicating that radio communication apparatus 2002 is installed in roadside apparatus 2052. In this case, host computer 2301 may determine that the moving speed of radio communication apparatus 2002 is 0, and determine the speed of vehicle 2051 obtained from speed information unit 2303 as the relative velocity between roadside apparatus 2052 and vehicle 2051.

In addition, radio communication apparatus 2002 may indicate, to radio communication apparatus 2001 in step S2601, a mobility level of an apparatus (e.g., a roadside apparatus or a vehicle) in which radio communication apparatus 2002 is installed. When radio communication apparatus 2002 is installed in a fixed facility such as roadside apparatus 2052, the mobility level is "fixed". When radio communication apparatus 2002 is carried by a pedestrian (not illustrated), the mobility level is "pedestrian". When radio communication apparatus 2002 is mounted on an automobile (not illustrated) or a bus (not illustrated), the mobility level is "automobile" or "bus".

When the mobility level of the communication counterpart is "fixed", host computer 2301 may determine the speed of vehicle 2051 obtained from speed information unit 2303 in step S2701 as the relative velocity between roadside apparatus 2052 and vehicle 2051.

When the mobility level of the communication counterpart is "pedestrian", host computer 2301 may determine in step S2701 that the moving speed of the communication counterpart is at most 10 km/h, and determine a value obtained by adding 10 km/h to the speed of vehicle 2051 obtained from speed information unit 2303 as the relative velocity between roadside apparatus 2052 and vehicle 2051.

When the mobility level of the communication counterpart is "automobile" or "bus", host computer 2301 may calculate the relative velocity by acquiring the speed information of the communication counterpart using radio communication circuitry 2304 or other communication circuitry (not illustrated) in step S2701. In a case where the speed information of the communication counterpart is not acquired and the speed of the communication counterpart is unknown, host computer 2301 may use an assumed average speed corresponding to the mobility level such as "automobile" and "bus" in step S2701. For example, the assumed average speed of "automobile" may be specified as 60 km/h, and that of "bus" as 40 km/h.

The mobility level does not change frequently while the moving speed is frequently changeable, and thus the communication frequency for acquiring the moving speed of the communication counterpart can be reduced by acquiring the mobility level instead of the moving speed of the communication counterpart.

On the determination of Yes in step S2701, host computer 2301 performs the process of step S2702. In step S2702, host computer 2301 updates the available MCS set by configuring an MCS that meets a required data rate of application software 2302 to be the maximum MCS. Step S2603 follows step S2702.

Note that, in step S2604, radio communication apparatus 2001 changes the MCS selected in step S2603 according to the communication quality received from radio communication apparatus 2002, and transmits a data packet generated with the changed MCS to radio communication apparatus 2002. When the moving speed of vehicle 2051 changes, radio communication apparatus 2001 may go back to step S2602, restore the available MCS set to the initial values, and perform the determination of step S2701 based on the changed moving speed.

By way of example, the application downloads data including media files such as music and videos, map information, and software update program information (over the air (OTA) software update). Such application software 2302 is referred to as data transfer software.

The data transfer software may download data from radio communication apparatus 2002 and upload data to radio communication apparatus 2002.

A capacity of data downloaded by the data transfer software (referred to as a required data capacity) is 1 GByte, for example, and radio communication apparatus 2001 determines the required data rate so as to complete the communication for the required data capacity while passing through the communication area of roadside apparatus 2052.

By way of example, when the communication area of roadside apparatus 2052 has a radius of R [meters], the required data capacity is D [GBytes] (8×D [Gbits]), and the speed of vehicle 2051 is v [km/h] (v×1000/60² [m/s]), required data rate B [Gbps] is calculated by Equation 1:

$$B = 8 \times D / (R / (v \times 1000 / 60^2)) = (8000 / 3600) \times D \times v / R. \quad \text{(Equation 1)}$$

When communication area R of roadside apparatus 2052 is 200 meters, required data capacity D is 1 Gbyte, and speed v of vehicle 2051 is 60 km/h, for example, required data rate B is approximately 0.667 Gbps (667 Mbps) according to Equation 1.

In IEEE 802.11ad-2012, the maximum data rate of MCS 1 is 385 Mbps and the maximum data rate of MCS 2 is 770 Mbps, and thus MCS 2 or a higher MCS is selected to meet the required data rate of 667 Mbps. In step S2702, host computer 2301 then determines MCS 2 as the MCS meeting the required data rate of application software 2302.

Note that the data rate for each MCS in IEEE 802.11ad-2012 is a data rate at an MAC Service Access Point (SAP), i.e., an interface rate between a physical layer and a MAC layer, and the actual data rate in an application layer is deteriorated by overhead of higher layers such as the MAC layer, an IP layer, and a TCP layer. Thus, host computer 2301 may define a value obtained by multiplying the value of B calculated from Equation 1 by 1.2 to 1.3 as the required data rate, and determine the MCS that meets the required data rate. The overhead of the higher layers includes addition of header information to a frame, retransmission due to a frame error, and transmission suspension due to detection of an interface conflict.

As another example, application software 2302 streams videos. In this case, required service qualities, such as a resolution of 1080 p and 30 frames per second, are specified, and a required data rate according to a video codec system is determined. By way of example, the data rate of the video codec is 1 Gbps.

In step S2702, host computer 2301 determines the MCS that meets the required data rate of application software 2302, and updates the available MCS set by configuring the MCS that meets the required data rate to be the maximum MCS.

For example, when the values of the available MCS set determined in step S2602 are MCS 0 to MCS 9 and the MCS that meets the required data rate determined in step S2702 is MCS 2, host computer 2301 determines the values of the available MCS set as 0, 1, and 2 in step S2702. Note that the available MCS set need not be changed when the MCSs in the available MCS set determined in step S2602 are lower than the MCS that meets the required data rate determined in step S2702.

Incidentally, radio communication apparatus 2001 mounted on vehicle 2051 has a low error rate even with a higher MCS in the central area of the communication area of roadside apparatus 2052 (e.g., within 50 meters from roadside apparatus 2052). Thus, the MCSs configured in step S2601 (MCS 0 to MCS 12 for the single carrier communication, and MCS 13 to MCS 17 for the OFDM communication) may be selected instead of the MCSs reconfigured in step S2702, which are MCS 0 to MCS 2.

The procedure proceeds to step S2603 when it is determined to be No in step S2701. In step S2603, host computer 2301 selects a single MCS from the available MCS set, and communicate with radio communication apparatus 2002.

As described above, the quality of radio link changes frequently in the V2X communication, and the selection of a higher MCS increases a probability of packet errors. When the packet error occurs, MAC circuitry 2305 selects a lower MCS and performs retransmission, thus occupying the radio resource and deteriorating the average data rate.

Radio communication apparatus 2001 reconfigures the MCS meeting the required data rate of application software 2302 as the maximum MCS in step S2702, when the speed of vehicle 2051 exceeds a threshold, or when the relative velocity between vehicle 2051 and roadside apparatus 2052 exceeds a threshold. This prevents MAC circuitry 2305 from selecting an MCS higher than the MCS that meets the required data rate in step S2603 even when the communication quality is temporarily good, thereby preventing increase of overhead due to frequent BFTs, reducing the probability of packet error occurrence, and making it easy to maintain the average data rate for executing application software 2302.

Note that radio communication apparatus 2001 (MAC circuitry 2305) selects an MCS lower than the MCS that meets the required data rate when the radio link has a poor quality and it is difficult to communicate using the MCS meeting the required data rate.

In a case where application software 2302 is data transfer software, radio communication apparatus 2001 may complete a part of the required data transfer in the communication with radio communication apparatus 2002 by selecting an MCS lower than the MCS that meets the required data rate, and perform the rest of the required data transfer in the communication with another communication apparatus (not illustrated) mounted on a roadside apparatus different from roadside apparatus 2052 (not illustrated) when entering a communication area of the different roadside apparatus.

When application software 2302 streams videos, radio communication apparatus 2001 may select an MCS lower than the MCS that meets the required data rate, and continue the communication with lower video streaming quality. For example, application software 2302 may change the resolution from 1080 p to 720 p, and continue the image data streaming.

Radio communication apparatus 2001 skips step S2702 and uses all the selectable MCSs when the speed of vehicle 2051 does not exceed a threshold (No in step S2701), or when the relative velocity between vehicle 2051 and roadside apparatus 2052 does not exceed a threshold (No in step S2701), thereby improving the data rate. This enables, for example, reduction of power consumption by completing the processing of application software 2302 earlier, or enables simultaneous execution of application software 2302 and a plurality of other applications (not illustrated) using a large data rate band.

Note that host computer 2301 may once perform the determination process of step S2701 when performing initial connection with radio communication apparatus 2002 of roadside apparatus 2052 (step S2601). In addition, host computer 2301 may perform the determination process of step S2701 each time application software 2302 makes a communication request. Further, host computer 2301 may perform the determination process of step S2701 at predetermined intervals even after radio communication apparatus 2001 performs the processes of steps S2603 and S2604.

Note that, when the available MCS set is changed in step S2702, radio communication apparatus 2001 may transmit, to radio communication apparatus 2002, the supported MCS set field with the updated maximum MCS values in maximum SC Rx MCS subfield 2201 and maximum OFDM Rx MCS subfield 2202. This reduces packet errors not only for transmission from radio communication apparatus 2001, but also for transmission from radio communication device 2002.

When a plurality of applications (including application software 2302; other applications not illustrated) are operated in host computer 2301, host computer 2301 may perform the process of step S2702 using the sum of the required data rates of the applications as the required data rate. This allows host computer 2301 to meet the required data rates of the plurality of applications even when the speed exceeds a threshold.

Further, when a plurality of applications are operated in host computer 2301, host computer 2301 may perform the process of step S2702 using the maximum value of the required data rates of the applications as the required data rate. This enables meeting the required data rate of at least one of the applications when the speed exceeds a threshold.

The present disclosure is suitable for the V2X communication.

Embodiment 3

The present disclosure relates to a radio communication system, a base station, a moving object, and a radio communication method.

Studies have been carried out on a technique in which a moving object such as a vehicle stores data acquired through a sensor in its storage device, and a base station collects the data stored in the storage device of the moving object using radio communication. For example, PTL 1 discloses a technique of controlling data reception from a moving object by a base station according to free space on a storage device of the base station.

The moving object transmits data stored in its storage device to the base station, and deletes the data after the transmission. This increases free space on the storage device, and allows the moving object to acquire and store new data in the storage device. Lack of the free space on the storage device of the moving object makes it difficult for the moving object to acquire new data, thus possibly deteriorating continuity of data acquisition.

One non-limiting and exemplary embodiment facilitates providing a technique for improving continuity of data acquisition by a moving object in a system of transmitting data stored in a storage device of the moving object to a base station.

A radio communication system according to an embodiment of the present disclosure includes: a moving object that includes a storage for accumulating data, and performs radio transmission of information on free space on the storage and of at least part of the accumulated data; and a base station that controls a timing of the radio transmission, by the moving object, of the at least part of the accumulated data based on the received information.

It should be noted that general or specific embodiments may be implemented as a system, an apparatus, a method, an integrated circuit, a computer program, a storage medium, or any selective combination thereof.

According to the present disclosure, it is possible to improve the continuity of data acquisition by the moving object.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Hereinafter, embodiments of the present invention will be described in detail with reference to the drawings as appropriate. However, a detailed description more than necessary may be omitted, such as a detailed description of an already well-known matter and a duplicate description for a substantially identical configuration, to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

Common components in the drawings are denoted by the same reference signs. In addition, reference signs such as "vehicle 3102A" and "vehicle 3102B" are sometimes used for description distinguishing elements of the same type, and a common number of the reference signs such as "vehicle 3102" is sometimes used for description without distinguishing elements of the same type.

<Consideration>

Studies have been conducted on a technique for collecting a large amount of sensor data from vehicles in order to improve a development environment for automatic driving of vehicles and to develop services by analyzing various driving data.

Examples of the large amount of the sensor data include:
Video data captured by cameras provided inside and/or outside a vehicle;
Sensing data acquired by sensors such as a radar, Light Detection and Ranging (LiDAR), a sonar, and an acceleration sensor;
Position data from a Global Positioning System (Global Positioning Satellite: GPS);
Operation data of a steering wheel, an accelerator, a brake, etc.; and
Status data indicating a status of an engine, a motor, a battery, etc.

Note that the sensor data is not limited to be collected from vehicles for testing, and it is considered to collect the sensor data accumulated in many vehicles, such as passenger cars and buses in operation.

A method of collecting the sensor data accumulated in vehicles includes a method of physically collecting the storage devices of the vehicles. The method of collecting the sensor data accumulated in the vehicles also includes a method of collecting the sensor data using wide area radio communication represented by cellular communication (e.g., mobile phones). The former may cause physical failures and takes time and effort, and it is thus impractical in a case of a large number of vehicles. The latter is slower in a communication rate than local radio communication to be described later, and costs according to the amount of communication data.

In this regard, use of high-speed local radio communication such as Dedicated Short Range Communication (DSRC) or a wireless Local Area Network (LAN) is considered as a method of collecting sensor data accumulated in vehicles. For example, operation in a millimeter-wave band enables high-speed radio communication compared with operation in a microwave band.

IEEE 802.11ad (sometimes referred to as WiGig) is a radio communication system using the 60 GHz band, which is a millimeter-wave band, and can realize high-speed radio transmission with an effective speed exceeding 1 Gbps. The local radio communication such as the DSRC or the wireless LAN has a communication distance of tens to hundreds of meters. In a case of using a millimeter-wave band, the propagation loss is larger than a case of using a microwave band, and it is difficult to expand the communication distance.

Thus, when the large amount of data is collected using the local radio communication with the communication distance shorter than the above-mentioned wide area radio communication, the base station is considered to be provided at a specified location, for example, at an intersection or a parking lot for vehicles as passenger cars, or at a bus garage for buses. Then, vehicles are considered to transmit the accumulated sensor data to the base station when entering a coverage area of the base station.

The radio communication resource for the local radio communication is finite. Thus, simultaneous communication by a plurality of vehicles may deteriorate the communication rate for each vehicle. When the number of radio connections is limited, however, some vehicles may have connection difficulty.

In addition, passenger cars and buses in operation possibly have time constraints due to the schedules, for example. That is, the vehicles have limited time to stay in the coverage area in some cases. This sometimes makes it difficult for the base station to complete the collection of the data accumulated in the vehicles while the vehicles are in the coverage area.

Meanwhile, a capacity of the storage device included in the vehicle is also finite. Thus, failure of transferring the accumulated data to the base station causes lack of free space on the storage device, and the vehicle has difficulty in acquiring new data in some cases.

In the present disclosure, a description will be given of an embodiment of controlling data transmission from a vehicle to a base station in accordance with free space on a storage device of the vehicle, in a radio communication system in which the base station collects data from the vehicle using radio communication. This makes the storage device of the vehicle less likely to lack the free space. The vehicle is thus less likely to fail to store data due to the lack of free space in the storage device, thereby continuously acquiring and storing data.

<Configuration of Radio Communication System>

Figure 14:
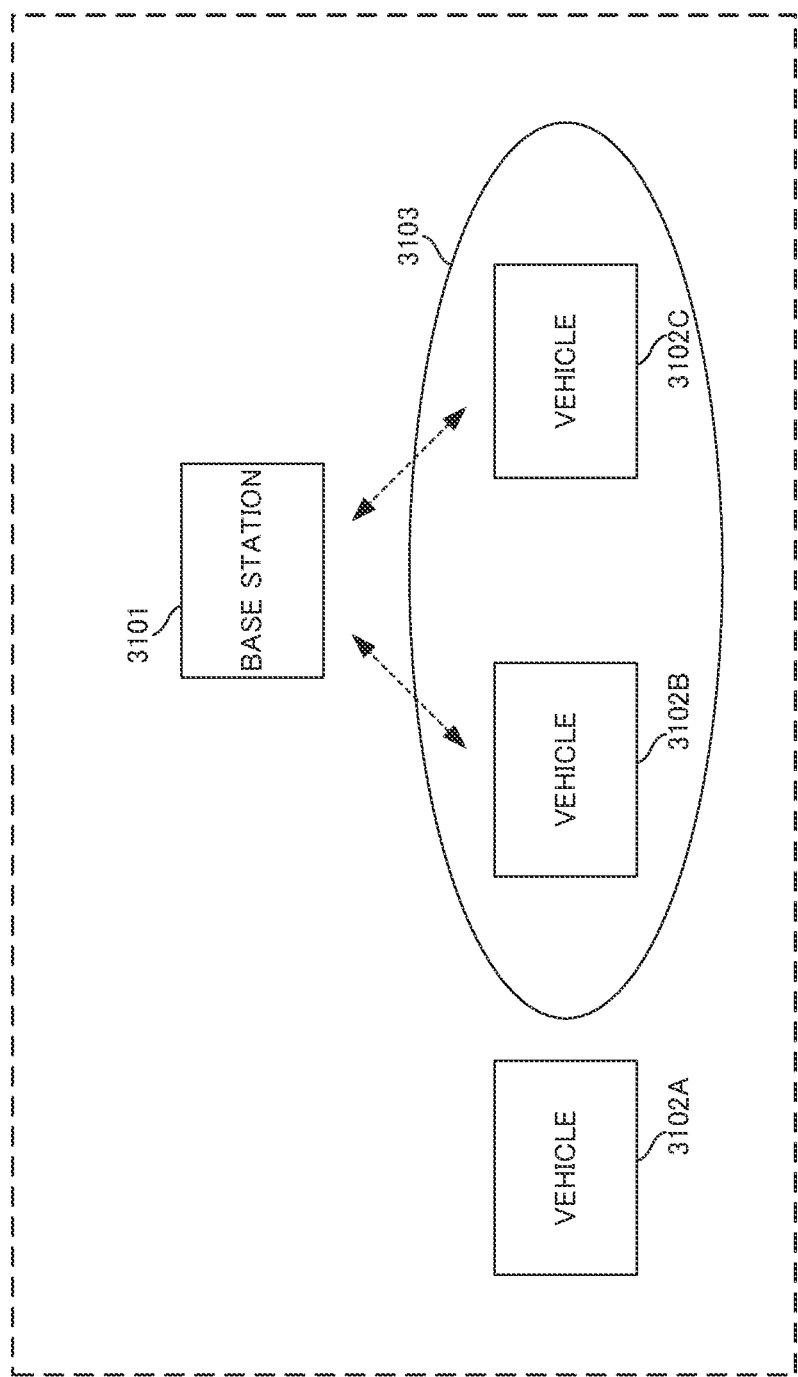
FIG. 14 illustrates an exemplary radio communication system according to Embodiment 3.

FIG. 14 illustrates an exemplary radio communication system according to Embodiment 3. The radio communication system is a system in which a base station collects sensor data acquired by a vehicle, which is an example of a moving object.

As illustrated in FIG. 14, the radio communication system includes base station 3101 and vehicles 3102A, 3102B, and 3102C. Note that there may be a plurality of base stations 3101. Also, there may be a single vehicle 3102 or a plurality of vehicles 3102.

Vehicle 3102 includes a data acquisition device that acquires sensor data (not illustrated). The data acquisition device acquires the sensor data from, for example, sensors, cameras, and devices connected to an in-vehicle network. The sensor data includes sensing data, video data, control data, and status data, for example.

Base station 3101 collects the sensor data from vehicle 3102, and accumulates and analyzes the collected sensor data.

Base station 3101 and vehicle 3102 are connected by radio communication in coverage area 3103. Vehicle 3102 may transmit the sensor data to base station 3101 using the radio communication. Base station 3101 may transmit a control signal to vehicle 3102 using the radio communication.

Vehicle 3102 acquires the sensor data not only in coverage area 3103 but also outside coverage area 3103. Vehicle 3102 transmits the sensor data to base station 3101 when locating in coverage area 3103 of base station 3101. Vehicle 3102 may delete, from a storage, the sensor data that has been transmitted. Alternatively, vehicle 3102 may configure the sensor data, which has been transmitted, in the storage so that the sensor data can be overwritten. This secures free space on the storage, and vehicle 3102 can continuously acquire the sensor data outside coverage area 3103 accordingly.

Figure 15:
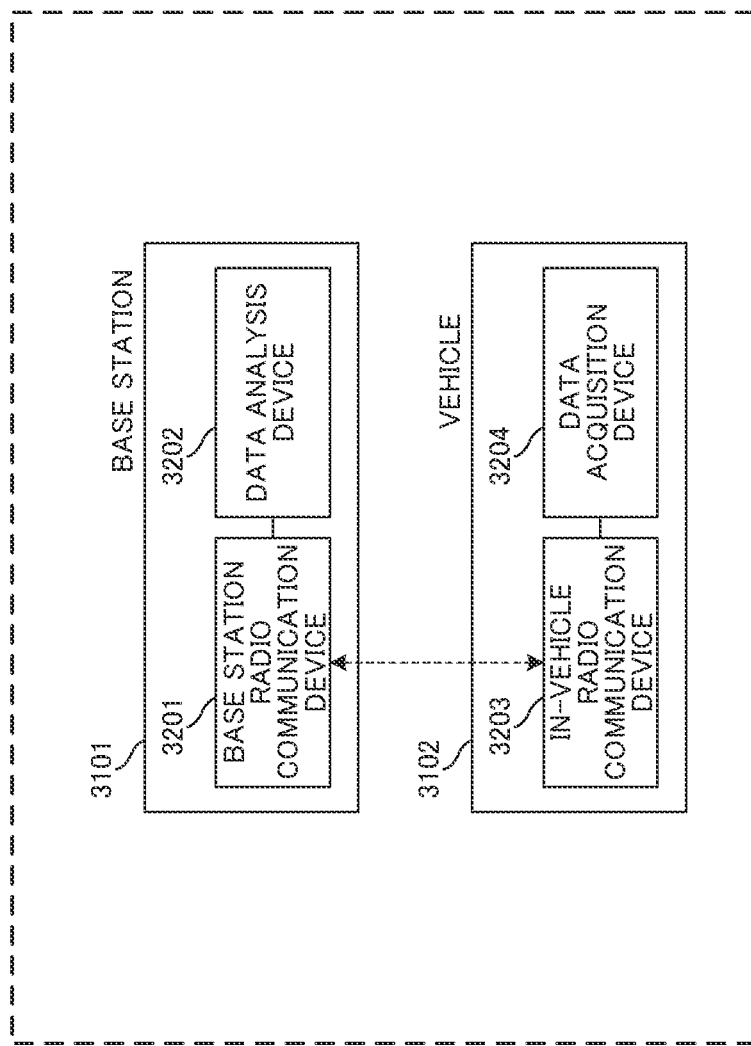
FIG. 15 is a block diagram illustrating an exemplary configuration of the radio communication system according to Embodiment 3.

FIG. 15 is a block diagram illustrating an exemplary configuration of the radio communication system according to Embodiment 3.

As illustrated in FIG. 15, base station 3101 includes base station radio communication device 3201 and data analysis device 3202.

Base station radio communication device 3201 is connected to vehicle 3102 located in coverage area 3103 by radio communication. Base station radio communication device 3201 receives a transmission request indication, sensor data, and a transmission completion indication from vehicle 3102. Base station radio communication device 3201 transmits a communication indication, which is an exemplary control signal, to vehicle 3102. Base station radio communication device 3201 transmits the sensor data acquired from vehicle 3102 to data analysis device 3202.

Data analysis device 3202 accumulates and analyzes the sensor data.

As illustrated in FIG. 15, vehicle 3102 includes in-vehicle radio communication device 3203 and data acquisition device 3204.

In-vehicle radio communication device 3203 receives the sensor data from data acquisition device 3204. In-vehicle radio communication device 3203 transmits the transmission request indication, the sensor data, and the transmission completion indication to base station 3101. In-vehicle radio communication device 3203 receives the communication indication from base station 3101.

Data acquisition device 3204 acquires the sensor data, and transmits the sensor data to in-vehicle radio communication device 3203.

Figure 16:
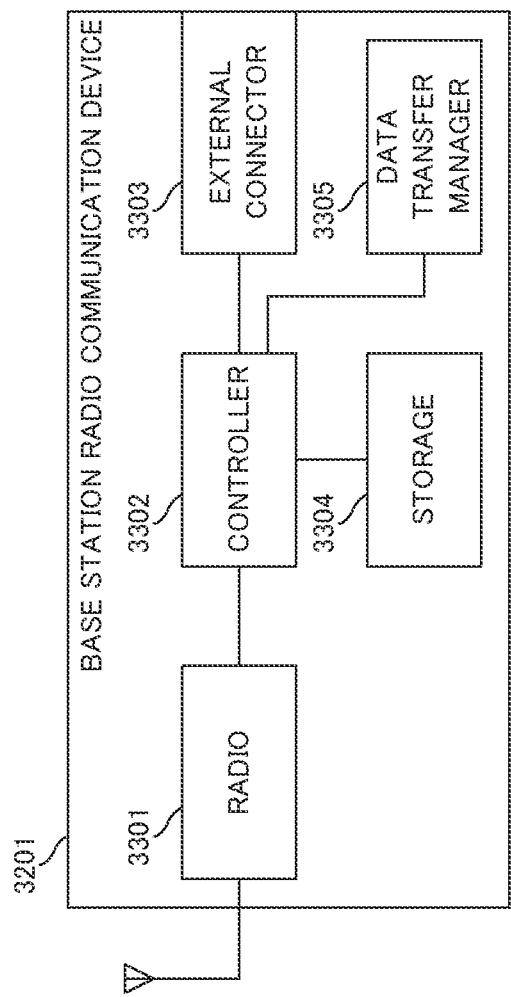
FIG. 16 is a block diagram illustrating an exemplary configuration of a base station radio communication device according to Embodiment 3.

FIG. 16 is a block diagram for base station radio communication device 3201 according to Embodiment 3.

As illustrated in FIG. 16, base station radio communication device 3201 includes radio 3301, controller 3302, external connector 3303, storage 3304, and data transfer manager 3305.

Radio 3301 connects a radio link with vehicle 3102 by radio communication. Radio 3301 receives the sensor data, the transmission request indication, and the transmission completion indication from vehicle 3102. Radio 3301 transmits the communication indication to vehicle 3102.

Controller 3302 controls connection and disconnection of the radio link with vehicle 3102 by radio 3301. Controller 3302 controls reception of the transmission request indication, the sensor data, and the transmission completion indication. Controller 3302 controls transmission of the communication indication. Controller 3302 controls writing and reading of data for storage 3304. Controller 3302 controls communication with data analysis device 3202 through external connector 3303.

External connector 3303 is connected to data analysis device 3202, and transmits the sensor data accumulated in storage 3304 to data analysis device 3202.

Storage 3304 stores the sensor data and communication control DB.

Data transfer manager 3305 creates and/or updates the communication management DB based on the transmission request indication and the transmission completion indication transmitted from vehicle 3102. Data transfer manager 3305 calculates communication priorities on the sensor data between the vehicle and the base station based on the communication management DB. Data transfer manager 3305 generates the communication indication for controlling the communication of the sensor data based on the calculation results of the priorities. Data transfer manager 3305 updates the communication management DB based on the calculation results of the priorities and the communication indication. Note that the operation of data transfer manager 3305 may be controlled by controller 3302.

Figure 17:
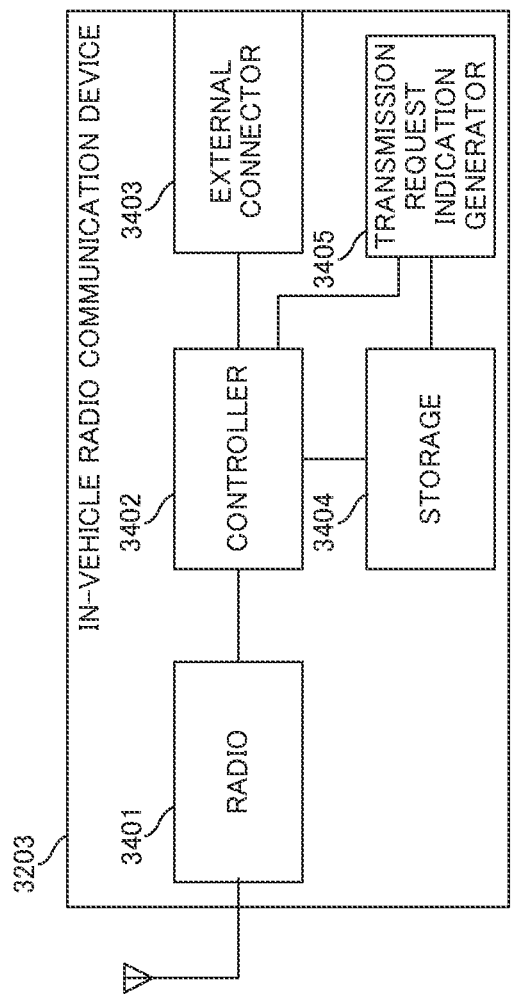
FIG. 17 is a block diagram illustrating an exemplary configuration of an in-vehicle radio communication device according to Embodiment 3.

FIG. 17 is a block diagram for in-vehicle radio communication device 3203 according to Embodiment 3.

In FIG. 17, in-vehicle radio communication device 3203 includes radio 3401, controller 3402, external connector 3403, storage 3404, and transmission request indication generator 3405.

Radio 3401 connects a radio link with base station 3101 by radio communication. Radio 3401 transmits the sensor data, the transmission request indication, and the transmission completion indication to base station 3101. Radio 3401 receives the communication indication from base station 3101.

Controller 3402 controls connection and disconnection of the radio link with base station 3101 by radio 3401. Controller 3402 controls transmission of the transmission request indication, the sensor data, and the transmission completion indication. Controller 3402 controls reception of the communication indication. Controller 3402 controls writing and reading of data for storage 3404. Controller 3402 controls communication with data acquisition device 3204 through external connecter 3403.

External connector 3403 is connected to data acquisition device 3204, and stores the sensor data acquired by data acquisition device 3204 in storage 3404.

Storage 3404 stores the sensor data.

Transmission request indication generator 3405 generates the transmission request indication according to the control from controller 3402. The transmission request indication may include information indicating the free space on storage 3404. The transmission request indication may also include at least one piece of the following information:

Identification for identifying vehicle 3102 (hereinafter, referred to as an "ID");
Amount of sensor data to be transmitted;
Period available to stay in coverage area 3103 (hereinafter referred to as an "available staying period");
Time limit for transfer completion;
Time to leave coverage area 3103;
Estimation value of an amount of sensor data to be acquired in the next data acquisition;
Required free space;
Type of the sensor data;
Sensor data acquisition rate (Gbps);
Scheduled time for the next data acquisition;
Scheduled time for the next communication with base station 3101;
Throughput expectation;
Throughput history; and
Received Signal Strength Indicator (RSSI) of a signal transmitted from radio 3301 of base station 3101.

Note that the operation of transmission request indication generator 3405 may be controlled by controller 3402.

<Operation of Radio Communication System>

Figure 18:
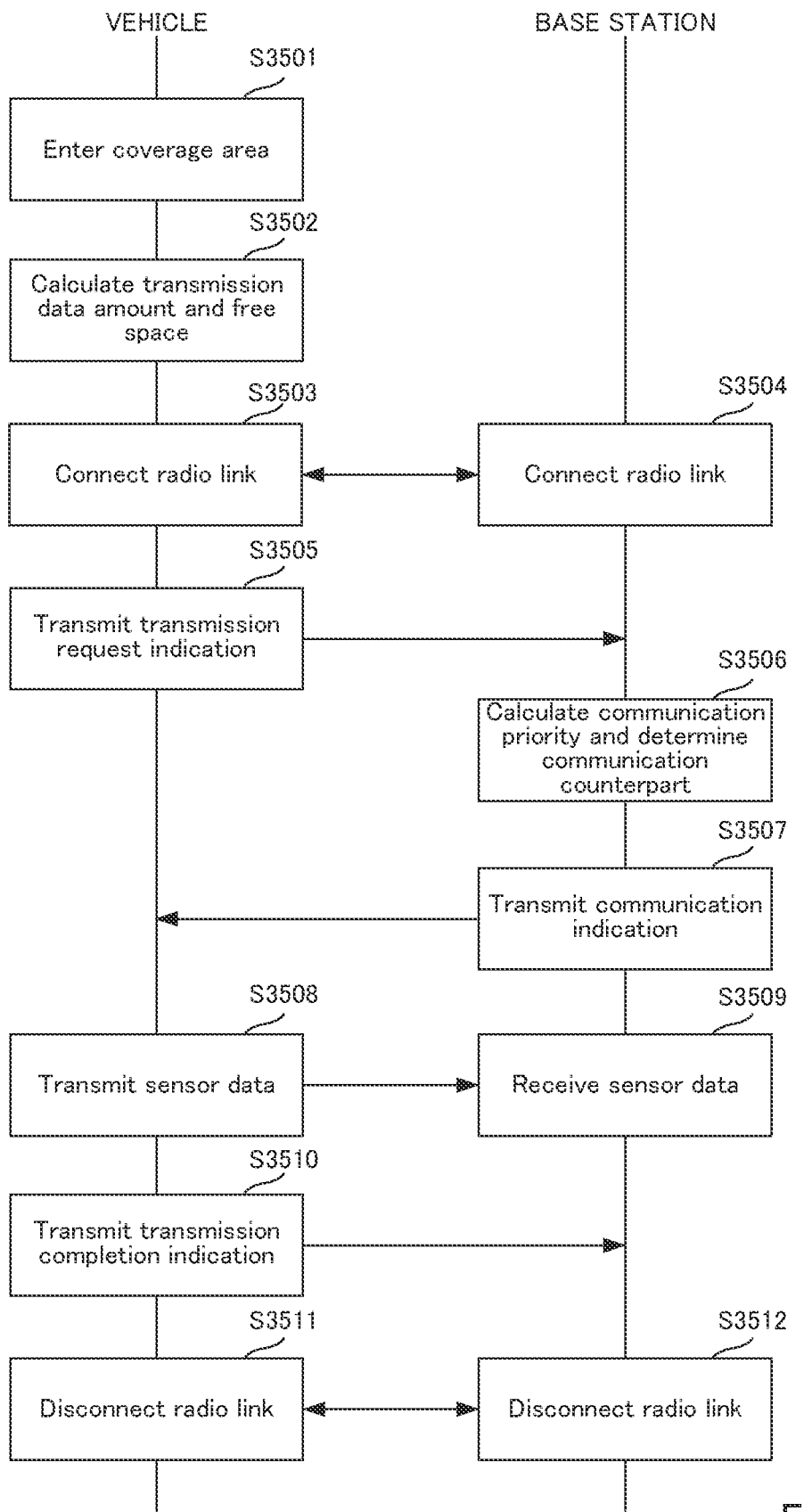
FIG. 18 is a flowchart describing exemplary processing of the radio communication system according to Embodiment 3.

FIG. 18 is a sequence diagram describing exemplary operations of the radio communication system according to Embodiment 3.

General processing of the radio communication systems is as follows. Vehicle 3102 acquires sensor data, and transfers the acquired sensor data to base station 3101 by radio communication when entering coverage area 3103 of base station 3101. The sequence diagram in FIG. 18 illustrates the processing after vehicle 3102 acquires the sensor data. That is, the sequence diagram in FIG. 18 illustrates the processing related to transfer of the sensor data by radio communication between vehicle 3102 and base station 3101.

Vehicle 3102 that has acquired the sensor data enters coverage area 3103 (S3501), and calculates an amount of the sensor data to be transmitted and free space on storage 3404 of vehicle 3102 (S3502).

Next, vehicle 3102 connects a radio link with base station 3101 (S3503 and S3504), and transmits a transmission request indication to base station 3101 (S3505).

Base station 3101 calculates a communication priority based on information included in the received transmission request indication, and selects vehicle 3102 to be communicated based on the priority (S3506).

Base station 3101 transmits a communication indication to vehicle 3102 of the communication target (S3507).

Vehicle 3102 transmits the sensor data to base station 3101 after receiving the communication indication (S3508). Base station 3101 receives the sensor data (S3509).

After completing the transmission of the sensor data, vehicle 3102 transmits a transmission completion indication to base station 3101 (S3510), and disconnects the radio link (S3511 and S3512).

Note that vehicle 3102 may delete, from storage 3404, the sensor data that has been transmitted to base station 3101.

Next, operations of vehicle 3102 and base station 3101 will be described in detail.

Figure 19:
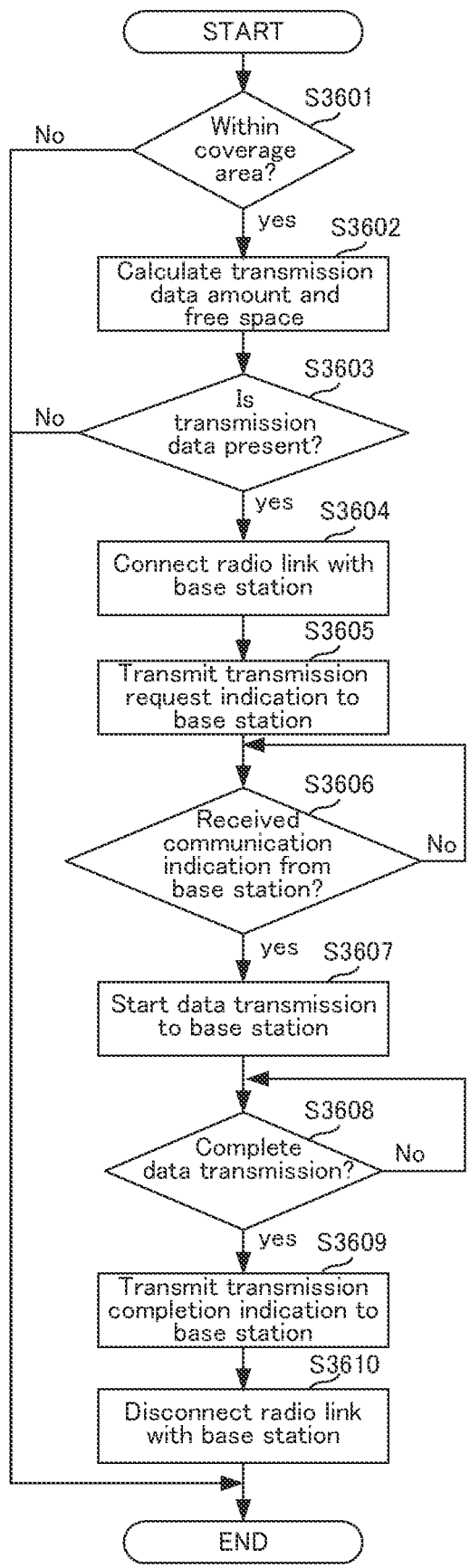
FIG. 19 is a flowchart describing exemplary processing of the in-vehicle radio communication device according to Embodiment 3.

FIG. 19 is a flowchart describing exemplary processing of vehicle 3102 according to Embodiment 3.

The timing at which the processing described in FIG. 19 is performed may be at least one of the following:
When vehicle 3102 enters coverage area 3103;
When vehicle 3102 acquires sensor data;
When a predetermined period counted by a timer or clock of vehicle 3102 has elapsed; and
Timing indicated by a driver of vehicle 3102.

Vehicle 3102 determines whether it is located in coverage area 3103 (S3601). Vehicle 3102 may determine whether it is located in coverage area 3103 based on whether radio 3401 of vehicle 3102 has received a beacon transmitted from radio 3301 of base station 3101.

Alternatively, vehicle 3102 may calculate the RSSI of the received beacon in radio 3401, and determine that vehicle 3102 is located in coverage area 3103 when the calculated RSSI is greater than a predetermined threshold.

Further, vehicle 3102 may determine whether it is located in coverage area 3103 by comparing position information acquired by a position information acquiring alternative such as a GPS with position information of base station 3101 stored in advance.

Vehicle 3102 terminates the processing when determining that vehicle 3102 is not located in coverage area 3103 (No in S3601).

When determining that vehicle 3102 is located in coverage area 3103 (Yes in S3601), vehicle 3102 calculates an amount of sensor data to be transmitted and free space on storage 3404 of vehicle 3102 (S3602). The amount of the sensor data to be transmitted may be calculated from the amount of the sensor data stored in storage 3404 of vehicle 3102.

Note that the sensor data that has been transmitted to base station 3101 may be stored in storage 3404 without being deleted. In this case, vehicle 3102 may store, in storage 3404, transmission history indicating how far the sensor data has been transmitted, when transmitting the sensor data to base station 3101. This allows vehicle 3102 to refer to the transmission history and calculate the amount of the sensor data to be transmitted (i.e., sensor data that has not been transmitted) among the amount of the sensor data stored in storage 3404.

Vehicle 3102 determines whether it has the sensor data to be transmitted based on the calculation result of the amount of the sensor data (S3603).

When determining that vehicle 3102 has no sensor data to be transmitted (No in S3603), vehicle 3102 terminates the processing.

When determining that vehicle 3102 has the sensor data to be transmitted (Yes in S3603), vehicle 3102 connects a radio link between radio 3401 and radio 3301 of base station 3101 (S3604). Vehicle 3102 then generates a transmission request indication in transmission request indication generator 3405, and transmits the transmission request indication to base station 3101 (S3605).

The transmission request indication is a signal indicating that vehicle 3102 has the sensor data to be transmitted. The transmission request indication includes information on the free space on storage 3404 calculated in S3602. The transmission request indication may also include at least one piece of the following information:
ID of vehicle 3102;
Amount of sensor data to be transmitted;
Available staying period in coverage area 3103;
Time limit for transfer completion;
Time to leave coverage area 3103;
Estimation value of an amount of sensor data to be acquired in the next data acquisition;

Required free space;
Type of the sensor data;
Sensor data acquisition rate (Gbps);
Scheduled time for the next data acquisition;
Scheduled time for the next communication with the base station;
Throughput expectation;
Throughput history; and
RSSI of a signal transmitted from radio 3301 of base station 3101.

Vehicle 3102 stands by until a communication indication is received from base station 3101 (No in S3606). After receiving the communication indication from base station 3101 (Yes in S3606), vehicle 3102 starts transmission of the sensor data to base station 3101 (S3607).

Vehicle 3102 continues the transmission of the sensor data (No in S3608). After completing the transmission of the sensor data (Yes in S3608), vehicle 3102 transmits a transmission completion indication to base station 3101 (S3609), and disconnects the radio link with base station 3101 (S3610).

Vehicle 3102 may delete, from storage 3404, the sensor data that has been transmitted to base station 3101. In a case where storage 3404 stores the sensor data in units of files, vehicle 3102 may sequentially delete the files from the file that has been transmitted. Alternatively, vehicle 3102 may collectively delete the sensor data in storage 3404 after completing the transmission of all the sensor data to be transmitted.

Note that vehicle 3102 may stop the processing and restart from S3601 when vehicle 3102 leaves coverage area 3103 or the radio communication link is disconnected in the middle of the processing described in FIG. 19.

Figure 20:
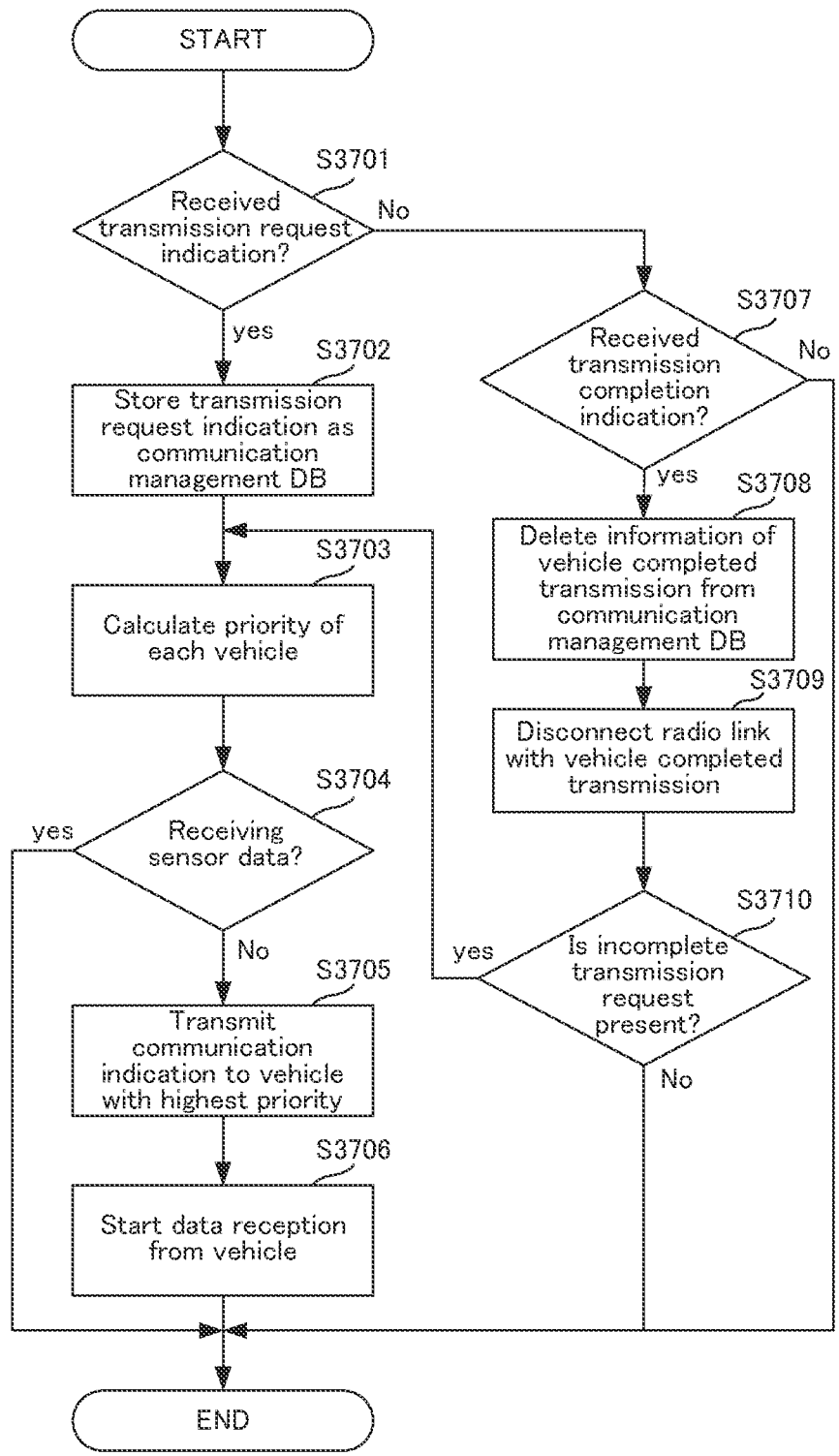
FIG. 20 is a flowchart describing exemplary control of the base station radio communication device according to Embodiment 3.

FIG. 20 is a flowchart describing exemplary processing of base station 3101 according to Embodiment 3.

The timing at which the processing described in FIG. 20 is performed may be at least one of the following:
When the transmission request indication is received from vehicle 3102; and
When the transmission completion indication is received from vehicle 3102.

Note that base station 3101 may continue the ongoing reception of the sensor data even when the processing reaches the "end" of the flowchart illustrated in FIG. 20.

Next, the flowchart illustrated in FIG. 20 will be described.

Base station 3101 determines whether the transmission request indication has been received from vehicle 3102 (S3701).

When receiving the transmission request indication from vehicle 3102 (Yes in S3701), base station 3101 stores information included in the transmission request indication in storage 3304 as communication management DB (S3702). Base station 3101 then calculates a priority based on the contents of the communication management DB, and updates the contents of the communication management DB based on the calculation result (S3703).

The priority is information indicating a priority of reception of sensor data between vehicle 3102 and base station 3101. When there are a plurality of vehicles 3102, for example, base station 3101 preferentially receives the sensor data from vehicle 3102 with higher priority. Note that an exemplary calculation of the priority will be described later.

The communication management DB is DB including information included in the transmission request indication received from vehicle 3102, the calculated priority, and information indicating reception status of the sensor data.

The communication management DB is used for calculating the priority, determining whether the sensor data is being received, and determining whether there is an incomplete transmission request, for example.

Next, base station 3101 determines whether base station 3101 is receiving the sensor data from vehicle 3102 based on the contents of the communication management DB (S3704). When determining that base station 3101 is receiving the sensor data (Yes in S3704), base station 3101 terminates the processing in the flowchart while continuing the reception.

When base station 3101 is not receiving the sensor data (No in S3704), base station 3101 transmits the communication indication to vehicle 3102 selected based on the priorities, according to the contents of the communication management DB (S3705). Base station 3101 then updates the contents of the communication management DB to a status indicating that the sensor data is being received from vehicle 3102 selected based on the priorities, and starts data reception from vehicle 3102 (S3706).

Meanwhile, when base station 3101 does not receive the transmission request indication from vehicle 3102 within a predetermined period in S3701 (No in S3701), base station 3101 determines whether the transmission completion indication is received from vehicle 3102 (S3707).

Base station 3101 terminates the processing when receiving no transmission completion indication from vehicle 3102 (No in S3707).

Base station 3101 performs the next processing when receiving the transmission completion indication from vehicle 3102 (Yes in S3707).

That is, base station 3101 deletes the information of vehicle 3102 that has completed the transmission, from the communication management DB (S3708). Base station 3101 disconnects the radio link with vehicle 3102 that has completed the transmission (S3709). Base station 3101 refers to the communication management DB stored in storage 3304, and determines whether there is an incomplete transmission request (S3710). Base station 3101 proceeds to the priority calculation process in S3703 when there is an incomplete transmission request (Yes in S3710), and terminates the processing when there is no incomplete transmission request (No in S3710).

The above processing allows base station 3101 to acquire data based on the priorities of vehicles 3102 when receiving the transmission request indications for the sensor data from a plurality of vehicles 3102.

Next, a method of determining the priorities in base station 3101 will be described.

Base station 3101 may compare the free space of vehicles 3102 with each other, and configure a higher priority in order from vehicle 3102 with smaller free space. That is, base station 3101 prioritizes reception of the sensor data from vehicle 3102 with smaller free space. This allows vehicle 3102 with the highest probability of lacking the free space on storage 3404 of vehicle 3102 in the future sensor data acquisition to reduce the probability. That is, this reduces the probability for vehicle 3102 to have difficulty in acquiring new sensor data due to the lack of the free space on storage 3404.

For example, base station 3101 may calculate the priority of each vehicle 3102 based on the information on the free space of each vehicle 3102 and the amount of the sensor data to be transmitted. In this case, the transmission request indication may include the information indicating the amount of the sensor data to be transmitted.

For example, base station 3101 may configure a higher priority in order from vehicle 3102 having a larger value obtained by subtracting the free space of storage 3404 from the amount of the sensor data to be transmitted. That is, a higher priority is given to vehicle 3102 having a larger amount of the sensor data to be transmitted and a smaller free space on storage 3404.

For example, base station 3101 may configure a higher priority in order from vehicle 3102 having a larger value obtained by dividing the amount of the sensor data to be transmitted by the free space of storage 3404. That is, a higher priority is given to vehicle 3102 having smaller free space on storage 3404 for vehicles 3102 having the same amount of the sensor data to be transmitted.

For example, base station 3101 may calculate the priority of each vehicle 3102 based on the free space of each vehicle 3102 and required free space for acquiring new sensor data. In this case, the transmission request indication may include the information indicating the required free space. That is, a higher priority is given to vehicle 3102 most likely to lack the capacity for the future sensor data acquisition.

Vehicle 3102 may calculate the required free space based on the amount of data in acquiring the data. The required free space may be stored in storage 3404 in advance. The required free space may also be calculated using the amount of data at the previous data acquisition. Alternatively, the required free space may be calculated from the data rate at the data acquisition and the next data acquisition time.

Base station 3101 may configure a higher priority to vehicle 3102 having a larger value obtained by subtracting the free space from the required free space. Alternatively, base station 3101 may configure a higher priority to vehicle 3102 having a larger value obtained by dividing the required free space by the free space. This allows vehicle 3102 with the highest probability of lacking the free space on storage 3404 of vehicle 3102 in the future sensor data acquisition to reduce the probability.

Additionally, vehicle 3102 may have information indicating the available staying period in coverage area 3103. In this case, vehicle 3102 may transmit the information indicating the available staying period by including in the transmission request indication. Base station 3101 may calculate the priority using the available staying period in addition to the above-described information.

For example, vehicle 3102 transmits the information indicating the free space, the required free space, and the available staying period, by including in the transmission request indication. Base station 3101 divides a value obtained by subtracting the free space from the required free space by the available staying period, and calculates a throughput value required for securing the required free space. Base station 3101 then configures a higher priority to vehicle 3102 with a greater value of the calculated required throughput. This allows vehicle 3102 with the highest probability of lacking the free space on storage 3404 of vehicle 3102 in the future sensor data acquisition to reduce the probability.

Further, vehicle 3102 may transmit information indicating the time limit for transfer completion, in place of the information indicating the available staying period, by including in the transmission request indication. In this case, base station 3101 may compare the present time with the time limit for transfer completion, and calculate the available staying period according to the time.

Vehicle 3102 may also transmit an effective throughput value by including in the transmission request indication. In this case, base station 3101 calculates the required throughput value from the free space, the required free space, and the available staying period, which are included in the transmission request indication. Base station 3101 may then compare the calculated throughput value with the effective throughput value, and determine whether vehicle 3102 can complete the transmission of the sensor data to secure the required free space within the available staying period. When determining that it is difficult to complete the transmission of the sensor data to secure the required free space within the available staying period, base station 3101 may transmit at least one piece of the following information to a driver of vehicle 3102:

- Information indicating that it is difficult to complete the transmission within the available staying period;
- Information suggesting an extension of the staying period;
- Information suggesting moving toward base station 3101 that allows faster communication;
- Information suggesting shortening the next sensor data acquisition time; and
- Information suggesting reduction in the next sensor data acquisition rate. Vehicle 3102 may receive and display the information on an in-vehicle display.

Further, base station 3101 may calculate a remaining time required for the communication in addition to the priority.

For example, base station 3101 calculates the time required for the communication of the sensor data based on the amount of the sensor data to be transmitted or the amount of the sensor data to secure the required free space, and the throughput estimation value or the throughput of the ongoing communication. Base station 3101 may transmit, to vehicle 3102, the calculated remaining time to be used for the communication of the sensor data. Vehicle 3102 may inform the driver of the transmitted remaining time by displaying it on the in-vehicle display, for example. This allows the driver to prepare for the next sensor data acquisition.

The priority may be calculated using at least one piece of the following information related to the free space on storage 3404 of vehicle 3102:

- Estimation value of the amount of the sensor data to be acquired in the next sensor data acquisition;
- Type of the sensor data;
- Sensor data acquisition rate (Gbps);
- Scheduled time for the next data acquisition;
- Scheduled time for the next communication with the base station;
- Throughput expectation;
- Throughput history; and
- RSSI of a signal transmitted from radio 3301 of base station 3101.

Operation Example 3-1

Next, an operation example of the radio communication system will be described with reference to FIGS. 19, 20, 21A, 21B, 21C, 22A, 22B, 22C and 22D. Note that the following description is for an operation in a case where vehicle 3102A first enters coverage area 3103 and starts transmission of sensor data, and vehicle 3102B and vehicle 3102C then enter coverage area 3103 before the transmission is completed.

Base station 3101 determines the priorities of vehicle 3102B and vehicle 3102C based on the transmission request indications transmitted from vehicle 3102B and vehicle 3102C after the transmission of the sensor data from vehicle 3102A to base station 3101 is completed.

The transmission request indications from vehicle 3102A, vehicle 3102B, and vehicle 3102C respectively include information illustrated in FIGS. 21A, 21B, and 21C. That is, the transmission request indication includes the ID of vehicle 3102 and information indicating the free space on storage 3404 in vehicle 3102, as illustrated in FIGS. 21A, 21B, and 21C. For example, base station 3101 configures a higher priority to vehicle 3102B with smaller free space.

As illustrated in the flowchart in FIG. 19, vehicle 3102A transmits the transmission request indication to base station 3101 (S3605 in FIG. 19) after entering coverage area 3103, and stands by until the communication indication is received from base station 3101 (S3606 in FIG. 19).

As illustrated in the flowchart in FIG. 20, base station 3101 stores the information included in the transmission request indication in storage 3304 as the communication management DB (S3702 in FIG. 20), and calculates the priority (S3703 in FIG. 20).

At this time, the communication management DB holds information from vehicle 3102A, and does not hold information from other vehicles 3102B and 3102C. Base station 3101 thus configures the priority of vehicle 3102A, which has transmitted the request, to "1" (see FIG. 22A). Note that the communication management DBs illustrated in FIGS. 22A, 22B, 22C and 22D are examples where a smaller value indicates a higher priority.

At this point, no sensor data is being received from a vehicle. Base station 3101 thus determines that no sensor data is being received from a vehicle in S3704 of FIG. 20, and transmits the communication indication to vehicle 3102A with the highest priority in S3705 of FIG. 20. Then, base station 3101 changes the item of "data reception in progress" for vehicle 3102A in the communication management DB to "Yes".

Vehicle 3102A receives the above-mentioned communication indication from base station 3101 (Yes in S3606 in FIG. 19), and starts transmitting the sensor data to base station 3101 (S3607 in FIG. 19). Base station 3101 starts receiving the sensor data (S3706 in FIG. 20).

Vehicle 3102B and vehicle 3102C enter the coverage area during the transmission of the sensor data from vehicle 3102A. Vehicle 3102B and vehicle 3102C each transmit the transmission request indication to base station 3101 (S3605 in FIG. 19), and stand by until the communication indication is received from base station 3101 (S3606 in FIG. 19).

When base station 3101 receives the transmission request indication from each of vehicle 3102B and vehicle 3102C, the information included in the transmission request indication is stored in storage 3304 as the communication management DB (S3702 in FIG. 20). Base station 3101 then calculates the priorities (S3703 in FIG. 20).

Base station 3101 configures the priorities higher than that of vehicle 3102A to vehicles 3102B and 3102C with smaller free space based on the calculation results, as illustrated in FIG. 22B. However, base station 3101 determines that the data is being received from vehicle 3102A in S3704 in FIG. 20, thus terminating the processing in the flowchart illustrated in FIG. 20.

As illustrated in FIG. 19, vehicle 3102A transmits the transmission completion indication to base station 3101 (S3609 in FIG. 19) after completing the transmission of the sensor data, and disconnects the radio link (S3610 in FIG. 19).

As illustrated in FIG. 20, after receiving the transmission completion indication (S3707 in FIG. 20), base station 3101 deletes the information of vehicle 3102A that has completed the transmission, from the communication management DB (S3708 in FIG. 20, and FIG. 22C), and disconnects the radio link (S3709 in FIG. 20).

Next, base station 3101 refers to the communication management DB, and confirms whether there is an incomplete transmission request (S3710 in FIG. 20). The communication management DB at this time is in the state illustrated in FIG. 22C, and thus base station 3101 determines that the transmission requests from vehicle 3102B and vehicle 3102C are incomplete.

Next, base station 3101 calculates the priorities in S3703 in FIG. 20.

According to the calculation results, vehicle 3102B is prioritized over vehicle 3102C. Thus, base station 3101 transmits the communication indication to vehicle 3102B, and updates the communication management DB as illustrated in FIG. 22D (S3705 in FIG. 20). Base station 3101 then starts receiving the sensor data from vehicle 3102B (S3706 in FIG. 20).

Base station 3101 repeats the processing illustrated in FIG. 20, and receives the sensor data from vehicle 3102C after completing the reception of the sensor data from vehicle 3102B.

The above operation allows base station 3101 to preferentially receive the sensor data from vehicle 3102 with smaller free space on storage 3404.

In the present embodiment, when base station 3101 receives the transmission request indication from a certain vehicle 3102 while already receiving the sensor data from another vehicle 3102, base station 3101 restarts the processing from the priority calculation after completing the ongoing reception of the sensor data from the latter vehicle 3102. However, base station 3101 may operate as follows when vehicle 3102 of the transmission source of the transmission request indication received later by base station 3101 has a priority higher than vehicle 3102 of the transmission source of the sensor data being received.

Figure 23:
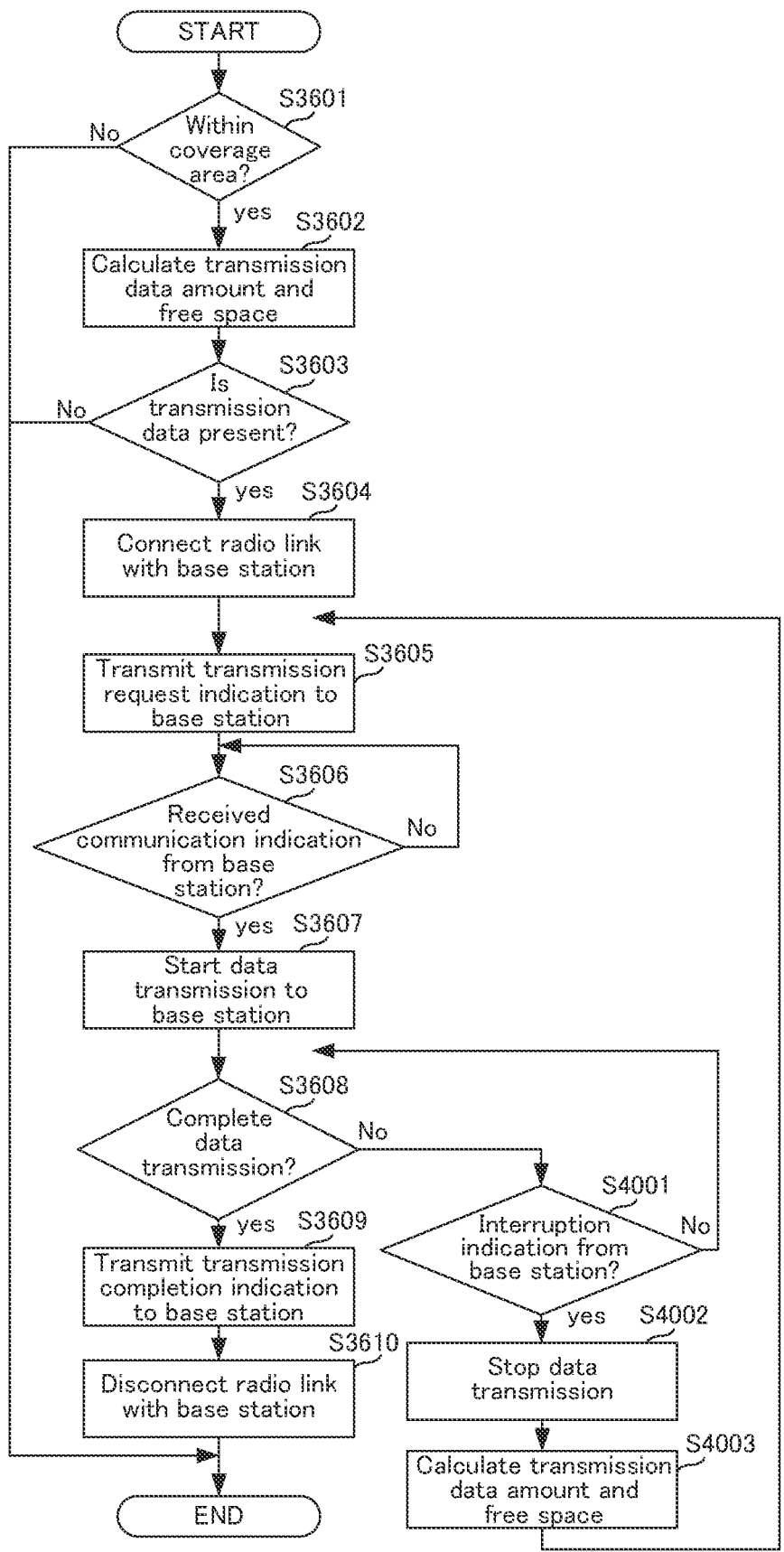
FIG. 23 is a flowchart describing other exemplary processing of the in-vehicle radio communication device according to Embodiment 3.
Figure 24:
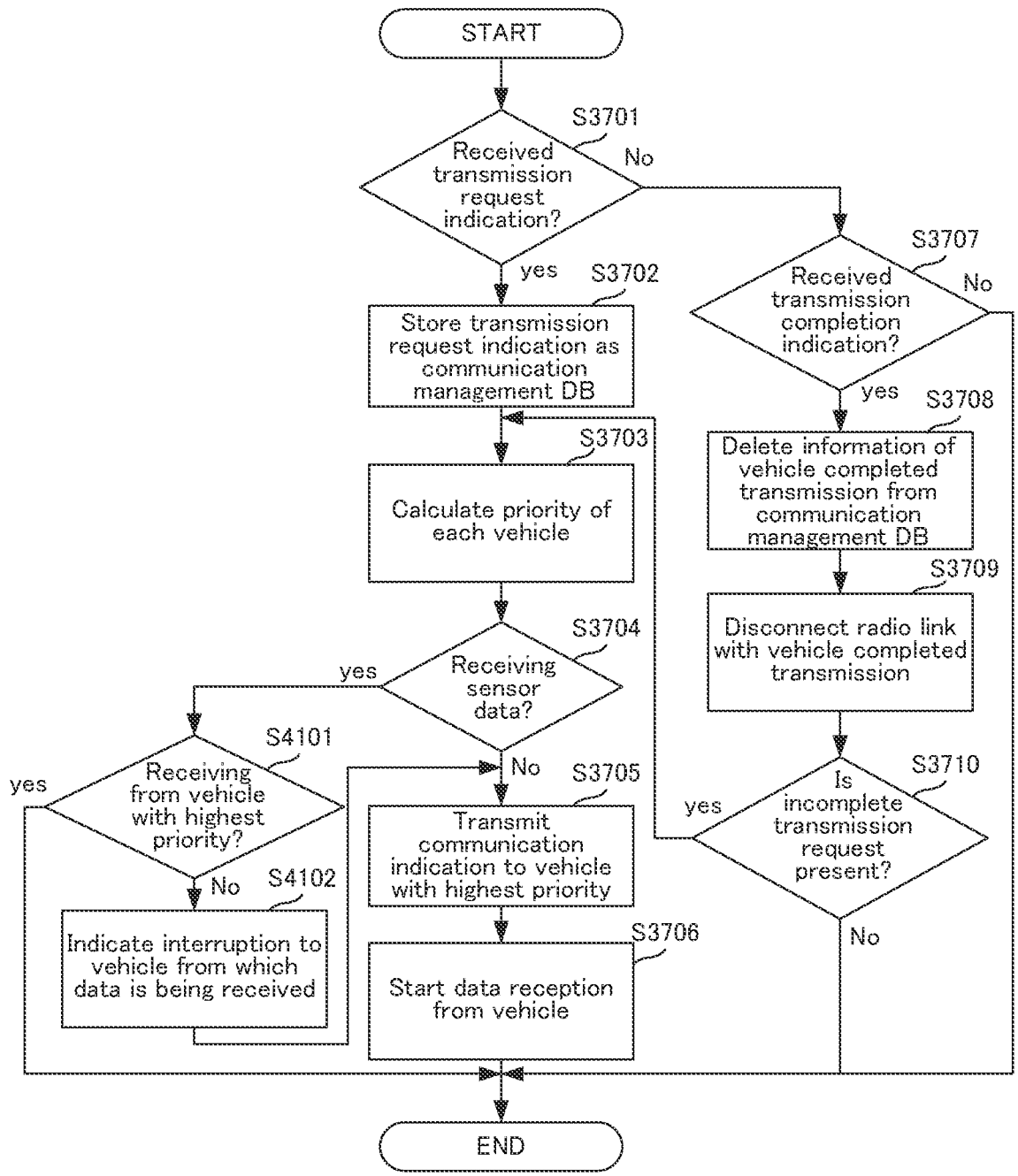
FIG. 24 is a flowchart describing other exemplary processing of the base station radio communication device according to Embodiment 3.

That is, base station 3101 may stop the ongoing reception process of the sensor data, and start receiving the sensor data from vehicle 3102 with higher priority. FIG. 23 is a flowchart describing exemplary processing of vehicle 3102 for this case. FIG. 24 is a flowchart describing exemplary processing of base station 3101 for this case. Different numbers are given to processes in FIG. 23 and FIG. 24 different from those in FIG. 19 and FIG. 20 respectively. Hereinafter, the processes different from FIG. 19 and FIG. 20 will be described with reference to FIG. 23 and FIG. 24.

As illustrated in FIG. 23, vehicle 3102 determines whether there is an interruption indication from base station 3101 during the transmission of the sensor data to base station 3101 (S4001). Vehicle 3102 performs the process of S3608 when there is no interruption indication from base station 3101 (No in S4001).

When vehicle 3102 receives the interruption indication from base station 3101 (Yes in S4001), vehicle 3102 stops the transmission of the sensor data (S4002). Vehicle 3102 calculates the amount of the sensor data to be transmitted and the free space on storage 3404 in vehicle 3102 at that time (S4003). Vehicle 3102 transmits the transmission request indication to base station 3101 based on the calculated information (S3605), and stands by for the communication indication from base station 3101 (S3606).

As illustrated in FIG. 24, when base station 3101 determines that the sensor data is being received in the process of S3704 (Yes in S3704), base station 3101 determines whether vehicle 3102 of the transmission source of the sensor data being received has the highest priority based on the contents of the communication management DB (S4101).

Base station 3101 continues receiving the sensor data when vehicle 3102 of the transmission source of the sensor data being received has the highest priority (Yes in S4101).

When there is vehicle 3102 that has a priority higher than that of vehicle 3102 transmitting the sensor data being received (No in S4101), in contrast, base station 3101 transmits the interruption indication to vehicle 3102 of the transmission source of the sensor data being received, and stops receiving the sensor data (S4102). Base station 3101 then transmits the communication indication to vehicle 3102 with higher priority (S3705), and starts receiving the sensor data (S3706).

The above processing allows base station 3101 to prioritize the reception of the sensor data from vehicle 3102 with higher priority even during the reception of the sensor data from another vehicle 3102.

Operation Example 3-2

Next, Operation Example 3-2 of the radio communication system will be described with reference to FIGS. 23, 24, 25A, 25B, 25C, 26A and 26B. In Operation Example 3-1, vehicle 3102 indicates the free space on storage 3404 and the ID to base station 3101. In Operation Example 3-2, additional information on the required free space and the time limit for transfer completion is also indicated. Base station 3101 calculates the available staying period, the required throughput, and the priority from the information. Note that the same operations as those described in Operation Example 3-1 will be omitted from the description, and different operations will be described. FIGS. 25A, 25B, and 25C respectively illustrates exemplary transmission request indications of vehicles 3102A, 3102B, and 3102C. A description will be given of an exemplary operation in a case where base station 3101 receives the respective transmission request indications and calculates the priorities at the time "13:00:00".

Vehicle 3102 transmits, to base station 3101, the transmission request indication including the information on the required free space and the time limit for transfer completion in addition to the information on the amount of the transmission data and the free space in S3605 in FIG. 23. Note that the time limit for transfer completion is a preferred time at which the transfer of the sensor data has been completed from vehicle 3102 to base station 3101. An example is the time at which vehicle 3102 leaves the coverage area, which is the departure time in a case where vehicle 3102 is a bus, or the start of working hours in a case where vehicle 3102 is a taxi. Other examples are the time at which the engine of vehicle 3102 is turned off or in-vehicle radio communication device 3203 of vehicle 3102 is turned off at the end of the working hours.

Base station 3101 receives the transmission request indication from each vehicle 3102, and calculates the available staying period, the required throughput, and the priority. Base station 3101 then transmits the communication indication to vehicle 3102 with the highest priority.

FIG. 26A illustrates exemplary communication management DB at the time "13:00:00". Herein, the available staying period is calculated by subtracting the present time from the time limit for transfer completion. In addition, the required throughput is calculated by the following equation:

Required throughput (Gbps)=(Required free space (GB)−Free space (GB))×8/Available staying period (sec).

Base station 3101 configures a higher priority to vehicle 3102 with greater required throughput. As illustrated in FIG. 26A, vehicle 3102A has the highest priority "1", so that base station 3101 transmits the communication indication to vehicle 3102A and starts receiving the sensor data from vehicle 3102A. That is, the highest priority is given to vehicle 3102 causing the highest load to transmit the sensor data.

In a case where the priority is calculated based on the present time in this manner, base station 3101 may calculate the priority regularly since the present time changes. In this case, base station 3101 may regularly perform the priority calculation process (S3703) and the subsequent processes illustrated in the flowchart in FIG. 24, based on a timer, a clock, or the like. Alternatively, vehicle 3102 may regularly perform the process of calculating the free space and the process of transmitting the transmission request indication to base station 3101, based on a timer, a clock, or the like. This allows vehicle 3102 to indicate the transmission request indication corresponding to changes in a situation to base station 3101, and allows base station 3101 to determine the priority according to the situation. Examples of the changes in the situation for vehicle 3102 include a change in time, a change in the free space, a change in the required free space, and a change in the RSSI. Note that vehicle 3102 may perform the regular calculation of the free space and transmission of the transmission request indication even during the transmission of the sensor data and/or the reception of the communication indication.

Next, a description will be given of an exemplary case where the determination result in FIG. 26A is based on the determination at the time "13:00:00", and base station 3101 recalculates the priorities 10 minutes after the determination.

In a case where the actual transfer rate of the sensor data from vehicle 3102A to base station 3101 is 2 Gbps, vehicle 3102A transmits the sensor data of 150 GBytes in 10 minutes. When base station 3101 recalculates the available staying period, the required throughput, and the priorities in response to the present time "13:10:00", the free space of vehicle 3102A has increased and the required throughput has reduced accordingly, and thus the communication management DB is in a state illustrated in FIG. 26B. Vehicle 3102C has the highest priority in the state illustrated in FIG. 26B.

Base station 3101 transmits the interruption indication to vehicle 3102A referring to the communication management DB illustrated in FIG. 26B, and stops the reception of the sensor data. Base station 3101 then transmits the communication indication to vehicle 3102C, and starts receiving the sensor data from vehicle 3102C.

The processing described above allows base station 3101 to stop the ongoing data reception and receive the sensor data from vehicle 3102 with the highest priority.

In addition, since the transmission request indication includes the information on the required free space and the time limit for transfer completion, base station 3101 can determine the priority based on the situation, and receive the sensor data from vehicle 3102 with higher priority. This enables vehicle 3102 with the highest probability of lacking the free space of vehicle 3102 to reduce the probability.

Incidentally, descriptions have been given above of the examples where single vehicle 3102 transmits the sensor data sequentially. Base station 3101, however, may simultaneously receive the sensor data from a plurality of vehicles 3102 with higher priorities in a case where base station 3101 can simultaneously perform a plurality of radio communications using a plurality of channels or by time division.

Note that the "simultaneously" may be replaced with another term such as "in parallel" or "together".

In this case, the maximum number of vehicles 3102 that can communicate simultaneously may be predetermined, and the determination in S3704 of the flowchart in FIG. 20 may be replaced with "whether it is receiving from the maximum number of vehicles that can communicate simultaneously". This allows base station 3101 to receive the sensor data from the plurality of vehicles 3102 with higher priorities simultaneously.

In addition to the above-mentioned replacement of the determination in S3704, the determination in S4101 of the flowchart in FIG. 24 may be replaced with "continuing data reception from the maximum number of vehicles with higher priorities that can communicate simultaneously?". When the determination in the replaced S4101 is "No", i.e., when base station 3101 continues reception of the sensor data from vehicle 3102 with lower priority, base station 3101 may perform the next process. That is, base station 3101 stops the reception of the sensor data by transmitting the interruption indication to vehicle 3102 with the lowest priority among vehicles 3102 from which the data is being received (S4102), and transmits the communication indication to vehicle 3102 with the highest priority (S3705).

This allows base station 3101 to communicate with the plurality of vehicles 3102 simultaneously, and receive the sensor data from the plurality of vehicles 3102 with higher priorities simultaneously.

Note that the above-described radio communication system disconnects the radio link between vehicle 3102 and base station 3101 after the transmission and reception of the sensor data is completed. The operation of the radio communication system is not limited to this, however. For example, the radio communication system may maintain the connection of the radio link without disconnecting when there is no upper limit on the number of the radio communication links, or when there is room to the upper limit number of the links.

Note that, in the above-described radio communication system, base station 3101 includes data analysis device 3202, and data analysis device 3202 accumulates and analyzes the sensor data. The configuration of the radio communication system is not limited to this, however. For example, base station 3101 may be connected to an external network via external connector 3303 of base station radio communication device 3201, and an apparatus connected to the external network may accumulate and/or analyze the sensor data. This enables accumulation of the sensor data without being limited by a storage capacity of data analysis device 3202. This also enables analysis using a calculation resource connected to the external network without being limited to a calculation resource of the data analysis device.

Note that, in the above-described radio communication system, vehicle 3102 includes external connector 3403, and is connected to data acquisition device 3204 via external connector 3403. The configuration of the radio communication system is not limited to this, however. For example, vehicle 3102 may be configured to be connected to data acquisition device 3204 via radio 3401. This makes it possible to transfer, to base station 3101, the sensor data acquired by data acquisition device 3204 installed at a location away from in-vehicle radio communication device 3203 outside or inside the vehicle.

Note that, in the above-described radio communication system, vehicle 3102 includes data acquisition device 3204, and data acquisition device 3204 acquires the sensor data. The configuration of the radio communication system is not limited to this, however. In a case where data acquisition device 3204 is provided outside vehicle 3102 and includes a communicator, for example, vehicle 3102 may be configured to acquire the sensor data from data acquisition device 3204 by connecting to the communicator of data acquisition device 3204 provided outside vehicle 3102 that holds the sensor data, via external connector 3403 of in-vehicle radio communication device 3203. Alternatively, vehicle 3102 may be configured to acquire the sensor data from data acquisition device 3204 by connecting to data acquisition device 3204 provided outside vehicle 3102 that holds the sensor data, via radio 3401.

This increases the flexibility in installing data acquisition device 3204 for vehicle 3102, and data acquisition device 3204 is retrofittable even in a case where data acquisition device 3204 is not installed at a factory. Thus, vehicle 3102 can transfer the sensor data acquired and accumulated by retrofitted data acquisition device 3204 to storage 3404 via external connector 3403 or radio 3401. Then, vehicle 3102 can transmit the sensor data to base station 3101 after moving into coverage area 3103 of base station 3101. That is, base station 3101 can collect the sensor data acquired by data acquisition device 3204 retrofitted to vehicle 3102, via vehicle 3102.

This also allows vehicle 3102 to transfer, to storage 3404 via external connector 3403 or radio 3401 of vehicle 3102, the sensor data acquired and accumulated by data acquisition device 3204 that is installed away from base station 3101, such as at an intersection or on a roadside, and does not communicate directly with base station 3101, when vehicle 3102 passes close to the intersection or the roadside. Then, vehicle 3102 can transmit the sensor data to base station 3101 after moving into coverage area 3103 of base station 3101. That is, base station 3101 can collect, via vehicle 3102, the sensor data acquired by data acquisition device 3204 that is installed away from base station 3101, such as an intersection or on a roadside, and does not communicate directly with base station 3101.

Note that, in the radio communication system described above, the transmission request indication includes the ID of vehicle 3102. The configuration of the radio communication system is not limited to this, however. For example, radio 3301 of base station 3101 may recognize the ID of vehicle 3102 of the transmission source and store the ID in the communication management DB when receiving the transmission request indication. This reduces the processing load on vehicle 3102.

Embodiment 4

In Embodiment 3, descriptions have been given of the case where base station radio communication device 3201 includes single radio 3301, and in-vehicle radio communication device 3203 includes single radio 3401. In Embodiment 3, descriptions have also been given of the case where the sensor data, the transmission request indication, the transmission completion indication, and the communication indication are transmitted and received via radio communication by radios 3301 and 3401.

In Embodiment 4, a description will be given of an example where the base station radio communication device and the in-vehicle radio communication device each include a plurality of radios. The plurality of radios may be selectively used depending on the purpose. The plurality of radios may use the same radio communication scheme. Alternatively, the plurality of radios may use the radio communication schemes different from each other.

For example, microwaves having a larger coverage area than millimeter waves are used for the radio communication for control signals such as indications, and millimeter waves enabling communication faster than microwaves are used for the transmission and reception of sensor data. This allows the radio communication system to perform more stable control and perform high-speed radio communication efficiently.

Hereinafter, a description will be given of an example where the base station radio communication device and the in-vehicle radio communication device each have a plurality of radios supporting different radio communication schemes. Note that, in the drawings to be used for the following description, different reference signs are given to portions different from Embodiment 3, and common reference signs are given to components and processes common to those in Embodiment 3. In addition, contents already described in Embodiment 3 are omitted from the following description.

<Configuration of Radio Communication System>

Figure 27:
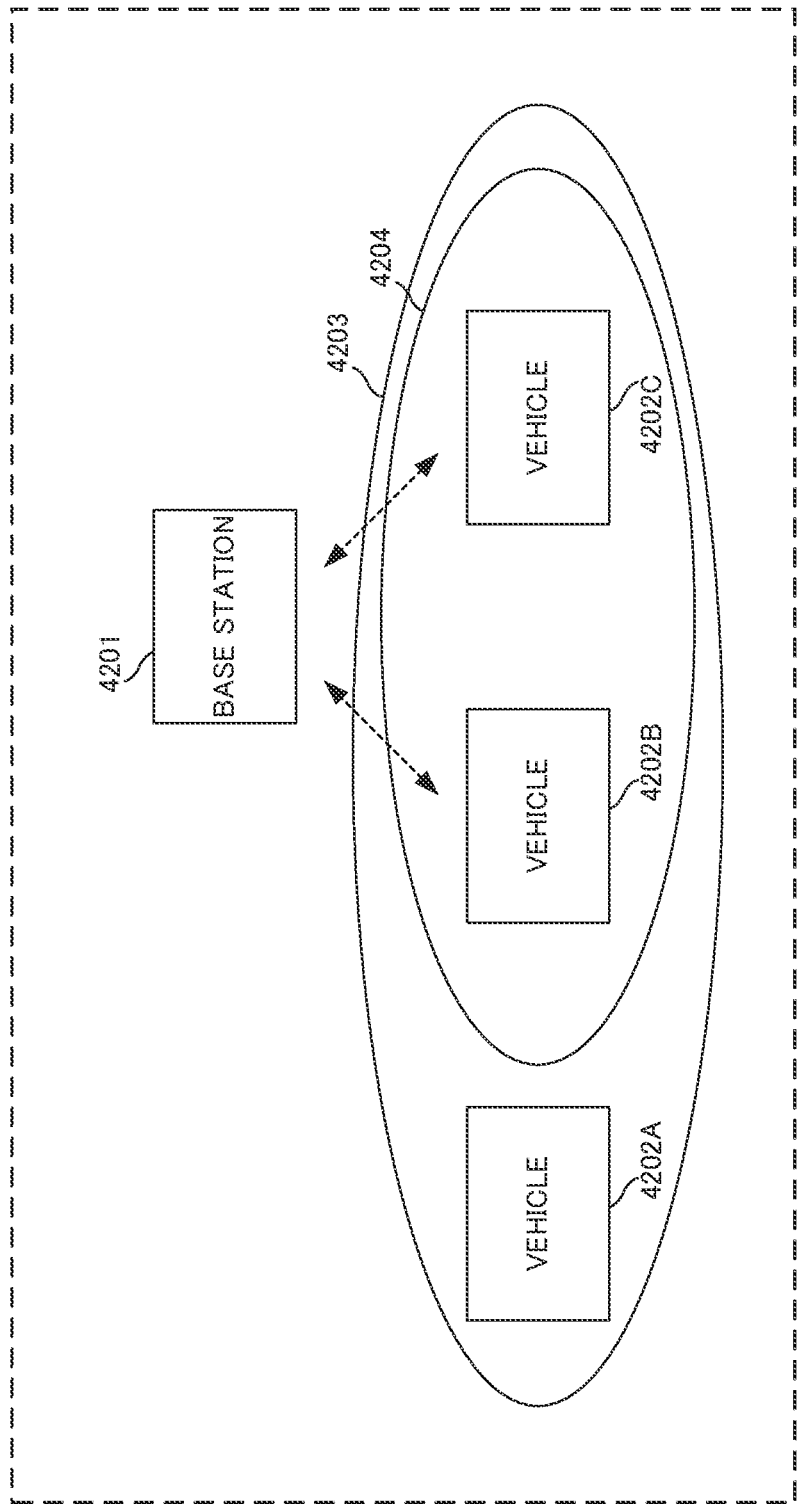
FIG. 27 illustrates an exemplary radio communication system according to Embodiment 4.

FIG. 27 illustrates an outline of a radio communication system according to Embodiment 4.

In FIG. 27, base station 4201 and vehicle 4202 support microwave and millimeter-wave radio communication schemes. Base station 4201 and vehicle 4202 perform radio communication using microwaves in microwave coverage area 4203. In addition, base station 4201 and vehicle 4202 perform radio communication using millimeter waves in millimeter-wave coverage area 4204. Those different radio communications are independent of each other and can be performed simultaneously.

Figure 28:
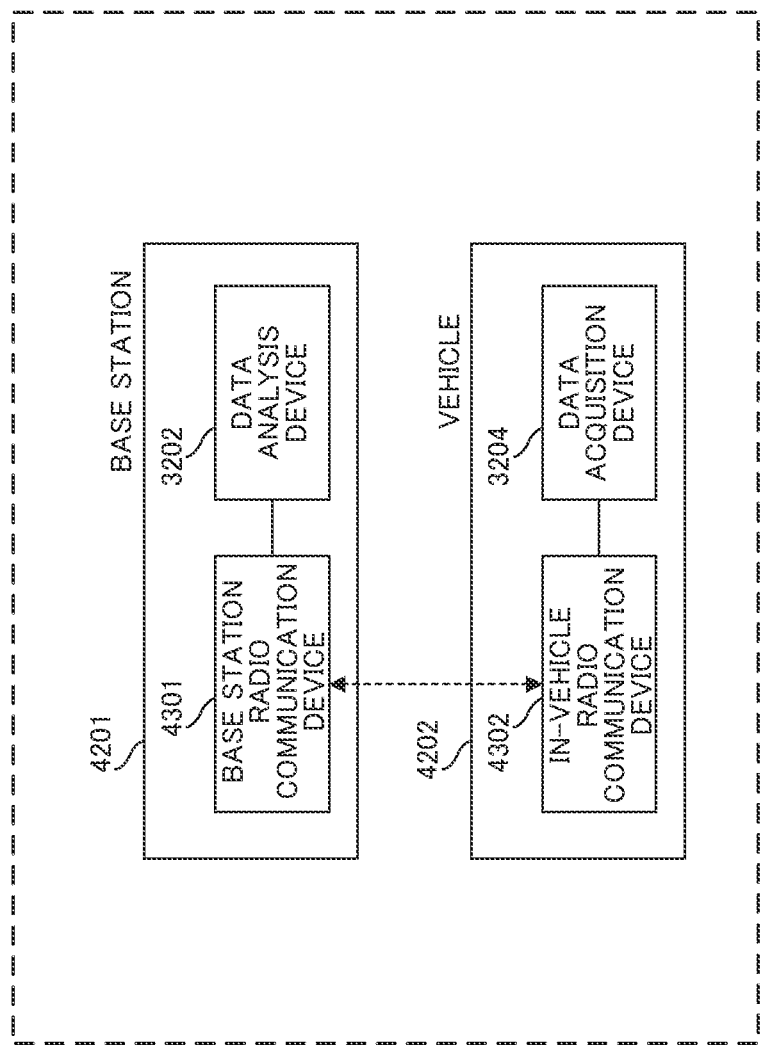
FIG. 28 is a block diagram illustrating an exemplary configuration of the radio communication system according to Embodiment 4.

FIG. 28 is a block diagram illustrating an exemplary configuration of the radio communication system according to Embodiment 4. As illustrated in FIG. 28, base station 4201 includes base station radio communication device 4301 and data analysis device 3202.

Base station radio communication device 4301 is connected to vehicle 4202 locating in microwave coverage area 4203 by the microwave radio communication. Base station radio communication device 4301 is connected to vehicle 4202 locating in millimeter-wave coverage area 4204 by the millimeter-wave radio communication. Base station radio communication device 4301 receives a transmission request indication, sensor data, and a transmission completion indication from vehicle 4202. Base station radio communication device 4301 transmits a communication indication to vehicle 4202. Base station radio communication device 4301 transmits the sensor data to data analysis device 3202.

As illustrated in FIG. 28, vehicle 4202 includes in-vehicle radio communication device 4302 and data acquisition device 3204.

In-vehicle radio communication device 4302 receives the sensor data from data acquisition device 3204. In-vehicle radio communication device 4302 transmits the transmission request indication, the sensor data, and the transmission completion indication to base station 4201, and receives the communication indication from base station 4201, by the microwave radio communication and the millimeter-wave radio communication.

Figure 29:
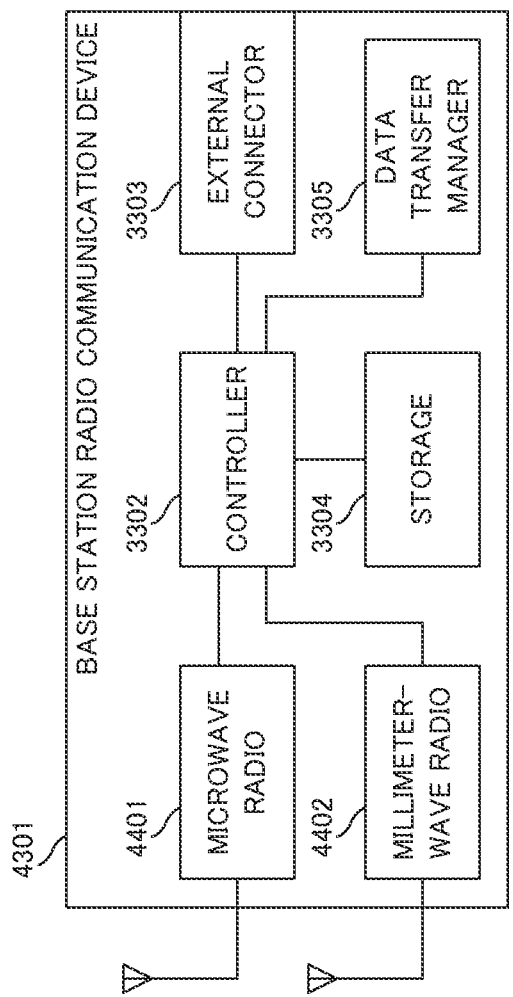
FIG. 29 is a block diagram illustrating an exemplary configuration of a base station radio communication device according to Embodiment 4.

FIG. 29 is a block diagram illustrating an exemplary configuration of base station radio communication device 4301 according to Embodiment 4. As illustrated in FIG. 29, base station radio communication device 4301 includes microwave radio 4401, millimeter-wave radio 4402, controller 3302, external connecter 3303, storage 3304, and data transfer manager 3305.

Microwave radio 4401 connects a radio link with vehicle 4202 by the microwaves. Microwave radio 4401 receives the transmission request indication and the transmission completion indication from vehicle 4202. Microwave radio 4401 transmits the communication indication to vehicle 4202.

Millimeter-wave radio 4402 connects a radio link with vehicle 4202 by the millimeter-waves. Millimeter-wave radio 4402 receives the sensor data from vehicle 4202.

Figure 30:
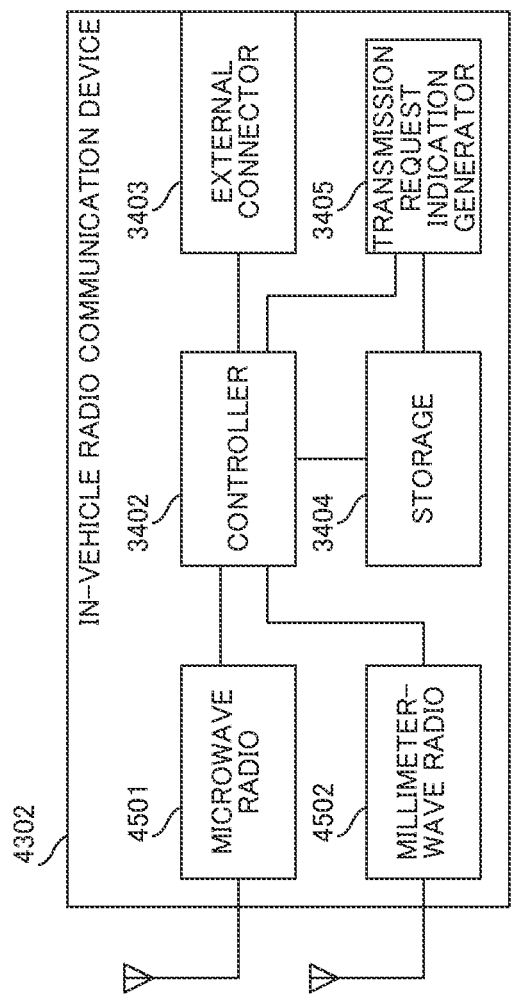
FIG. 30 is a block diagram illustrating an exemplary configuration of an in-vehicle radio communication device according to Embodiment 4.

FIG. 30 is a block diagram illustrating an exemplary configuration of in-vehicle radio communication device 4302 according to Embodiment 4. As illustrated in FIG. 30, in-vehicle radio communication device 4302 includes microwave radio 4501, millimeter-wave radio 4502, controller 3402, external connector 3403, storage 3404, and transmission request indication generator 3405.

Microwave radio 4501 connects a radio link with base station 4201 by the microwaves. Microwave radio 4501 transmits the transmission request indication and the transmission completion indication to base station 4201. Microwave radio 4501 receives the communication indication from base station 4201.

Millimeter wave radio 4502 connects a radio link with base station 4201 by the millimeter waves. Millimeter-wave radio 4502 transmits the sensor data to base station 4201.

<Operation Example of Radio Communication System>

Figure 31:
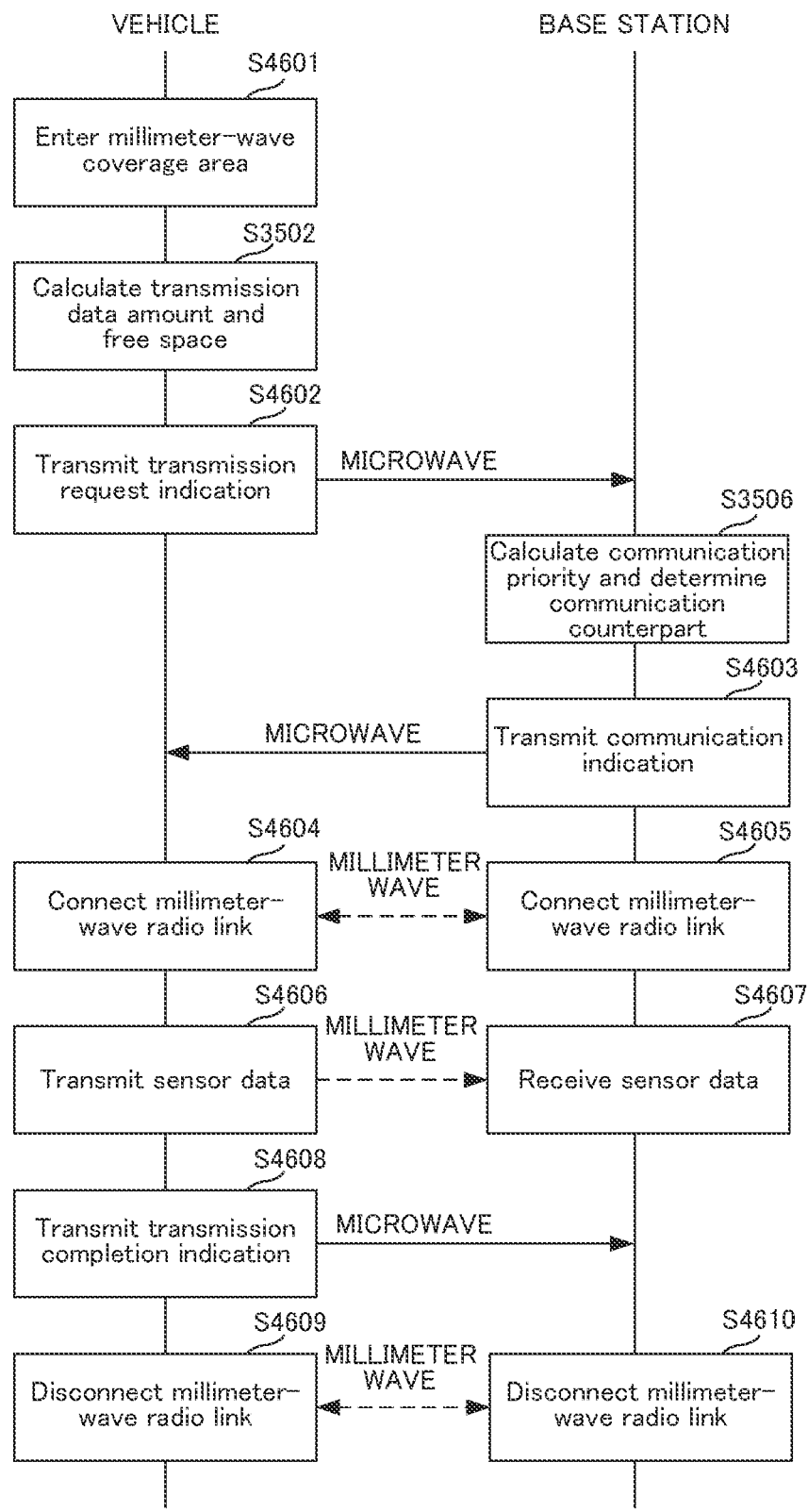
FIG. 31 is a flowchart describing exemplary processing of the radio communication system according to Embodiment 4.

FIG. 31 is a sequence diagram describing exemplary operations of the radio communication system according to Embodiment 4.

FIG. 31 is different from FIG. 18 in Embodiment 3 in the following points:

Between base station 4201 and vehicle 4202, communication on control of the transmission request indication, the communication indication, and the transmission completion indication is performed by the radio communication using the microwaves (hereinafter, referred to as "microwave radio communication"), and the sensor data communication is performed by the radio communication using the millimeter waves (hereinafter, referred to as "millimeter-wave radio communication"); and The radio link with millimeter waves are connected during the sensor data communication.

In the following description, the coverage area of the microwave radio communication is larger than that of the millimeter-wave radio communication, and microwave coverage area 4203 includes millimeter-wave coverage area 4204.

In addition, vehicle 4202 connects the microwave radio link with base station 4201 after entering microwave coverage area 4203.

Next, an exemplary operation of the radio communication system according to Embodiment 4 will be described with reference to FIG. 31. Note that, in the following description of FIG. 31, vehicle 4202 has already acquired the sensor data, and connected the microwave radio link in microwave coverage area 4203.

When entering millimeter-wave coverage area 4204 (S4601), vehicle 4202 calculates the amount of the sensor data to be transmitted and the free space on storage 3404 of vehicle 4202 (S3502). Vehicle 4202 then transmits the transmission request indication to base station 4201 by the microwave radio communication (S4602).

Base station 4201 calculates the communication priority from the received transmission request indication, and determines vehicle 4202 to be communicated based on the priority (S3506). Then, base station 4201 transmits the communication indication by the microwave radio communication to vehicle 4202 determined as a communication target (S4603).

Vehicle 4202 connects the millimeter-wave radio link between vehicle 4202 and base station 4201 when receiving the communication indication (S4604 and S4605). Vehicle 4202 then transmits the sensor data to base station 4201 by the millimeter-wave radio communication (S4606).

Base station 4201 receives the sensor data (S4607).

When completing the transmission of the sensor data, vehicle 4202 transmits the transmission completion indication to base station 4201 by the microwave radio communication (S4608), and disconnects the millimeter-wave radio link (S4609 and S4610). Vehicle 4202 deletes, from storage 3404, the sensor data that has been transmitted to base station 4201, or configures the data so that it can be overwritten.

Next, exemplary operations of vehicle 4202 and base station 4201 will be described.

Figure 32:
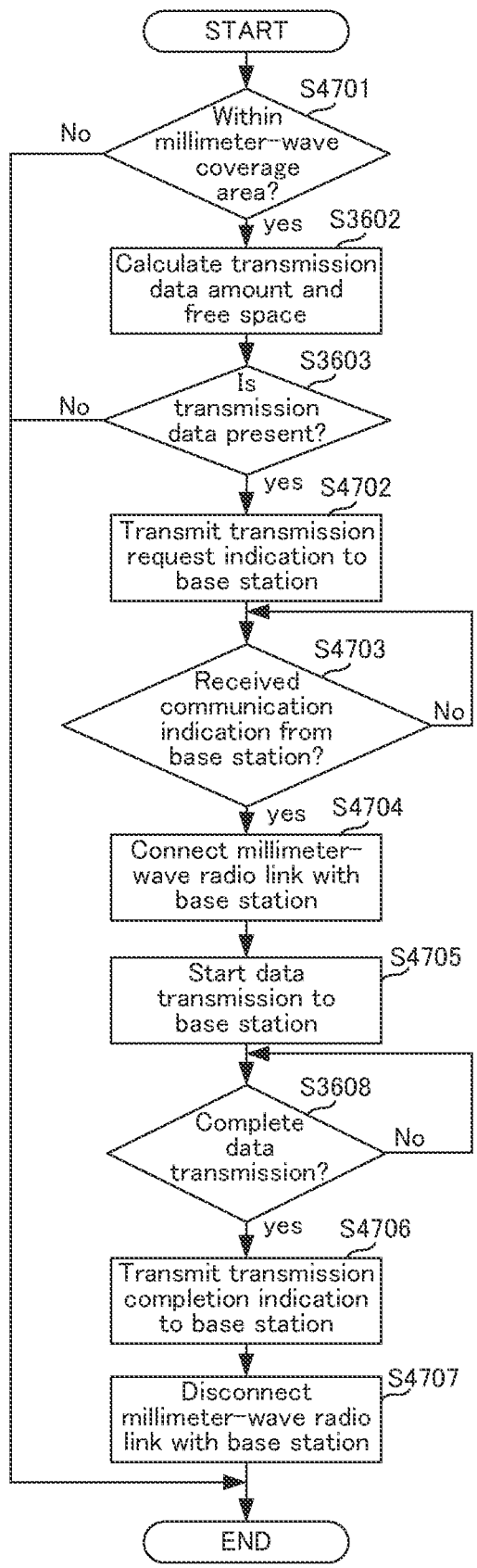
FIG. 32 is a flowchart describing exemplary processing of the in-vehicle radio communication device according to Embodiment 4.

FIG. 32 is a flowchart describing the exemplary operation of vehicle 4202 according to Embodiment 4.

FIG. 32 is different from FIG. 19 in Embodiment 3 in the following points:

Determining whether it is located in millimeter-wave coverage area 4204 in S4701;
Using the microwave radio communication for the transmission of the transmission request indication, the reception of the communication indication, and the transmission of the transmission completion indication in steps S4702, S4703 and S4706 respectively;
Connecting the millimeter-wave radio link after receiving the communication indication, in S4704;
Using the millimeter-wave radio communication for transmitting the sensor data in S4705; and
Disconnecting the millimeter-wave radio link in S4707.

The other processes are the same as those in FIG. 19, and the description thereof is thus omitted.

Note that, the processing in FIG. 32 may be stopped when vehicle 4202 leaves millimeter-wave coverage area 4204 or the millimeter-wave radio link is disconnected in the middle of the processing described in FIG. 32. In this case, the processing in FIG. 32 may be restarted from the beginning (S4701).

Figure 33:
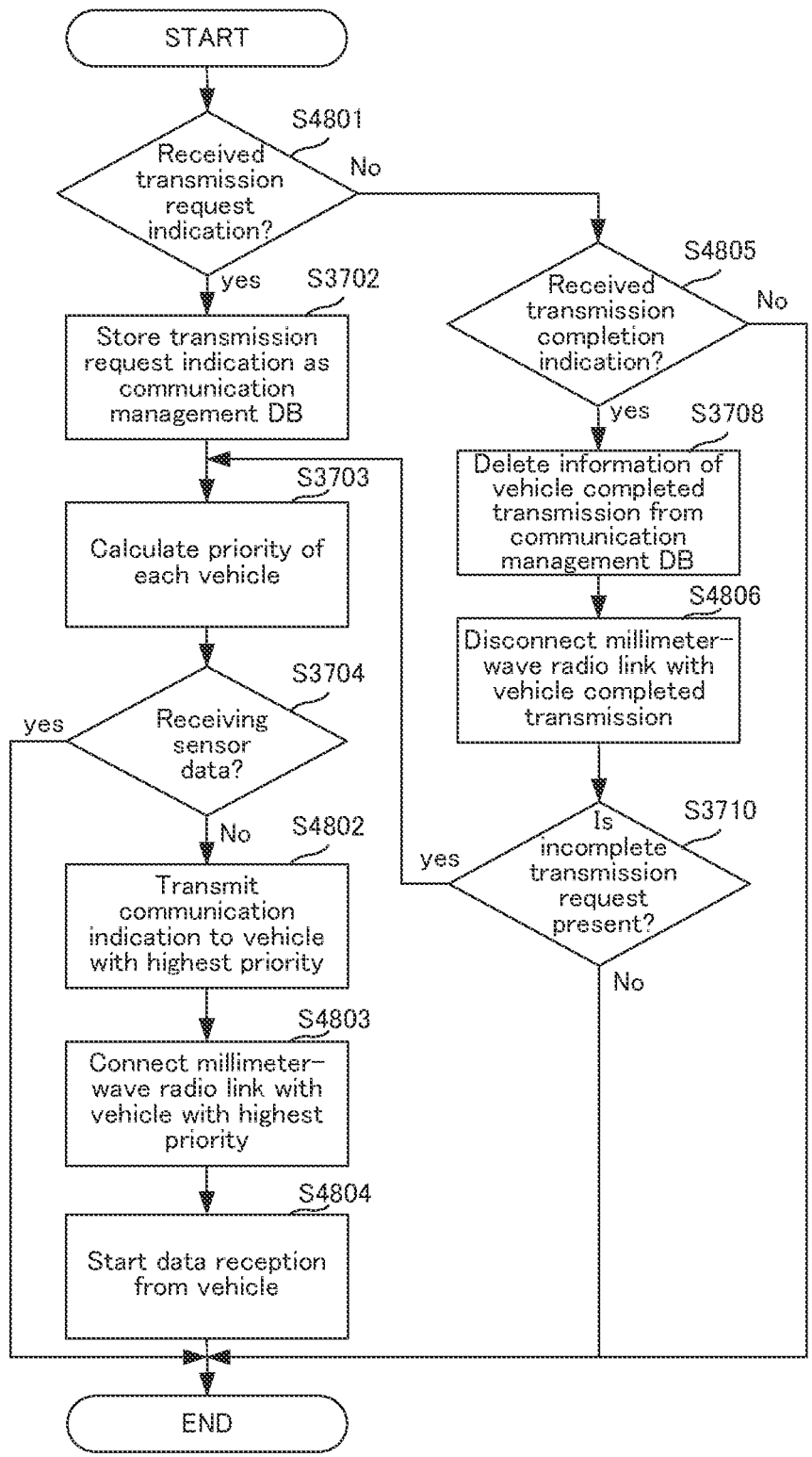
FIG. 33 is a flowchart describing exemplary processing of the base station radio communication device according to Embodiment 4.

FIG. 33 is a flowchart describing the exemplary operation of base station 4201 according to Embodiment 4.

FIG. 33 is different from FIG. 20 in Embodiment 3 in the following points:

Using the microwave radio communication for the reception of the transmission request indication, the transmission of the communication indication, and the reception of the transmission completion indication in steps S4801, S4802 and S4805 respectively;
Connecting the millimeter-wave radio link after transmitting the communication indication, in S4803;
Using the millimeter-wave radio communication for receiving the sensor data in S4804; and
Disconnecting the millimeter-wave radio link in S4806.

The other processes are the same as those in FIG. 20, and the description thereof is thus omitted.

The operations described in FIGS. 31, 32 and 33 enables stable control since the microwave radio communication, which has a coverage area larger than that of the millimeter-wave radio communication and allows stable communication, is used for the communication of the control signals of the indications. In addition, the sensor data can be transmitted and received at high speed since the millimeter-wave radio communication, which allows communication faster than the microwaves, is used for the transmission and reception of the sensor data.

Further, millimeter-wave radio resources can be effectively used for the transfer of the sensor data by connecting the millimeter-wave radio link at the start of the transmission of the sensor data and disconnecting the link at the end of the transmission. This secures the free space on storage 3404 of vehicle 4202. In addition, even when there is a large number of vehicles 4202 and a large amount of the sensor data to be collected, it is possible to reduce the probability of lacking the free space on storage 3404 of each vehicle 4202. That is, each vehicle 4202 can continuously acquire the sensor data.

Note that the radio communication system described above has a plurality of radios supporting the radio communication schemes different from each other, and the radios are selectively used depending on the purpose. However, the radio communication system may have a plurality of radios supporting a common radio communication scheme, and different purposes may be respectively assigned to the radios. For example, each of base station 4201 and vehicle 4202 may include two radios, and use one of which for the communication of the control signals and the other for the communication of the sensor data. This improves the control stability and allows high-speed radio communication compared with a case of using a single radio.

Figure 34:
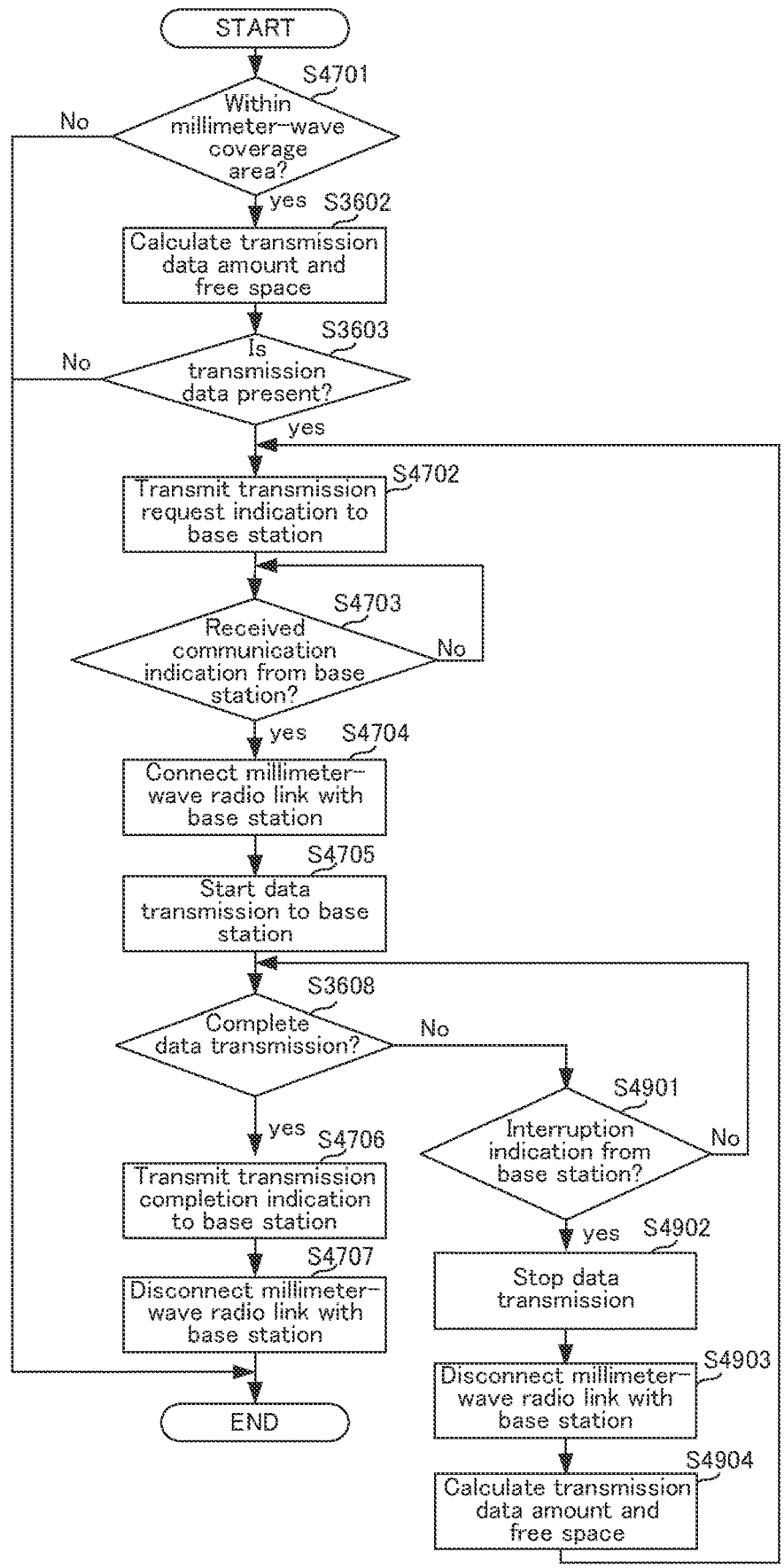
FIG. 34 is a flowchart describing other exemplary processing of the in-vehicle radio communication device according to Embodiment 4.

FIG. 34 is a flowchart describing Variation 3-1 of the processing of vehicle 4202 according to Embodiment 4.

FIG. 34 is different from FIG. 32 in the following points. That is, when vehicle 4202 receives the interruption indication (Yes in S4901) prior to the completion of the data transmission (No in S3608), vehicle 4202 stops the data transmission (S4902) and disconnects the millimeter-wave radio link with the base station (S4903). Vehicle 4202 then calculates the amount of the sensor data to be transmitted and the free space (S4904), and returns to the process of S4702.

Figure 35:
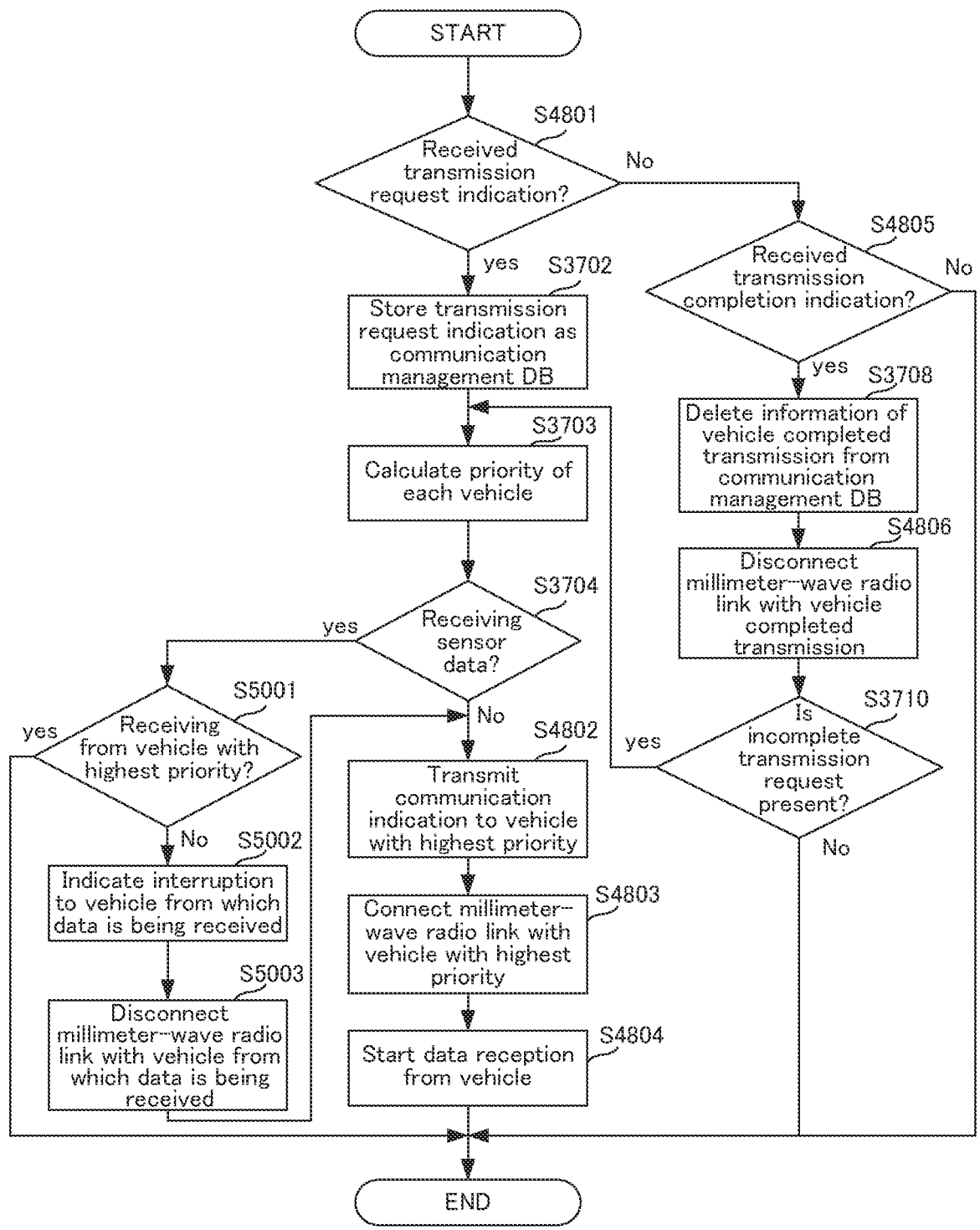
FIG. 35 is a flowchart describing other exemplary processing of the base station radio communication device according to Embodiment 4.

FIG. 35 is a flowchart describing Variation 3-2 of the processing of base station 4201 according to Embodiment 4.

FIG. 35 is different from FIG. 33 in the following points. That is, when base station 4201 receives the transmission request indication from another vehicle 4202 while receiving the sensor data (Yes in S3704) and the transmission request indication has the highest priority (No in S5001), base station 4201 indicates interruption to vehicle 4202 from which the sensor data is being received (S5002) and disconnects the millimeter-wave radio link with the vehicle 4202 (S5003).

Figure 36:
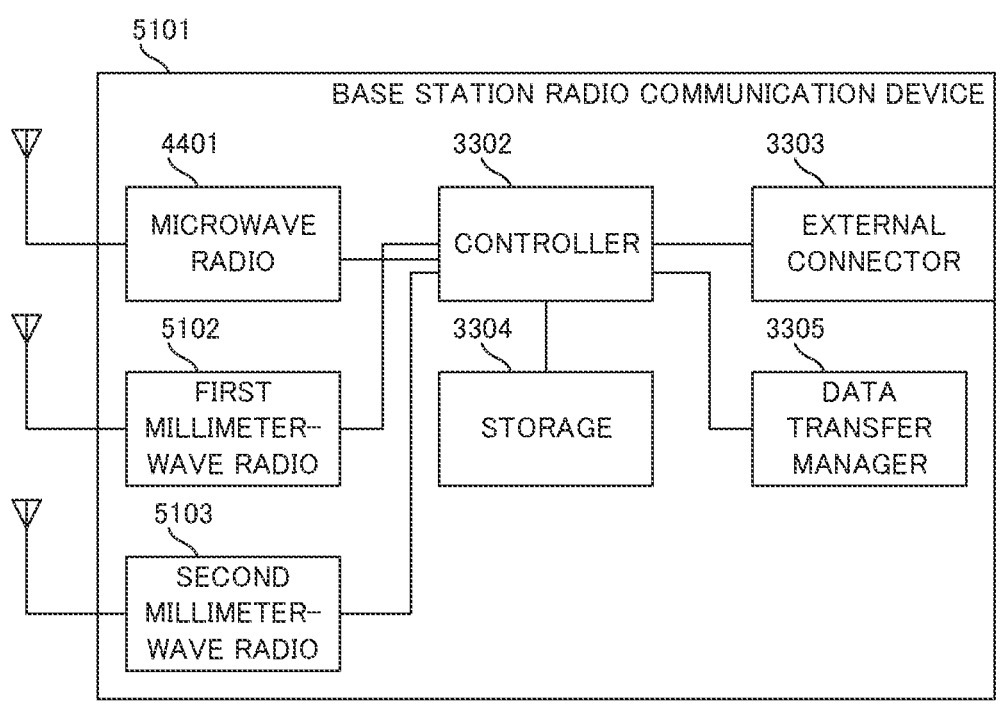
FIG. 36 is a block diagram illustrating a variation of the configuration of the base station radio communication device according to Embodiment 4.

Base station radio communication device 4301 described above includes single millimeter-wave radio 4402. Base station radio communication device 4301 may include a plurality of millimeter-wave radios, however. FIG. 36 is a block diagram illustrating an exemplary configuration in which base station radio communication device 4301 includes a plurality of millimeter-wave radios.

As illustrated in FIG. 36, base station radio communication device 5101 may include first millimeter-wave radio 5102, and second millimeter-wave radio 5103.

According to this configuration, each of millimeter-wave radios 5102 and 5103 can perform beamforming or perform MIMO transmission for each channel, and this allows base station 4201 to prevent reduction in the transmission data rate, connect to a plurality of vehicles 4202, and perform the radio communication simultaneously. Thus, base station 4201 can receive the sensor data efficiently.

This configuration further allows base station 4201 to acquire the reception power (RSSI) from each vehicle 4202 in the plurality of millimeter-wave radio 5102 and 5103, and to hold the RSSIs in the communication management DB. Base station 4201 can thus calculate the priority according to the communication environment. Further, base station 4201 can predict an expectation value of the effective throughput in combinations of the plurality of millimeter-wave radios 5102 and 5103 and the plurality of vehicles 4202 by referring to a table based on the RSSIs. This allows base station 4201 to determine the priority according to the situations, and receive data from vehicle 4202. For example, base station 4201 configures a higher priority to vehicle 4202 with higher expectation value of the effective throughput predicted from the RSSI. This allows base station 4201 to efficiently collect the sensor data from vehicles 4202. Thus, it is possible to reduce the probability of lacking the free space of vehicle 4202.

An embodiment of the present disclosure is useful for data collecting systems.

In the description described above, terms used for representing each component may be replaced with other terms such as " . . . circuit (circuitry)", " . . . device", " . . . unit" and " . . . module".

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a radio base station backhaul line a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Summary of Embodiment 1

A radio communication terminal apparatus according to the first disclosure includes: communication circuitry, which, in operation, communicates with a base station apparatus that is a communication counterpart; and control circuitry, which, in operation, controls a first control program, one or more application programs, and a second control program, the first control program controlling communication between the communication circuitry and the base station apparatus, the one or more application programs being executed in the radio communication terminal apparatus and using data communicated between an external server apparatus and the radio communication terminal apparatus via the base station apparatus, and the second control program controlling an indication between the first control program and the one or more application programs, wherein, the control circuitry: establishes connection between the radio communication terminal apparatus and the base station apparatus by the first control program after the radio communication terminal apparatus receives a beacon from the base station apparatus, outputs a connection establishment indication to the one or more application programs by the second control program after the connection is established, in a case where a connection indication request to the external server apparatus has been received from the one or more application programs, and outputs, to the communication circuitry, a communication request to the external server apparatus by the one or more application programs via the first control program after the connection establishment indication is received, and the communication circuitry transmits the communication request to the base station apparatus.

A radio communication method for the radio communication terminal apparatus according to the second disclosure includes: establishing connection between the radio communication terminal apparatus and a base station apparatus by a first control program after the radio communication terminal apparatus receives a beacon from the base station apparatus; outputting a connection establishment indication to one or more application programs by a second control program after the connection is established, in a case where a connection indication request to an external server has been received from the one or more application programs; and outputting, to communication circuitry, a communication request to the external server apparatus by the one or more application programs via the first control program after the connection establishment indication is received; transmitting the communication request to the base station apparatus by the communication circuitry, wherein, the first control program controls communication between the communication circuitry and the base station apparatus, the one or more application programs are executed in the radio communication terminal apparatus, and use data communicated between the external server apparatus and the radio communication terminal apparatus via the base station apparatus, and the second control program controls an indication between the first control program and the one or more application programs.

Summary of Embodiment 2

A radio communication apparatus according to the present disclosure includes: speed information acquisition circuitry, which, in operation, acquires information on a speed of a moving object with the radio communication apparatus mounted thereon; control circuitry, which, in operation, determines a first modulation and coding scheme (MCS) set available to the radio communication apparatus, and changes, when the speed of the moving object exceeds a threshold, the first MCS set to a second MCS set determined based on a data rate of transmission data of the radio communication apparatus; and radio circuitry, which, in operation, transmits the transmission data of the radio communication apparatus using an MCS selected from the second MCS set.

In the radio communication apparatus according to the present disclosure, the data rate is a value resulting from adding an overhead amount in a MAC layer to a value determined using a diameter of a communication area of a communication counterpart of the radio communication apparatus, an amount of the transmission data, and the speed of the moving object.

In the radio communication apparatus according to the present disclosure, the speed of the moving object is a value configured in advance depending on a type of the moving object.

In the radio communication apparatus according to the present disclosure, the selected MCS is an MCS selected from the first MCS set in a case where a distance between the communication counterpart of the radio communication apparatus and the radio communication apparatus is within a predetermined value.

A radio communication method according to the present disclosure includes: determining a first modulation and coding scheme (MCS) set available to a radio communication apparatus; changing, when a speed of a moving object with the radio communication apparatus mounted thereon exceeds a threshold, the first MCS set to a second MCS set determined based on a data rate of transmission data of the radio communication apparatus; and transmitting the transmission data of the radio communication apparatus using an MCS selected from the second MCS set.

In the radio communication method according to the present disclosure, the data rate is a value resulting from adding an overhead amount in a MAC layer to a value determined using a diameter of a communication area of a communication counterpart of the radio communication apparatus, an amount of the transmission data, and the speed of the moving object.

In the radio communication method according to the present disclosure, the speed of the moving object is a value configured in advance depending on a communication counterpart of the radio communication apparatus In the radio communication method according to the present disclosure, the selected MCS is an MCS selected from the first MCS set in a case where a distance between the communication counterpart of the radio communication apparatus and the radio communication apparatus is within a predetermined value.

Summaries of Embodiments 3 and 4

A radio communication system according to the present disclosure includes: a moving object that includes a storage for accumulating data, and performs radio transmission of information on free space on the storage and of at least part of the accumulated data, and a base station that controls a timing of the radio transmission, by the moving object, of the at least part of the accumulated data based on the received information.

In the radio communication system according to the present disclosure, the base station determines the moving object to which the base station indicates transmission of the data based on the information on the free space included in the information transmitted from each moving object, and transmits, to the determined moving object, indication information that indicates the transmission of the data, and the moving object transmits the data to the base station when receiving the indication information.

In the radio communication system according to the present disclosure, the information on the free space on the storage includes information indicating the free space on the storage, and the base station determines the moving object to which the base station indicates the transmission of the data according to the information indicating the free space on the storage.

In the radio communication system according to the present disclosure, the information on the free space on the storage includes information indicating required free space on the storage for data acquisition by the moving object, and the base station determines the moving object to which the base station indicates the transmission of the data according to the information indicating the required free space.

In the radio communication system according to the present disclosure, the information on the free space on the storage includes information indicating an available staying period in a radio area of the base station for the moving object, and the base station determines the moving object to which the base station indicates the transmission of the data according to the information indicating the available staying period.

In the radio communication system according to the present disclosure, the base station and the moving object use a first radio communication for the transmission of the information on the free space on the storage, and use a second radio communication for the transmission of the data, the second radio communication having frequency higher than that of the first radio communication.

A base station according to the present disclosure includes: a communicator that performs radio communication with a moving object; and a controller that receives, from the moving object by the radio communication, information on free space on a storage where the moving object accumulates data, and controls a timing of radio transmission, by the moving object, of at least part of the accumulated data based on the received information.

A moving object according to the present disclosure includes: a storage that accumulates data; a communicator that performs radio communication with a base station; and a controller that transmits information on free space on the storage to the base station by the radio communication, and controls a timing of radio transmission of at least part of the accumulated data to the base station based on control on the timing of the radio transmission of the data by the base station.

A radio communication method according to the present disclosure includes: transmitting, to a base station, information on free space on a storage that accumulates data by a moving object that includes the storage; controlling, by the base station based on the received information, a timing of radio transmission of the accumulated data from the moving object to the base station; and performing, by the moving object, the radio transmission of at least part of the accumulated data to the base station based on the control on the timing of the radio transmission by the base station.

A radio communication system includes a moving object and a base station. The moving object includes a storage that stores data, and transmits, to the base station, a transmission request indication that includes information on free space on the storage. The base station determines the moving object to which the base station indicates transmission of the data based on the information on the free space included in the received transmission request indication, and transmits, to the determined moving object, a communication indication that indicates the transmission of the data. The moving object transmits the data to the base station when receiving the communication indication.

The base station can thus determine the moving object to which the base station indicates the transmission of the data based on the information on the free space on the storage of the moving object, and this reduces the probability for the moving object to lack the free space on the storage in acquiring new data.

Note that the terms "accumulate", "hold", and "store" may be replaced with each other in the above description. The terms "calculate" and "determine" may also be replaced with each other.

The disclosures of Japanese Patent Application No. 2019-035691, filed on Feb. 28, 2019, Japanese Patent Application No. 2019-034639, filed on Feb. 27, 2019, and Japanese Patent Application No. 2019-064570, filed on Mar. 28, 2019, including the specifications, drawings and abstracts, are incorporated herein by reference in their entirety.

INDUSTRIAL APPLICABILITY

The present disclosure is suitable as a radio communication apparatus capable of launching an application program quickly.

REFERENCE SIGNS LIST 100, 100a User terminal
101, 201, 301a, 301b CPU
101a OBU
101b ECU
102, 202, 203, 302a, 302b Communication module
103, 204, 303a, 303b Storage
104 Sensor device
200 Base station apparatus
300a, 300b Server apparatus
1000, 1000a Communication system
2000 Communication system
2001, 2002 Radio communication apparatus
2051 Vehicle
2052 Roadside apparatus
2201 Maximum SC Rx MCS sub field
2202 Maximum OFDM Rx MCS sub field
2203 Maximum SC Tx MCS sub field
2204 Maximum OFDM Tx MCS sub field
2205 Low-Power SC PHY Supported sub field
2206 Code Rate 13/16 sub field
2207 Reserved bits
2301 Host computer
2302 Application software
2303 Speed information unit
2304 Radio communication circuitry
2305 MAC circuitry
2306 PHY circuitry
2307 Radio circuitry
3101, 4201 Base station
3102, 4202 Vehicle
3103 Coverage area
3201, 4301 Base station radio communication device
3202 Data analysis device
3203, 4302 In-vehicle radio communication device
3204 Data acquisition device
3301 Radio
3302 Controller
3303 External connector
3304 Storage
3305 Data transfer manager
3401 Radio
3402 Controller
3403 External connector
3404 Storage
3405 Transmission request indication generator

The invention claimed is:

1. A radio communication terminal apparatus, comprising:
communication circuitry, which, in operation, communicates with a base station apparatus that is a communication partner; and
control circuitry, which, in operation, controls a first control program, one or more application programs, and a second control program, the first control program controlling communication between the communication circuitry and the base station apparatus, the one or more application programs being executed in the radio communication terminal apparatus and using data communicated between an external server apparatus and the radio communication terminal apparatus via the base station apparatus, and the second control program controlling an indication between the first control program and the one or more application programs, wherein,
the control circuitry:
establishes connection between the radio communication terminal apparatus and the base station apparatus by the first control program after the radio communication terminal apparatus receives a beacon from the base station apparatus,
outputs, by the second control program, a connection establishment indication addressed to all of the one or more application programs after the connection is established, in a case where a connection indication request to the external server apparatus has been received from the one or more application programs, and
outputs, to the communication circuitry, a communication request to the external server apparatus by the one or more application programs via the first control program after the connection establishment indication is received, and the communication circuitry transmits the communication request to the base station apparatus.

2. A radio communication terminal apparatus, comprising:

communication circuitry, which, in operation, communicates with a base station apparatus that is a communication partner; and control circuitry, which, in operation, controls a first control program and a second control program, the first control program controlling communication between the communication circuitry and the base station apparatus, and the second control program controlling an indication between one or more application programs executed in an application terminal apparatus connected by an inter-apparatus network and the first control program, wherein, the one or more application programs use data communicated between an external server apparatus and the radio communication terminal apparatus via the base station apparatus, the control circuitry:

establishes connection between the radio communication terminal apparatus and the base station apparatus by the first control program after the radio communication terminal apparatus receives a beacon from the base station apparatus, outputs, to the application terminal apparatus by the second control program via the inter-apparatus network, a connection establishment indication addressed to all of the one or more application programs after the connection is established, in a case where a connection indication request to the external server apparatus has been received from the one or more application programs, and outputs, to the communication circuitry via the first control program, a communication request to the external server apparatus after the communication request is inputted from the application terminal apparatus, and the communication circuitry transmits the communication request to the base station apparatus.

3. A radio communication method for a radio communication terminal apparatus, the radio communication method comprising:

establishing connection between the radio communication terminal apparatus and a base station apparatus by a first control program after the radio communication terminal apparatus receives a beacon from the base station apparatus;

outputting, by a second control program, a connection establishment indication addressed to all of one or more application programs after the connection is established, in a case where a connection indication request to an external server apparatus has been received from the one or more application programs; and outputting, to communication circuitry, a communication request to the external server apparatus by the one or more application programs via the first control program after the connection establishment indication is received;

transmitting the communication request to the base station apparatus by the communication circuitry, wherein, the first control program controls communication between the communication circuitry and the base station apparatus, the one or more application programs are executed in the radio communication terminal apparatus, and use data communicated between the external server apparatus and the radio communication terminal apparatus via the base station apparatus, and the second control program controls an indication between the first control program and the one or more application programs.

4. A radio communication method for a radio communication terminal apparatus, the radio communication method comprising:

establishing connection between the radio communication terminal apparatus and a base station apparatus by a first control program after the radio communication terminal apparatus receives a beacon from the base station apparatus;

outputting, to an application terminal apparatus by a second control program via an inter-apparatus network, a connection establishment indication addressed to all of one or more application programs after the connection is established, in a case where a connection indication request to an external server apparatus has been received from the one or more application programs executed in the application terminal apparatus connected to the radio communication terminal apparatus by the inter-apparatus network;

outputting, to communication circuitry via the first control program, a communication request to the external server apparatus after the communication request is inputted from the application terminal apparatus; and transmitting the communication request to the base station apparatus by the communication circuitry, wherein, the one or more application programs use data communicated between the external server apparatus and the radio communication terminal apparatus via the base station apparatus, the first control program controls communication between the communication circuitry and the base station apparatus, and the second control program controls an indication between the first control program and the one or more application programs.

* * * * *